United States Patent
Pitts et al.

(10) Patent No.: US 10,085,005 B2
(45) Date of Patent: Sep. 25, 2018

(54) CAPTURING LIGHT-FIELD VOLUME IMAGE AND VIDEO DATA USING TILED LIGHT-FIELD CAMERAS

(71) Applicant: Lytro, Inc., Mountain View, CA (US)

(72) Inventors: Colvin Pitts, Snohomish, WA (US);
Yonggang Ha, Sunnyvale, CA (US);
William Houck, Fremont, CA (US)

(73) Assignee: Lytro, Inc., Mountain View, CA (US)

( * ) Notice: Subject to any disclaimer, the term of this patent is extended or adjusted under 35 U.S.C. 154(b) by 34 days.

(21) Appl. No.: 15/084,326

(22) Filed: Mar. 29, 2016

(65) Prior Publication Data

US 2016/0307372 A1 Oct. 20, 2016

Related U.S. Application Data

(60) Provisional application No. 62/148,055, filed on Apr. 15, 2015, provisional application No. 62/148,460, filed on Apr. 16, 2015.

(51) Int. Cl.

| | |
|---|---|
| *H04N 13/111* | (2018.01) |
| *H04N 13/282* | (2018.01) |
| *H04N 5/225* | (2006.01) |
| *H04N 13/232* | (2018.01) |
| *H04N 13/275* | (2018.01) |
| *H04N 13/02* | (2006.01) |

(Continued)

(52) U.S. Cl.
CPC ........ *H04N 13/111* (2018.05); *H04N 5/2254* (2013.01); *H04N 13/0011* (2013.01); *H04N 13/0014* (2013.01); *H04N 13/0232* (2013.01); *H04N 13/0242* (2013.01); *H04N 13/0282* (2013.01); *H04N 13/282* (2018.05); *H04N 13/0275* (2013.01); *H04N 13/044* (2013.01)

(58) Field of Classification Search
CPC ............ H04N 13/0242; H04N 5/2258; H04N 13/0488; G06T 2207/10052; G06T 7/557; G02B 3/0006
See application file for complete search history.

(56) References Cited

U.S. PATENT DOCUMENTS

| | | |
|---|---|---|
| 6,674,430 B1 | 1/2004 | Kaufman et al. |
| 6,785,667 B2 | 8/2004 | Orbanes et al. |

(Continued)

OTHER PUBLICATIONS

Roper Scientific Germany, "Fiber Optics", 2012.
Sony's First Curved Sensor Photo: http://www.engadget.com. Jul. 2014.

*Primary Examiner* — Haixia Du

(57) ABSTRACT

A capture system may capture light-field data representative of an environment for use in virtual reality, augmented reality, and the like. The system may have a plurality of light-field cameras arranged to capture a light-field volume within the environment, and a processor. The processor may use the light-field volume to generate a first virtual view depicting the environment from a first virtual viewpoint. The light-field cameras may be arranged in a tiled array to define a capture surface with a ring-shaped, spherical, or other arrangement. The processor may map the pixels captured by the image sensors to light rays received in the light-field volume, and store data descriptive of the light rays in a coordinate system representative of the light-field volume.

32 Claims, 41 Drawing Sheets

(51) Int. Cl.
*H04N 13/00* (2018.01)
*H04N 13/04* (2006.01)

(56) References Cited

U.S. PATENT DOCUMENTS

| | | | |
|---|---|---|---|
| 7,239,345 B1* | 7/2007 | Rogina | H04N 5/2251 |
| | | | 348/159 |
| 8,629,930 B2 | 1/2014 | Brueckner et al. | |
| 8,988,317 B1 | 3/2015 | Liang et al. | |
| 9,201,193 B1* | 12/2015 | Smith | G02B 6/04 |
| 9,497,380 B1* | 11/2016 | Jannard | H04N 5/23238 |
| 2004/0002179 A1 | 1/2004 | Barton et al. | |
| 2008/0316301 A1* | 12/2008 | Givon | G03B 35/00 |
| | | | 348/49 |
| 2009/0102956 A1* | 4/2009 | Georgiev | H04N 5/23212 |
| | | | 348/315 |
| 2011/0018903 A1 | 1/2011 | Lapstun et al. | |
| 2011/0292258 A1* | 12/2011 | Adler | G02B 23/2423 |
| | | | 348/263 |
| 2014/0167196 A1 | 6/2014 | Heimgartner et al. | |
| 2014/0176710 A1* | 6/2014 | Brady | G02B 27/0025 |
| | | | 348/144 |
| 2014/0354863 A1 | 12/2014 | Ahn et al. | |
| 2015/0029386 A1 | 1/2015 | Pitts et al. | |
| 2016/0381348 A1* | 12/2016 | Hayasaka | G06F 3/011 |
| | | | 348/48 |

\* cited by examiner

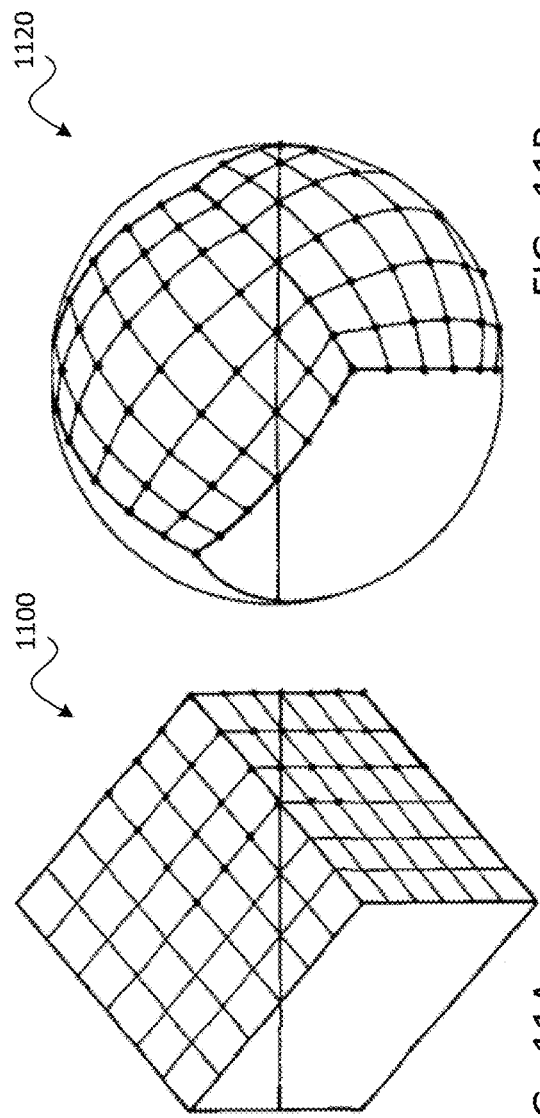
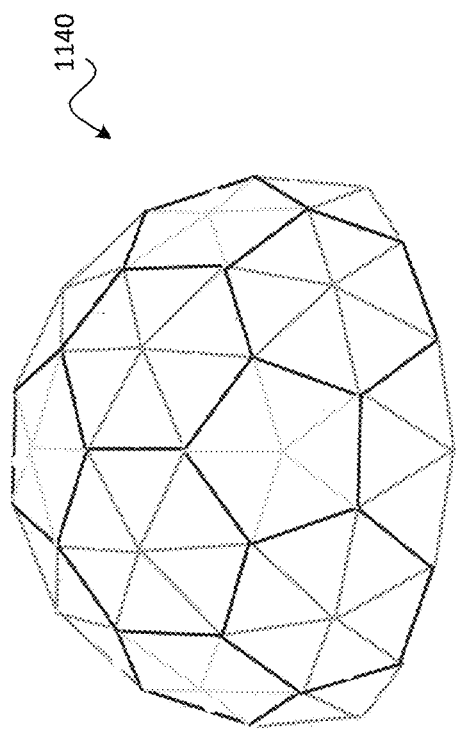
FIG. 11A
FIG. 11B
FIG. 11C

Top view

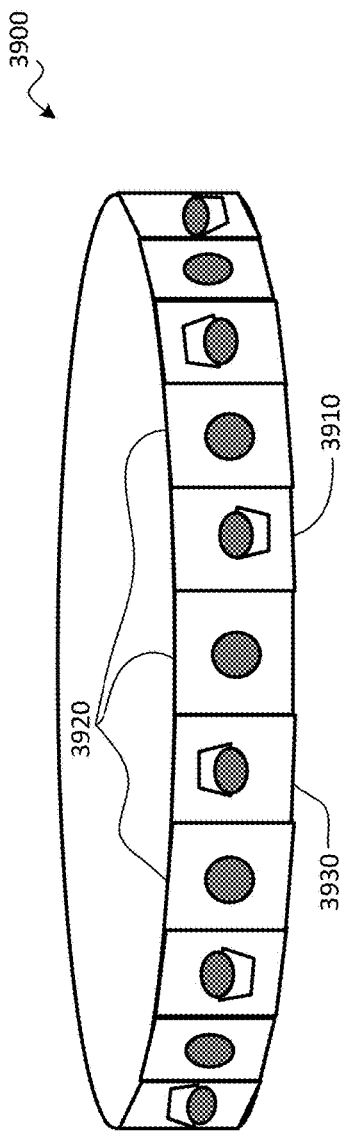
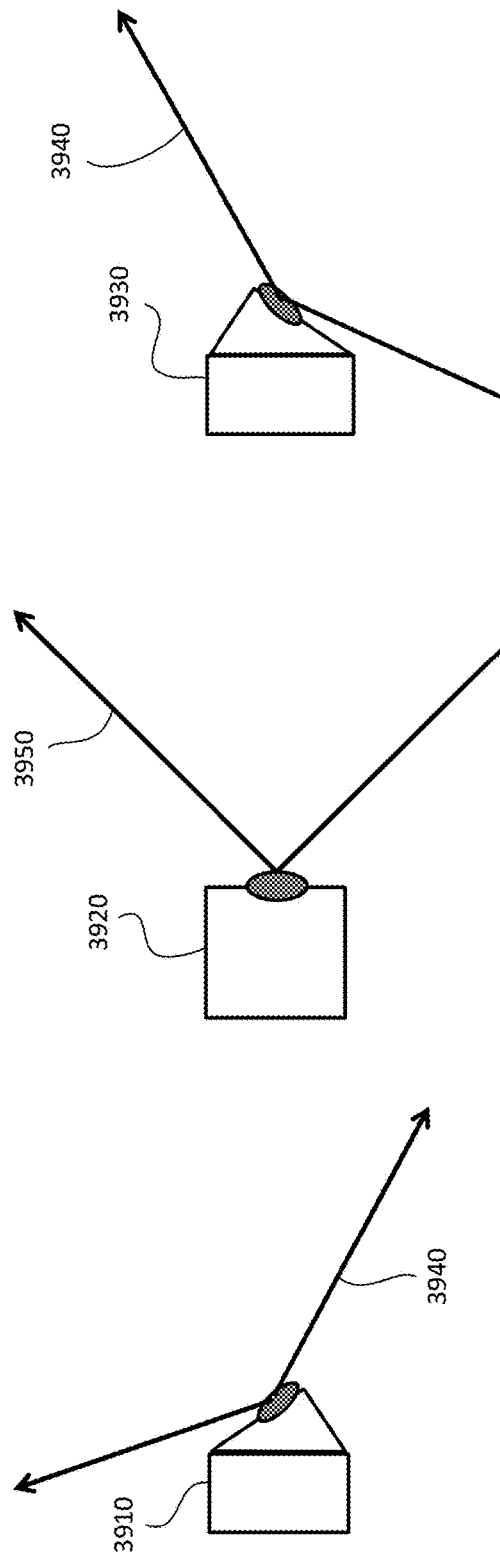
FIG. 39A
FIG. 39B
FIG. 39C
FIG. 39D

CAPTURING LIGHT-FIELD VOLUME IMAGE AND VIDEO DATA USING TILED LIGHT-FIELD CAMERAS

CROSS-REFERENCE TO RELATED APPLICATIONS

The present application claims priority from U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

The present application also claims priority from U.S. Provisional Application Ser. No. 62/148,460 for "Capturing Light Field Volume Image and Video Data Using Tiled Light Field Cameras", filed Apr. 16, 2015, the disclosure of which is incorporated herein by reference in its entirety.

The present application is also related to U.S. patent application Ser. No. 14/302,826 for "Depth Determination for Light Field Images", filed Jun. 12, 2014 and issued as U.S. Pat. No. 8,988,317 on Mar. 24, 2015, the disclosure of which is incorporated herein by reference.

TECHNICAL FIELD

The present document relates to the use of multiple light-field cameras to capture a light-field volume to enable computation of specific views within the volume.

BACKGROUND

As better and more immersive display devices are created for providing virtual reality (VR) and augmented reality (AR) environments, it is desirable to be able to capture high quality imagery and video for these systems. In a stereo VR environment, a user sees separate views for each eye; also, the user may turn and move his or her head while viewing. As a result, it is desirable that the user receive high-resolution stereo imagery that is consistent and correct for any viewing position and orientation in the volume within which a user may move his or her head.

Current capture systems for VR and AR data are fundamentally limited by the number of physical camera viewpoints. Some systems can accurately capture the full environment from a single perspective, but cannot offer stereo viewing or allow for changes in perspective. Other systems capture imagery or video from a limited number of viewpoints and viewing directions, but ultimately must resort to algorithmic pixel generation and/or manual artistry to infer or otherwise create missing data as the user views the world from perspectives and directions not captured directly.

SUMMARY

Various embodiments of the described system capture light-field volume and/or panoramic light-field image and/or video data using tiled arrays of light-field cameras. The tiled array of light-field cameras may define a physical capture surface that surrounds a light-field volume, for which entering light rays may be fully or partially captured by the capture system. Once the light-field data for a volume has been captured, a physically correct virtual view from any virtual position and viewing direction within that volume may be directly computed. This light-field volume data may be used as input to stereo VR and/or AR headsets or other viewers, and can provide users with a more immersive and accurate experience within the interior of the captured light-field volume.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 11A through 11C are diagrams showing various patterns for joining camera lenses to create a continuous surface on a volume of space, according to various embodiments.

FIGS. 39A through 39D are perspective and side elevation views depicting a tiled array of conventional cameras, according to one embodiment.

DETAILED DESCRIPTION

Figure 1:
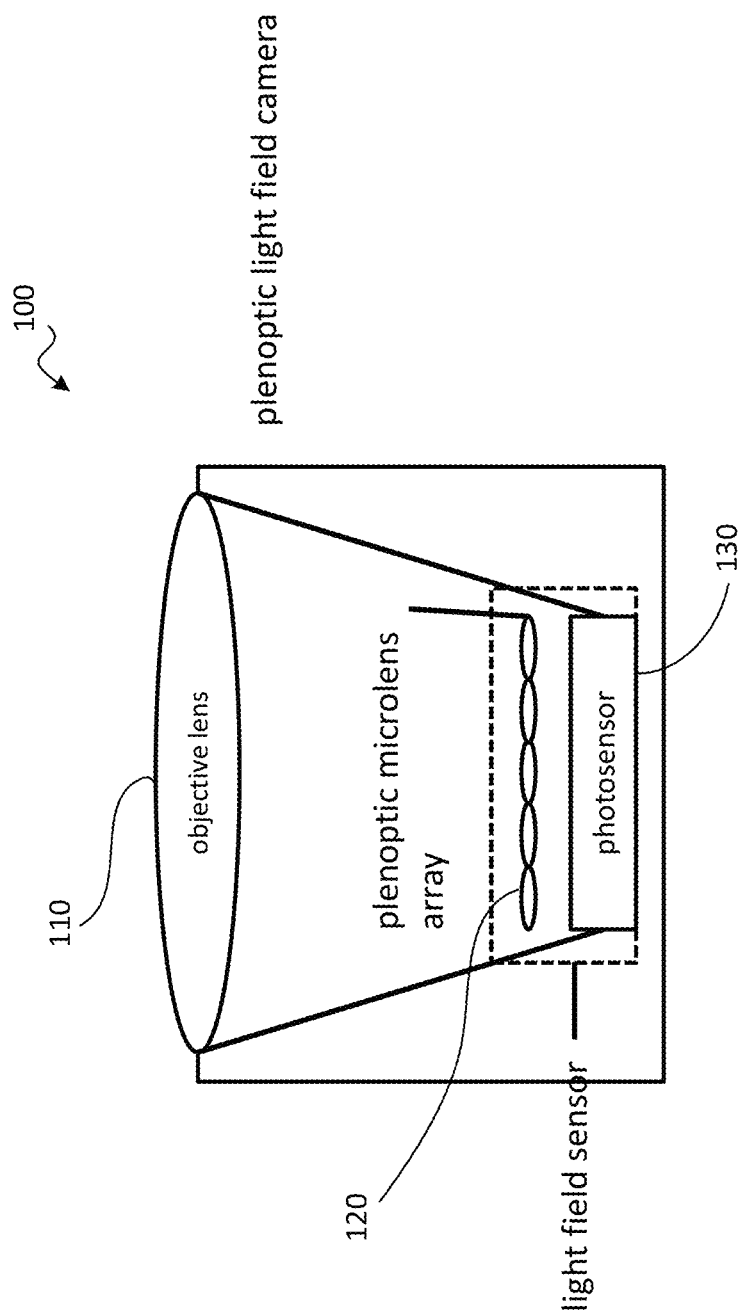
FIG. 1 is a diagram of a plenoptic light-field camera, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Active area: the portion of a module that receives light to be provided as image data by the module.

Array light-field camera: a type of light-field camera that contains an array of objective lenses with overlapping fields-of-view and one or more photosensors, with the viewpoint from each objective lens captured as a separate image.

Capture surface, or "physical capture surface": a surface defined by a tiled array of light-field cameras, at which light is received from an environment into the light-field cameras, with exemplary capture surfaces having cylindrical, spherical, cubic, and/or other shapes.

Capture system: a tiled array of light-field cameras used to fully or sparsely capture a light-field volume.

Conventional image: an image in which the pixel values are not, collectively or individually, indicative of the angle of incidence at which light is received on the surface of the sensor.

Depth: a representation of distance between an object and/or corresponding image sample and the entrance pupil of the optics of the capture system.

Disk: a region in a light-field image that is illuminated by light passing through a single microlens; may be circular or any other suitable shape.

Disk image: a single image of the aperture stop, viewed through a plenoptic microlens, and captured by a region on the sensor surface.

Entrance pupil: the optical image of the physical aperture stop, as "seen" through the front of the lens system, with a geometric size, location, and angular acceptance acting as the camera's window of view into an environment Environment: a real-world scene to be captured for subsequent visualization Fiber optic bundle: a set of aligned optical fibers capable of transmitting light.

Fully sampled light-field volume: a light-field volume that has been captured in a manner inclusive of ray data from all directions at any location within the light-field volume, enabling the generation of virtual views from any viewpoint, at any orientation, and with any field-of-view.

Image: a two-dimensional array of pixel values, or pixels, each specifying a color.

Input device: any device that receives input from a user.

Leading end: the end of a fiber optic bundle that receives light.

Light-field camera: any camera capable of capturing light-field images.

Light-field coordinate: for a single light-field camera, the four-dimensional coordinate (for example, x, y, u, v) used to index a light-field sample captured by a light-field camera, in which (x, y) may be the spatial coordinate representing the intersection point of a light ray with a microlens array, and (u, v) may be the angular coordinate representing an intersection point of the light ray with an aperture plane.

Light-field data: data indicative of the angle of incidence at which light is received on the surface of the sensor.

Light-field image: an image that contains a representation of light-field data captured at the sensor, which may be a four-dimensional sample representing information carried by ray bundles received by a single light-field camera.

Light-field volume: the combination of all light-field images that represents, either fully or sparsely, light rays entering the physical space defined by the light-field volume.

Light-field volume coordinate: for a capture system, an extended version of light-field coordinates that may be used for panoramic and/or omnidirectional viewing (for example, rho1, theta1, rho2, theta2), in which (rho1, theta1) represent intersection of a light ray with an inner sphere and (rho2, theta2) represent intersection of the light ray with an outer sphere concentric with the inner sphere.

Main lens, or "objective lens": a lens or set of lenses that directs light from a scene toward an image sensor.

Microlens: a small lens, typically one in an array of similar microlenses.

Microlens array: an array of microlenses arranged in a predetermined pattern.

Packaging: The housing, electronics, and any other components of an image sensor that reside outside the active area.

Plenoptic light-field camera: a type of light-field camera that employs a microlens-based approach in which a plenoptic microlens array is positioned between the objective lens and the photosensor.

Plenoptic microlens array: a microlens array in a plenoptic camera that is used to capture directional information for incoming light rays, with each microlens creating an image of the aperture stop of the objective lens on the surface of the image sensor.

Processor: any processing device capable of processing digital data, which may be a microprocessor, ASIC, FPGA, or other type of processing device.

Ray bundle, "ray," or "bundle": a set of light rays recorded in aggregate by a single pixel in a photosensor.

Ring array: a tiled array of light-field cameras in which the light-field cameras are generally radially symmetrically arranged about an axis to define a cylindrical capture surface of light-field cameras facing outward.

Sensor, "photosensor," or "image sensor": a light detector in a camera capable of generating images based on light received by the sensor.

Spherical array: a tiled array of light-field cameras in which the light-field cameras are generally arranged in a spherical pattern to define a spherical capture surface of light-field cameras facing outward.

Stereo virtual reality: an extended form of virtual reality in which each eye is shown a different view of the virtual world, enabling stereoscopic three-dimensional perception.

Subview: the view or image from an individual view in a light-field camera (a subaperture image in a plenoptic light-field camera, or an image created by a single objective lens in an objective lens array in an array light-field camera).

Tapered fiber optic bundle, or "taper": a fiber optic bundle that is larger at one end than at the other.

Tiled array: an arrangement of light-field cameras in which the light-field cameras are compactly and/or loosely, evenly and/or unevenly distributed about an axis and oriented generally outward to capture an environment surrounding the tiled array, with exemplary tiled arrays including ring-shaped arrays, spherical arrays, cubic arrays, and the like.

Trailing end: the end of a fiber optic bundle that emits light.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual viewpoint: the location, within a coordinate system and/or light-field volume, from which a virtual view is generated.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another. Further, many of the configurations and techniques described herein are applicable to conventional imaging as well as light-field imaging. Thus, although the following description focuses on light-field imaging, all of the following systems and methods may additionally or alternatively be used in connection with conventional digital imaging systems. In some cases, the needed modification is as simple as removing the microlens array from the configuration described for light-field imaging to convert the example into a configuration for conventional image capture.

Architecture

Figure 36:
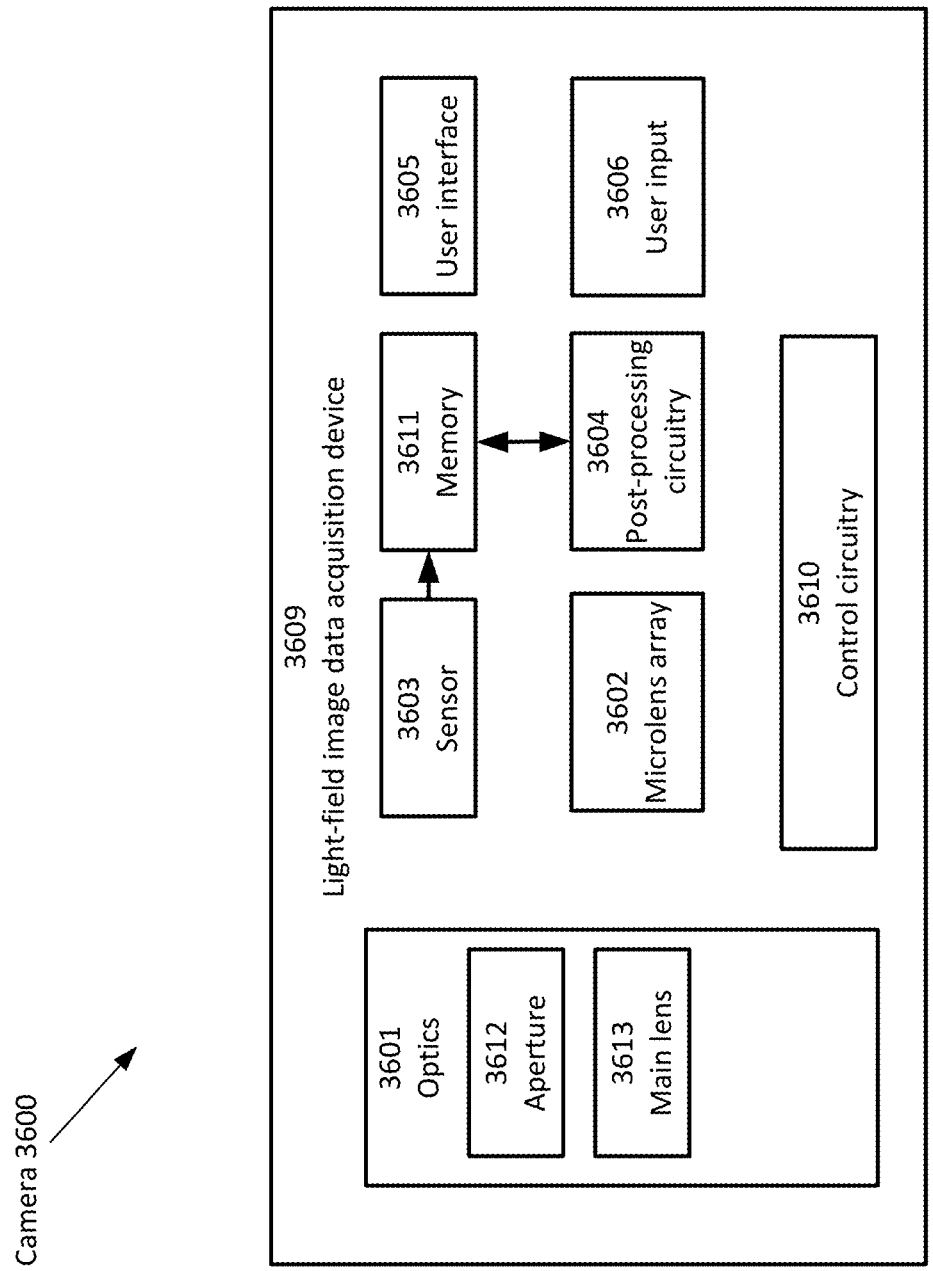
FIG. 36 depicts an example of an architecture for implementing the methods of the present disclosure in a light-field capture device, according to one embodiment.
Figure 37:
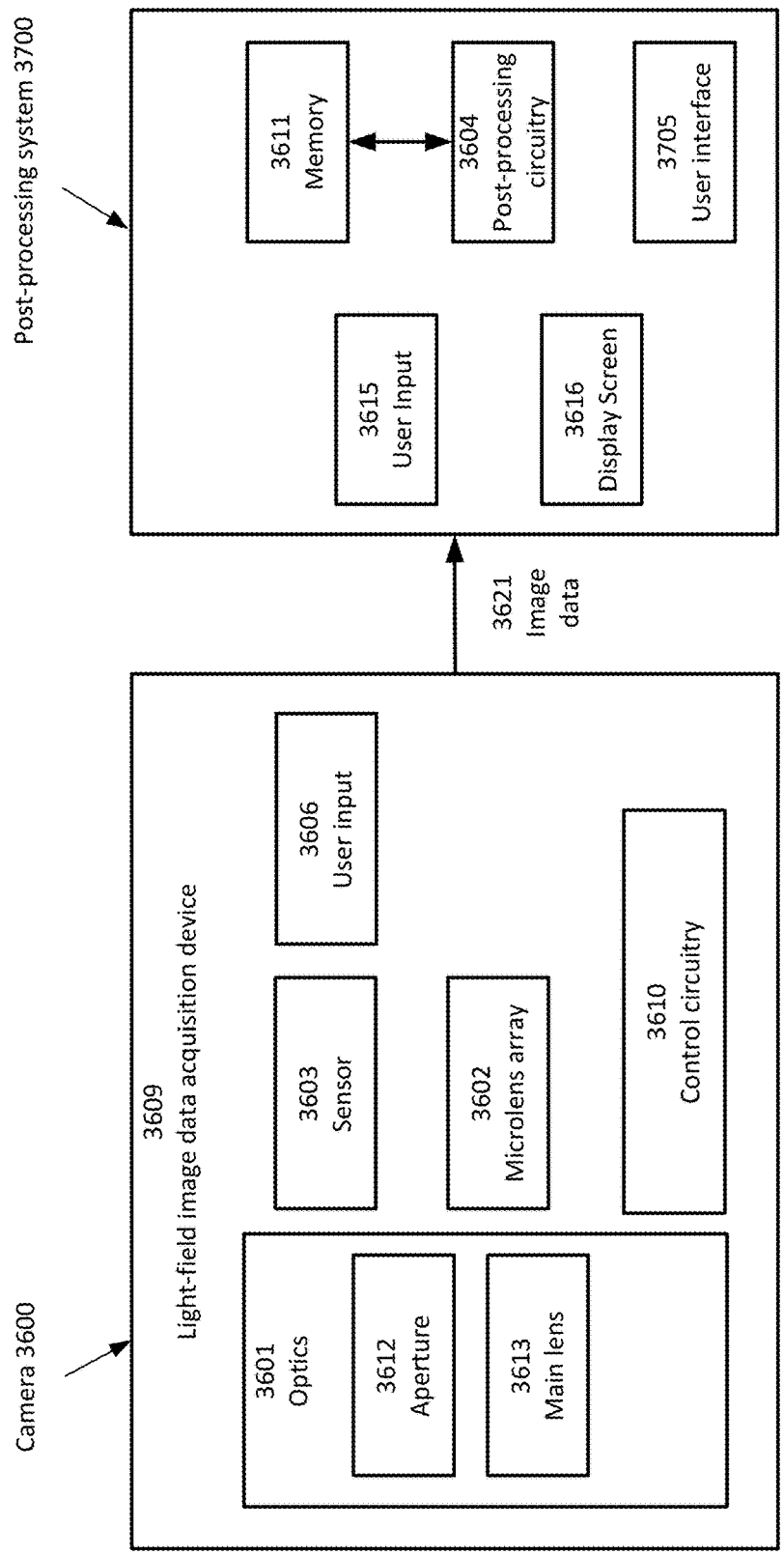
FIG. 37 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 36, there is shown a block diagram depicting an architecture for implementing the method of the present disclosure in a light-field capture device such as a camera 3600. Referring now also to FIG. 37, there is shown a block diagram depicting an architecture for implementing the method of the present disclosure in a post-processing system 3700 communicatively coupled to a light-field capture device such as a camera 3600, according to one embodiment. One skilled in the art will recognize that the particular configurations shown in FIGS. 36 and 37 are merely exemplary, and that other architectures are possible for camera 3600. One skilled in the art will further recognize that several of the components shown in the configurations of FIGS. 36 and 37 are optional, and may be omitted or reconfigured.

Figure 38:
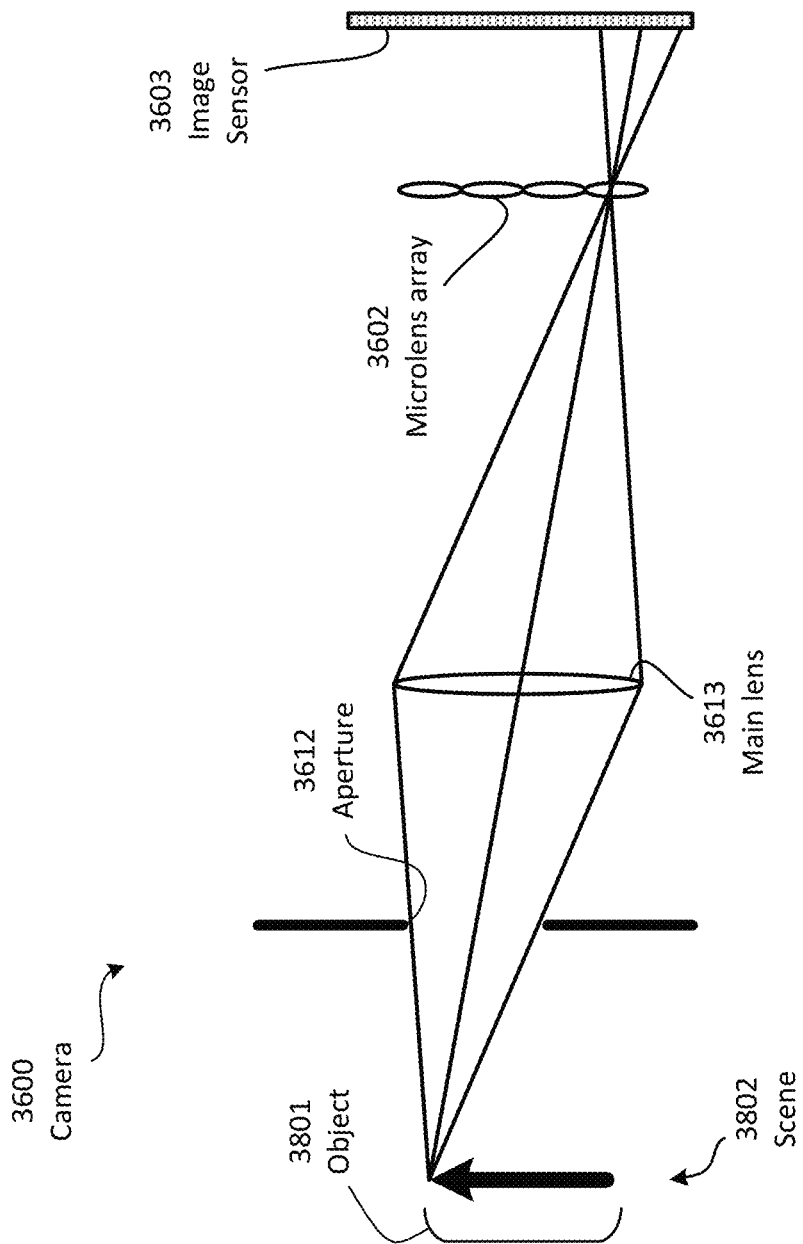
FIG. 38 depicts an example of an architecture for a light-field camera for implementing the methods of the present disclosure according to one embodiment.

In at least one embodiment, camera 3600 may be a light-field camera that includes light-field image data acquisition device 3609 having optics 3601, image sensor 3603 (including a plurality of individual sensors for capturing pixels), and microlens array 3602. Optics 3601 may include, for example, aperture 3612 for allowing a selectable amount of light into camera 3600, and main lens 3613 for focusing light toward microlens array 3602. In at least one embodiment, microlens array 3602 may be disposed and/or incorporated in the optical path of camera 3600 (between main lens 3613 and image sensor 3603) so as to facilitate acquisition, capture, sampling of, recording, and/or obtaining light-field image data via image sensor 3603. Referring now also to FIG. 38, there is shown an example of an architecture for a light-field camera, or camera 3600, for implementing the method of the present disclosure according to one embodiment. The FIG. is not shown to scale. FIG. 38 shows, in conceptual form, the relationship between aperture 3612, main lens 3613, microlens array 3602, and image sensor 3603, as such components interact to capture light-field data for one or more objects, represented by an object 3801, which may be part of a scene 3802.

In at least one embodiment, camera 3600 may also include a user interface 3605 for allowing a user to provide input for controlling the operation of camera 3600 for capturing, acquiring, storing, and/or processing image data. The user interface 3605 may receive user input from the user via an input device 3606, which may include any one or more user input mechanisms known in the art. For example, the input device 3606 may include one or more buttons, switches, touch screens, gesture interpretation devices, pointing devices, and/or the like.

In at least one embodiment, camera 3600 may also include control circuitry 3610 for facilitating acquisition, sampling, recording, and/or obtaining light-field image data. The control circuitry 3610 may, in particular, be used to switch image capture configurations in response to receipt of the corresponding user input. For example, control circuitry 3610 may manage and/or control (automatically or in response to user input) the acquisition timing, rate of acquisition, sampling, capturing, recording, and/or obtaining of light-field image data.

In at least one embodiment, camera 3600 may include memory 3611 for storing image data, such as output by image sensor 3603. Such memory 3611 can include external and/or internal memory. In at least one embodiment, memory 3611 can be provided at a separate device and/or location from camera 3600.

For example, when camera 3600 is in a light-field image capture configuration, camera 3600 may store raw light-field image data, as output by image sensor 3603, and/or a representation thereof, such as a compressed image data file. In addition, when camera 3600 is in a conventional image capture configuration, camera 3600 may store conventional image data, which may also be stored as raw, processed, and/or compressed output by the image sensor 3603.

In at least one embodiment, captured image data is provided to post-processing circuitry 3604. The post-processing circuitry 3604 may be disposed in or integrated into light-field image data acquisition device 3609, as shown in FIG. 36, or it may be in a separate component external to light-field image data acquisition device 3609, as shown in FIG. 37. Such separate component may be local or remote with respect to light-field image data acquisition device 3609. Any suitable wired or wireless protocol can be used for transmitting image data 3621 to circuitry 3604; for example, the camera 3600 can transmit image data 3621 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 3615 and/or a display screen 3616. If desired, light-field image data may be displayed for the user on the display screen 3616.

Overview

Light-field images often include a plurality of projections (which may be circular or of other shapes) of aperture 3612 of camera 3600, each projection taken from a different vantage point on the camera's focal plane. The light-field image may be captured on image sensor 3603. The interposition of microlens array 3602 between main lens 3613 and image sensor 3603 causes images of aperture 3612 to be formed on image sensor 3603, each microlens in microlens array 3602 projecting a small image of main-lens aperture 3612 onto image sensor 3603. These aperture-shaped projections are referred to herein as disks, although they need not be circular in shape. The term "disk" is not intended to be limited to a circular region, but can refer to a region of any shape.

Figure 35:
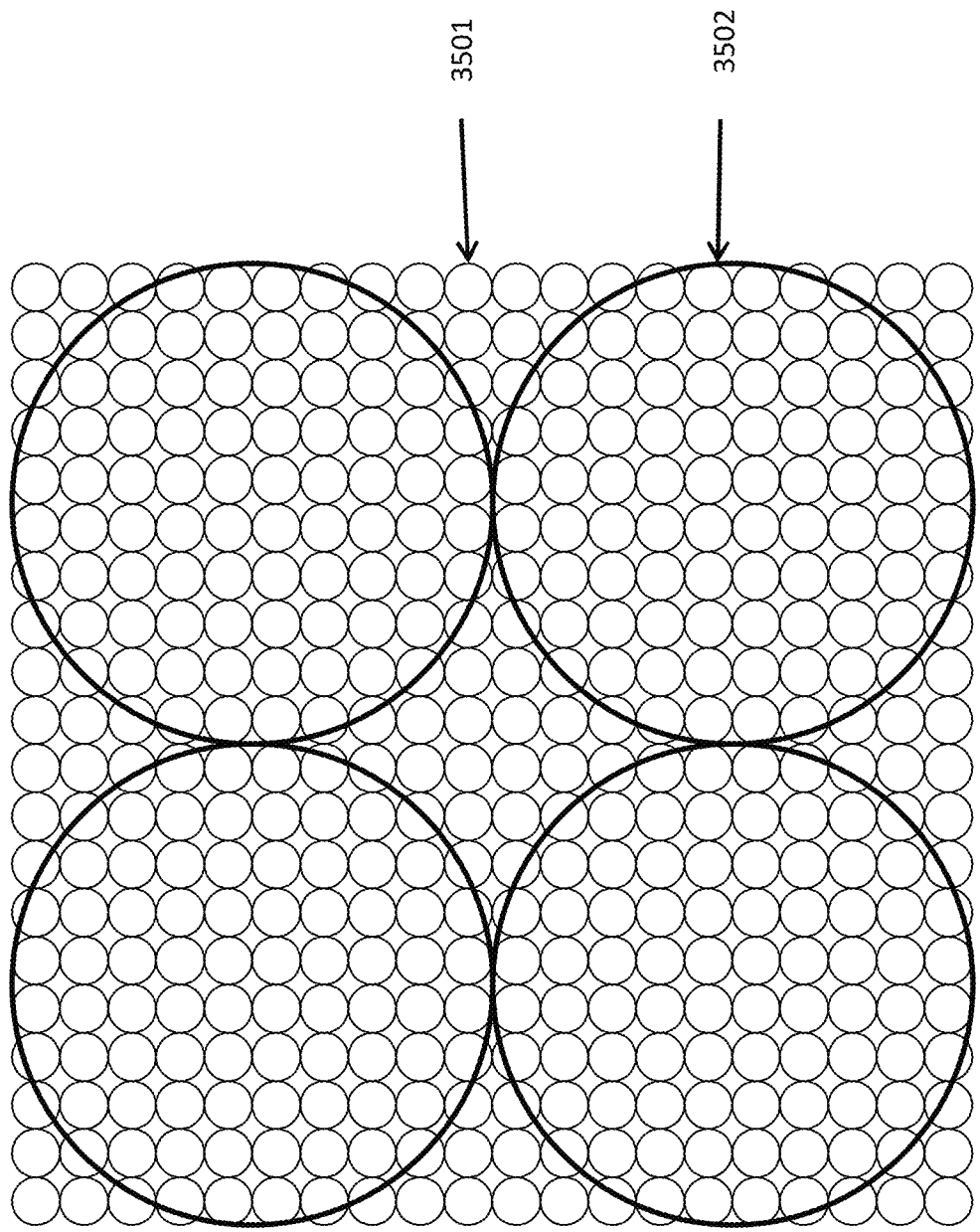
FIG. 35 depicts a portion of a light-field image.

Light-field images include four dimensions of information describing light rays impinging on the focal plane of camera 3600 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 35, there is shown an example of a 2-disk by 2-disk portion of such a light-field image, including depictions of disks 3502 and individual pixels 3501; for illustrative purposes, each disk 3502 is ten pixels 3501 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Problem Description

Figure 27:
FIG. 27 is an image of an example of a virtual reality headset, the Oculus Rift (Development Kit version).

Virtual reality is intended to be a fully immersive experience for users, often having the goal of creating an experience that is as close as possible to "being there." Users typically don headsets with immersive, wide-angle stereo viewing, multidirectional sound, and onboard sensors that can measure orientation, accelerations, and/or position. As an example, FIG. 27 shows an image of the Oculus Rift Development Kit headset 2700. Viewers using virtual reality and/or augmented reality headsets may move their heads to point in any direction, move forward and backward, and may move their heads side to side. The point of view from which the user views his or her surroundings may change to match the motion of his or her head.

Virtual reality content may be roughly divided into two segments: synthetic content and real world content. Synthetic content may include applications like video games or computer-animated movies that are generated by the computer. Real world content may include panoramic imagery and/or live action video that is captured from real places or events.

Synthetic content may contain and/or be generated from a 3-dimensional model of the environment, which may be also used to provide views that are matched to the actions of the viewer. This may include changing the views to account for head orientation and/or position, and may even include adjusting for differing distances between the eyes.

Figure 7:
FIG. 7 is a diagram of a virtual reality capture system according to the prior art, developed by Jaunt.
Figure 8:
FIG. 8 is a diagram of a stereo virtual reality capture system according to the prior art.

Real world content is more difficult to fully capture with known systems and methods, and is fundamentally limited by the hardware setup used to capture the content. FIGS. 7 and 8 show exemplary capture systems 700 and 800, respectively. Specifically, FIG. 7 depicts a virtual reality capture system, or capture system 700, according to the prior art, developed by Jaunt. The capture system 700 consists of a number of traditional video capture cameras 710 arranged spherically. The traditional video capture cameras 710 are arranged facing outward from the surface of the sphere. FIG. 8 depicts a stereo virtual reality capture system, or capture system 800, according to the prior art. The capture system 800 consists of 8 stereo camera pairs 810, plus one vertically facing camera 820. Image and/or video data is captured from the camera pairs 810, which are arranged facing outward from a ring. In the capture system 700 and the capture system 800, the image and/or video data captured is limited to the set of viewpoints in the camera arrays.

When viewing real world content captured using these types of systems, a viewer may only be viewing the captured scene with accuracy when virtually looking out from one of the camera viewpoints that has been captured. If the viewer views from a position that is between cameras, an intermediate viewpoint must be generated in some manner. There are many approaches that may be taken in order to generate these intermediate viewpoints, but all have significant limitations.

One method of generating intermediate viewpoints is to generate two 360° spherically mapped environments—one for each eye. As the viewer turns his or her head, each eye sees a window into these environments. Image and/or video data from the cameras in the array are stitched onto the spherical surfaces. However, this approach is geometrically flawed, as the center of perspective for each eye changes as the user moves his or her head, and the spherical mapping assumes a single point of view. As a result, stitching artifacts and/or geometric distortions cannot be fully avoided. In addition, the approach can only reasonably accommodate viewers changing their viewing direction, and does not perform well when the user moves his or her head laterally, forward, or backward.

Another method to generate intermediate viewpoints is to attempt to generate a 3D model from the captured data, and interpolate between viewpoints based at least partially on the generated model. This model may be used to allow for greater freedom of movement, but is fundamentally limited by the quality of the generated three-dimensional model. Certain optical aspects, like specular reflections, partially transparent surfaces, very thin features, and occluded imagery are extremely difficult to correctly model. Further, the visual success of this type of approach is highly dependent on the amount of interpolation that is required. If the distances are very small, this type of interpolation may work acceptably well for some content. As the magnitude of the interpolation grows (for example, as the physical distance between cameras increases), any errors will become more visually obvious.

Another method of generating intermediate viewpoints involves including manual correction and/or artistry in the postproduction workflow. While manual processes may be used to create or correct many types of issues, they are time intensive and costly.

A capture system that is able to capture a continuous or nearly continuous set of viewpoints may remove or greatly reduce the interpolation required to generate arbitrary viewpoints. Thus, the viewer may have greater freedom of motion within a volume of space.

Tiled Array of Light-Field Cameras

The present document describes several arrangements and architectures that allow for capturing light-field volume data from continuous or nearly continuous viewpoints. The viewpoints may be arranged to cover a surface or a volume using tiled arrays of light-field cameras. Such systems may be referred to as "capture systems" in this document. A tiled array of light-field cameras may be joined and arranged in order to create a continuous or nearly continuous light-field capture surface. This continuous capture surface may capture a light-field volume. The tiled array may be used to create a capture surface of any suitable shape and size.

Figure 2:
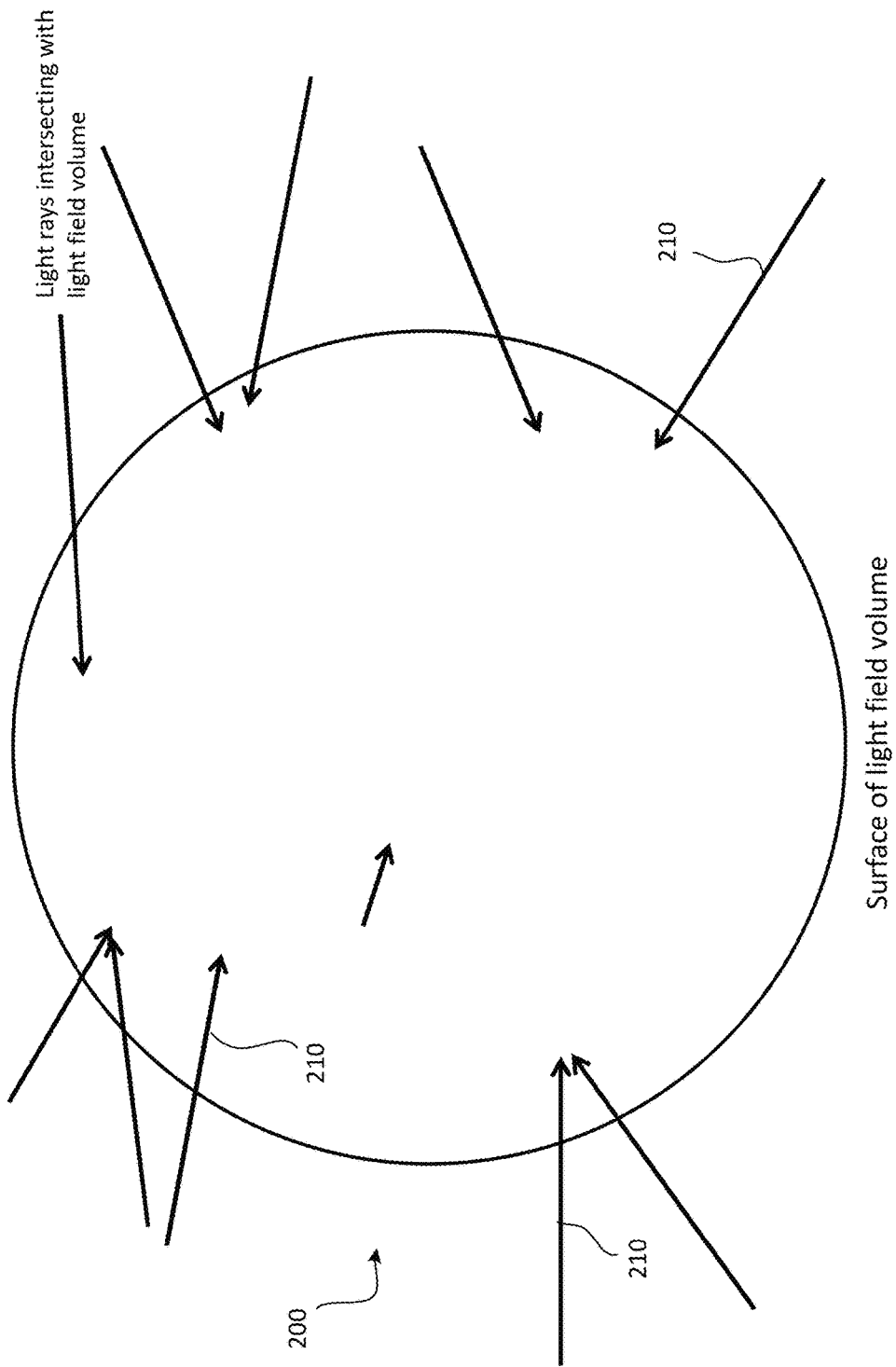
FIG. 2 is a conceptual diagram of a light-field volume, according to one embodiment.

FIG. 2 shows a conceptual diagram of a light-field volume 200, according to one embodiment. In FIG. 2, the light-field volume 200 may be considered to be a spherical volume. Rays of light 210 originating outside of the light-field volume 200 and then intersecting with the light-field volume 200 may have their color, intensity, intersection location, and direction vector recorded. In a fully sampled light-field volume, all rays and/or "ray bundles" that originate outside the light-field volume are captured and recorded. In a partially sampled light-field volume or a sparsely sampled light-field volume, a subset of the intersecting rays is recorded.

Figure 3:
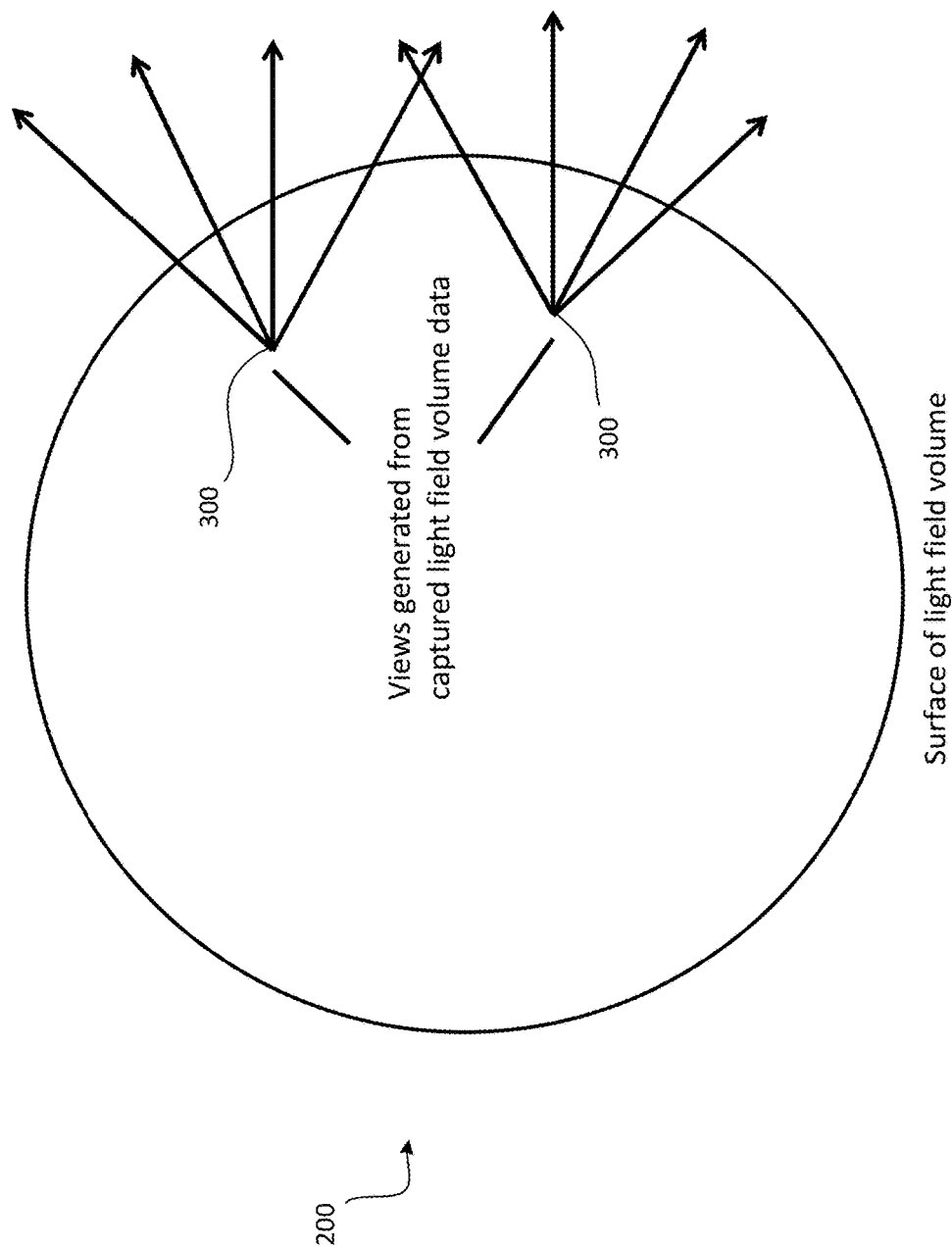
FIG. 3 is a conceptual diagram of virtual viewpoint generation from a fully sampled light-field volume.

FIG. 3 shows a conceptual diagram of virtual viewpoints, or subviews 300, that may be generated from captured light-field volume data, such as that of the light-field volume 200 of FIG. 2. The light-field volume may be a fully sampled light-field volume; hence, all rays of light entering the light-field volume 200 may have been captured. Hence, any virtual viewpoint within the light-field volume 200, facing any direction, may be generated.

In FIG. 3, two subviews 300 are generated based on two viewpoints. These subviews 300 may be presented to a viewer of a VR system that shows the subject matter captured in the light-field volume 200. One subview 300 may be generated for each of the viewer's eyes. The ability to accurately generate subviews may be limited by the sampling patterns, acceptance angles, and surface coverage of the capture system.

Figure 9:
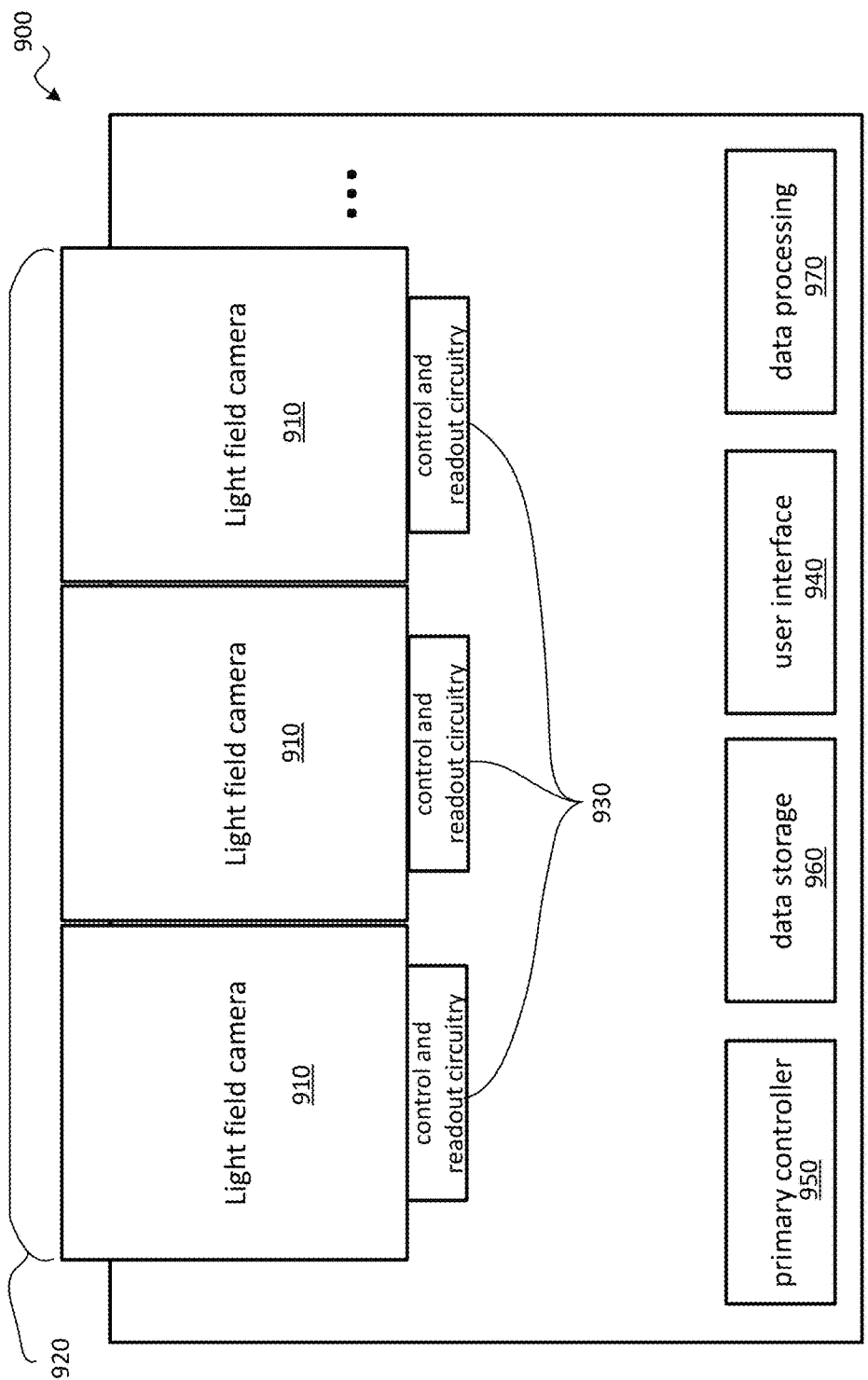
FIG. 9 is a block diagram depicting a capture system according to one embodiment.

Referring to FIG. 9, a capture system 900 is shown, according to one embodiment. The capture system 900 may contain a set of light-field cameras 910 that form a continuous or nearly continuous capture surface 920. The light-field cameras 910 may cooperate to fully or partially capture a light-field volume, such as the light-field volume 200 of FIG. 2.

For each of the light-field cameras 910, there is attached control and readout circuitry 930. This control and readout circuitry 930 may control the operation of the attached light-field camera 910, and can read captured image and/or video data from the light-field camera 910.

The capture system 900 may also have a user interface 940 for controlling the entire array. The user interface 940 may be physically attached to the remainder of the capture system 900 and/or may be remotely connected to the remainder of the capture system 900. The user interface 940 may include a graphical user interface, displays, digital controls, analog controls, and/or any other controls or feedback devices by which a user can provide input to control the operation of the capture system 900.

The capture system 900 may also have a primary controller 950 that communicates with and controls all the light-field cameras 910. The primary controller 950 may act to synchronize the light-field cameras 910 and/or control the individual light-field cameras 910 in a systematic manner.

The capture system 900 may also include data storage 960, which may include onboard and/or remote components for recording the captured video and/or image data generated by the light-field cameras 910. The data storage 960 may be physically part of the capture system 900 (for example, in hard drives, flash memory and/or RAM), removable storage (for example, arrays of SD cards and/or other removable flash storage), and/or remotely connected storage (for example, RAID storage connected wirelessly or via a wired connection).

The capture system 900 may also include data processing circuitry 970, which may process the image and/or video data as part of the capture system 900. The data processing circuitry 970 may include any type of processing circuitry, including but not limited to one or more microprocessors, ASICs, FPGA's, and/or the like. In alternative embodiments, the capture system 900 may simply collect and store raw data, which may be processed by a separate device such as a computing device with microprocessors and/or other data processing circuitry.

Figure 23:
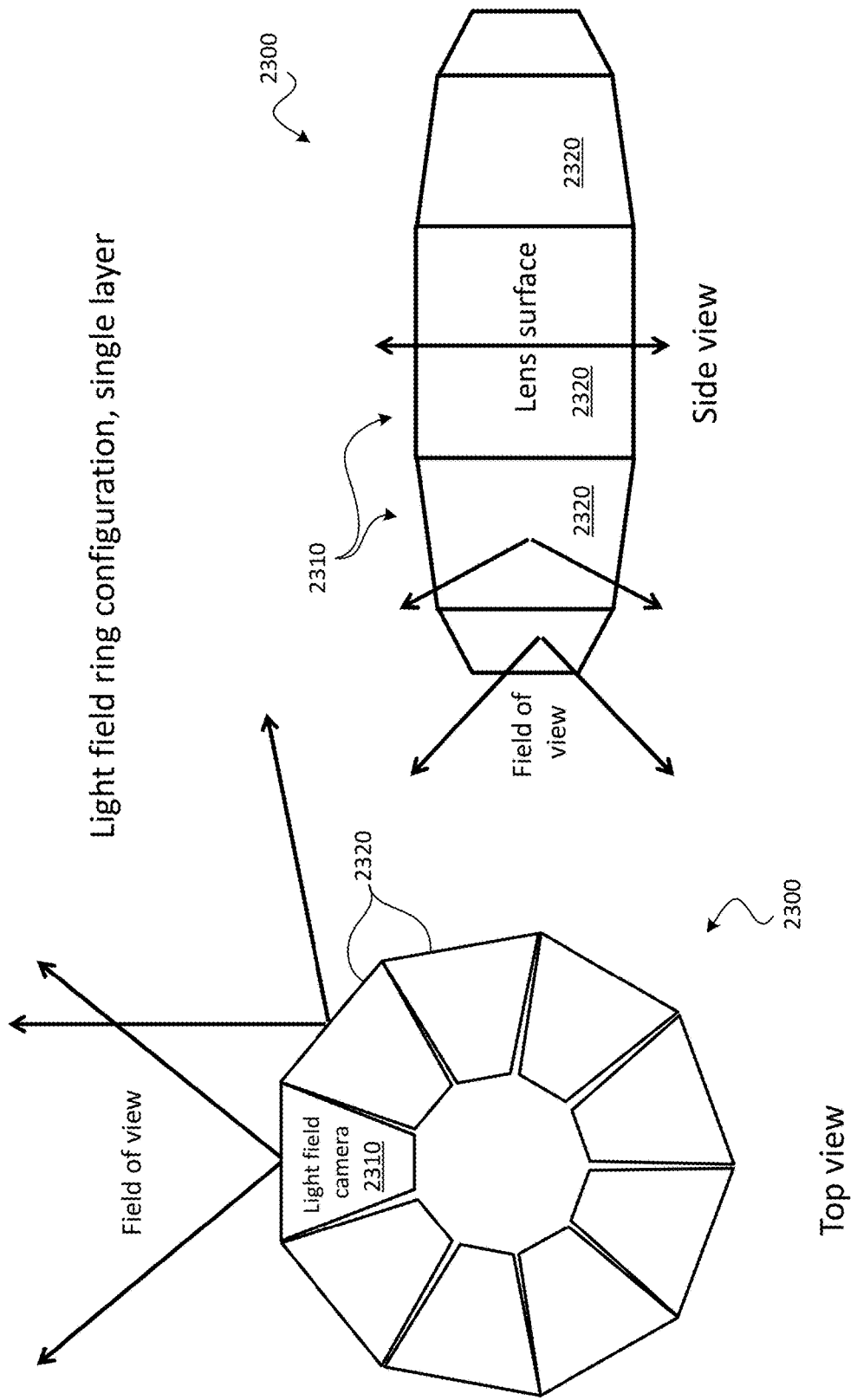
FIG. 23 is a diagram showing a tiled light-field camera array in a single layer ring configuration, according to one embodiment.

In at least one embodiment, the tiled light-field cameras 910 form an outward-facing ring. One arrangement of a tiled light-field camera array 2300 is shown in FIG. 23. In this embodiment, the tiled light-field cameras 2310 form a complete 360° ring in a single layer. Light-field cameras 2310 that neighbor each other may have overlapping fields-of-view, as shown in the top view on the left. Each of the light-field cameras 2310 may have a lens surface 2320 that is the outward-facing surface of a main lens of the light-field camera 2310. Thus, the lens surfaces 2320 may be arranged in a ring pattern.

Figure 24:
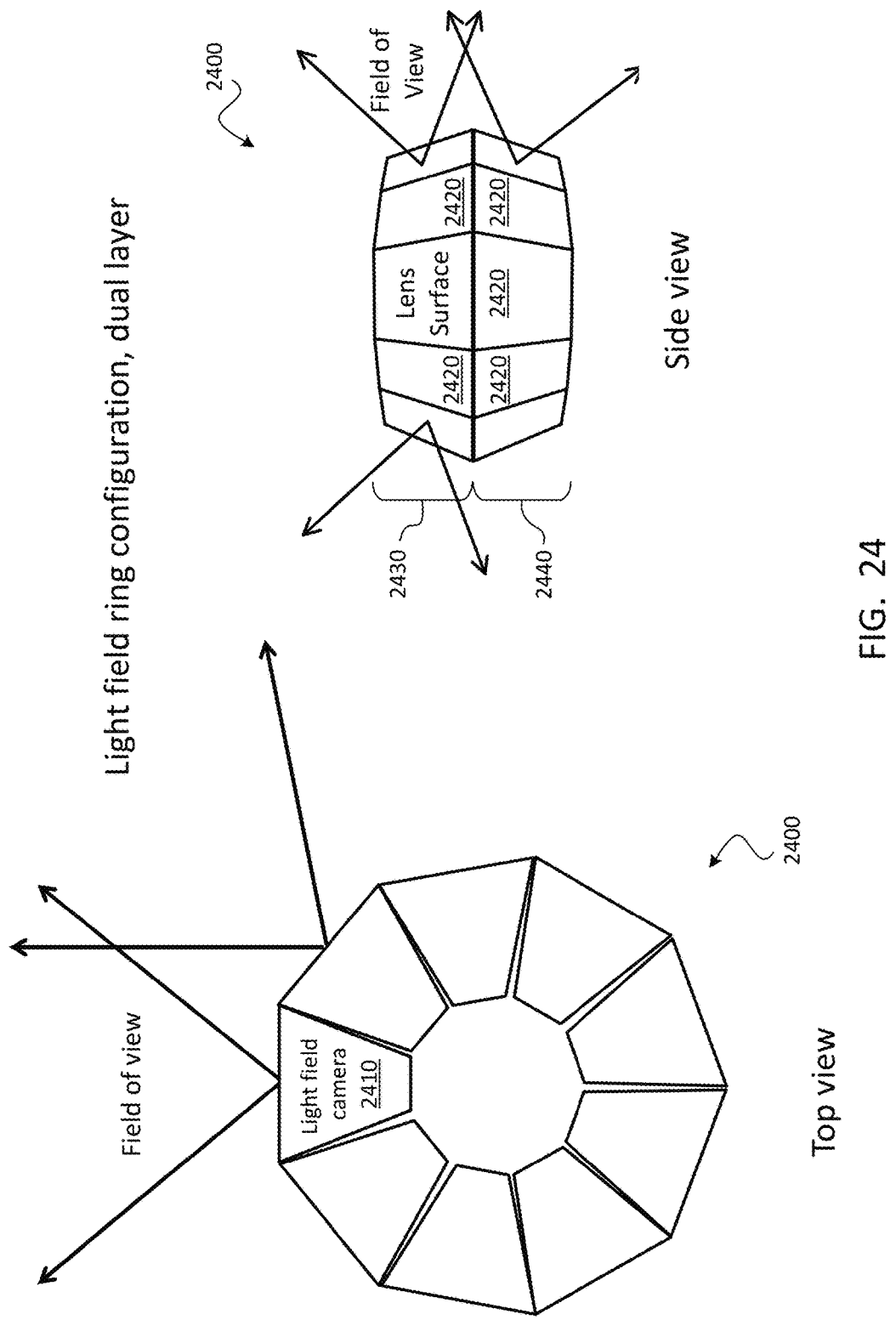
FIG. 24 is a diagram showing a tiled light-field camera array in a dual layer ring configuration, according to one embodiment.

Another arrangement of a tiled light-field camera array 2400, with 2 layers, is shown in FIG. 24. In this embodiment, light-field cameras 2410 with lens surfaces 2420 may be arranged in a top layer 2430 that captures a 360° field-of-view that faces partially "up," and in a bottom layer 2440 may capture a 360° field-of-view that faces partially "down." Light-field cameras 2410 that are adjacent to each other within the top layer 2430 or within the bottom layer 2440 may have overlapping fields-of-view, as shown in the top view on the left. Additionally or alternatively, light-field cameras 2410 of the top layer 2430 may have fields-of-view that overlap those of their adjacent counterparts in the bottom layer 2440, as shown in the side view on the right.

In FIGS. 23 and 24, nine light-field cameras 2310 or light-field cameras 2410 are shown in each layer. However, it should be understood that each layer may beneficially possess more or fewer light-field cameras 2310 or light-field cameras 2410, depending on the field-of-view applicable to each light-field camera. In addition, many other camera arrangements may be used, which may include additional numbers of layers. In some embodiments, a sufficient number of layers may be used to constitute or approach a spherical arrangement of light-field cameras.

In at least one embodiment, the tiled light-field cameras are arranged on the outward facing surface of a sphere or other volume. FIG. 11 shows possible configurations for the tiled array. Specifically, FIG. 11A shows a tiling pattern 1100 of light-field cameras that creates a cubic volume. FIG. 11B shows a tiling pattern 1120 wherein quadrilateral regions may be warped in order to approximate the surface of a sphere. FIG. 11C shows a tiling pattern 1140 based on a geodesic dome. In the tiling pattern 1140, the tile shape may alternate between pentagons and hexagons. These tiling patterns are outlined in the darker color. In all of the patterns shown, the number of tiles shown is exemplary, and the system may use any number of tiles. In addition, many other volumes and tiling patterns may be constructed.

Notably, the tiles displayed in the tiling pattern 1100, the tiling pattern 1120, and the tiling pattern 1140 represent the maximum extent of the light-field capturing surface for a single light-field camera in the tiled array. In some embodiments, the physical capture surface may closely match the tile size. In other embodiments, the physical capture surface may be substantially smaller than the tile size.

Size and Field-of-View of the Tiled Array

For many virtual reality and/or augmented reality viewing experiences, "human natural" viewing parameters are desired. In this context, "human natural" viewing parameters refer specifically to providing approximately human fields-of-view and inter-ocular distances (spacing between the eyes). Further, it is desirable that accurate image and/or video data can be generated for any viewpoint as the viewer moves his or her head.

Figure 4:
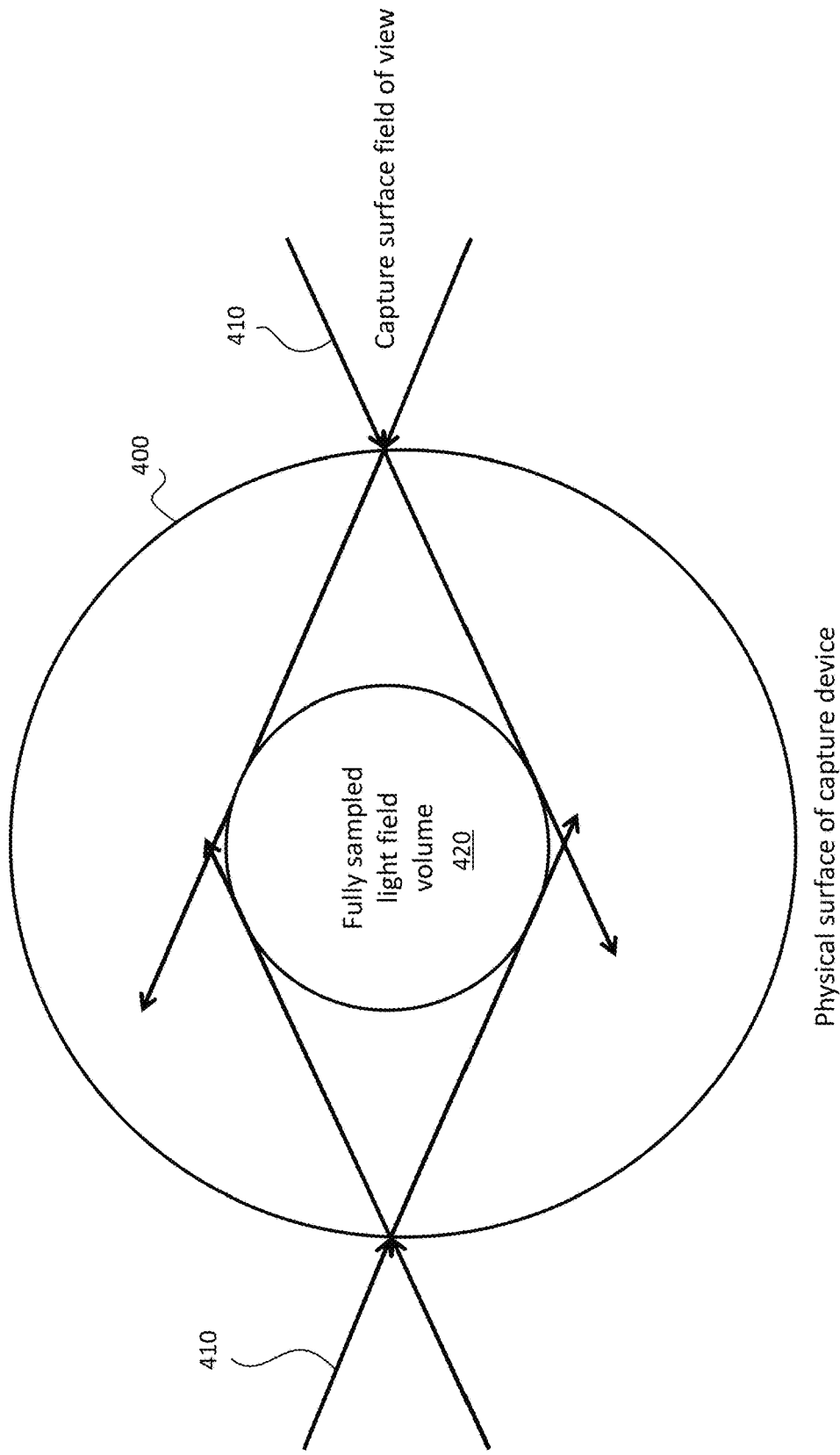
FIG. 4 is a conceptual diagram comparing the sizes of a physical capture device, capturing all incoming rays within a limited field-of-view, and the virtual size of the fully sampled light-field volume, according to one embodiment.

The physical size of the capture surface of the tiled array may be determined by the output requirements and fields-of-view of the objective lenses in the capture system. FIG. 4 conceptually shows the relationship between a physical capture surface, or capture surface 400, with an acceptance or capture surface field-of-view 410 and a virtual fully sampled light-field volume 420. A fully sampled light-field volume is a volume where all incoming rays from all directions have been captured. Within this volume (for example, the sampled light-field volume 420), any virtual viewpoint may be generated, looking any direction, with any field-of-view.

In one embodiment, the tiled array is of sufficient size and captures a sufficient field-of-view to enable generation of viewpoints that allow VR viewers to freely move their heads within a normal range of neck motion. This motion may include tilting, rotating, and/or translational motion of the head. As an example, the desired radius of such a volume may be 100 mm.

In addition, the field-of-view of the capture surface may be determined by other desired optical properties of the capture system (discussed later). As an example, the capture surface may be tiled with lenses arranged in a double Gauss or other known lens arrangement. Each lens may have an approximately 20° field-of-view half angle.

Figure 34:
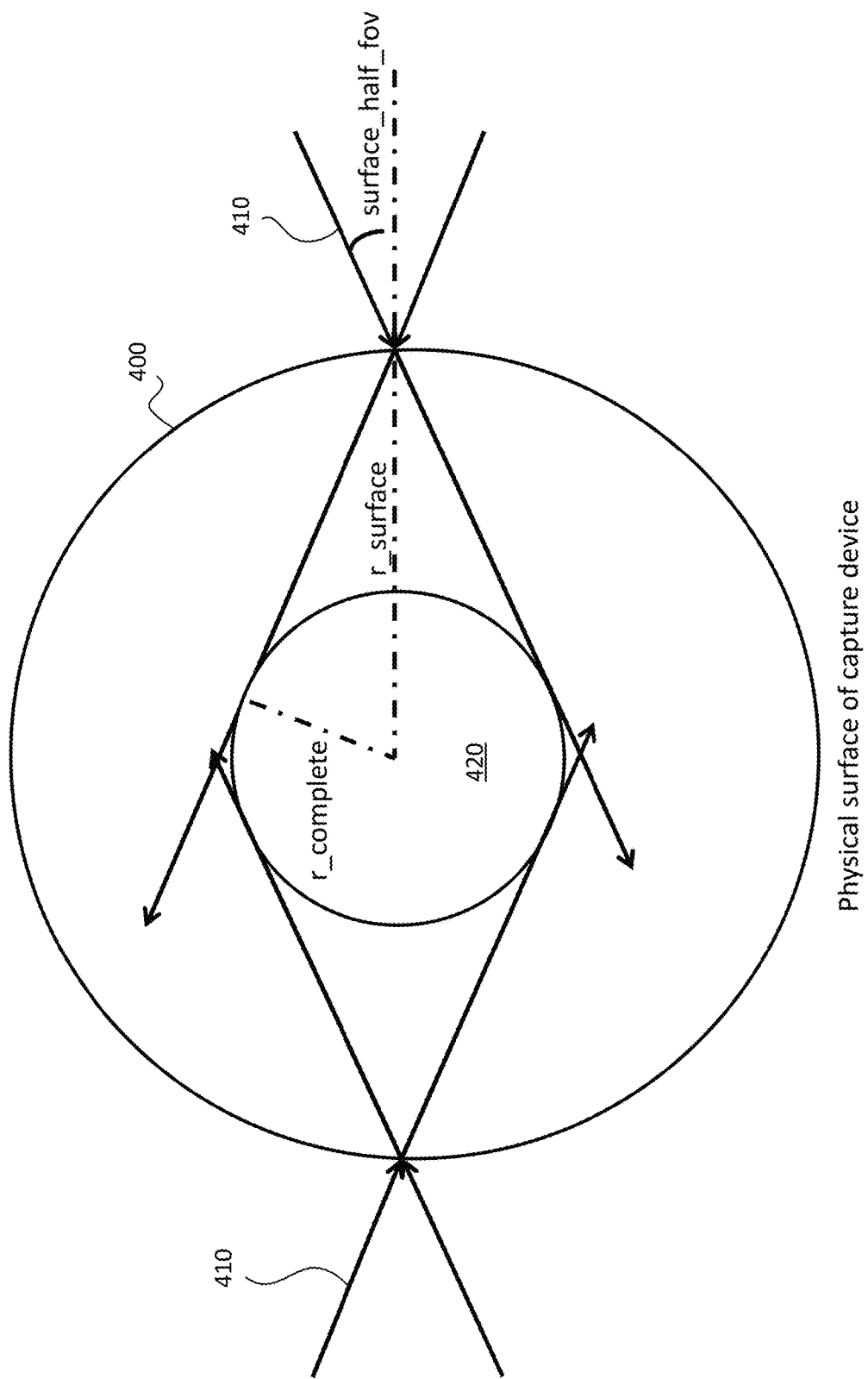
FIG. 34 is a diagram showing the relationship between the physical size and field-of-view on the capture surface to the size of a virtual fully sampled light-field volume, according to one embodiment.

Referring now to FIG. 34, it can be seen that the physical radius of the capture surface 400, r_surface, and the capture surface field-of-view half angle, surface_half_fov, may be related to the virtual radius of the fully sampled light-field volume, r_complete, by:

r_complete=r_surface*sin (surface_half_fov)

To complete the example, in at least one embodiment, the physical capture surface, or capture surface 400, may be designed to be at least 300 mm in radius in order to accommodate the system design parameters.

In another embodiment, the capture system is of sufficient size to allow users a nearly full range of motion while maintaining a sitting position. As an example, the desired radius of the fully sampled light-field volume 420 may be 500 mm. If the selected lens has a 45° field-of-view half angle, the capture surface 400 may be designed to be at least 700 mm in radius.

In one embodiment, the tiled array of light-field cameras is of sufficient size and captures sufficient field-of-view to allow viewers to look in any direction, without any consideration for translational motion. In that case, the diameter of the fully sampled light-field volume 420 may be just large enough to generate virtual views with separations large enough to accommodate normal human viewing. In one embodiment, the diameter of the fully sampled light-field volume 420 is 60 mm, providing a radius of 30 mm. In that case, using the lenses listed in the example above, the radius of the capture surface 400 may be at least 90 mm.

In other embodiments, a different limited set of freedoms may be provided to VR viewers. For example, rotation and tilt with stereo viewing may be supported, but not translational motion. In such an embodiment, it may be desirable for the radius of the capture surface to approximately match the radius of the arc traveled by an eye as a viewer turns his or her head. In addition, it may be desirable for the field-of-view on the surface of the capture system to match the field-of-view presented to each eye in the VR headset. In one embodiment, the radius of the capture surface 400 is between 75 mm and 150 mm, and the field-of-view on the surface is between 90° and 120°. This embodiment may be implemented using a tiled array of light-field cameras in which each objective lens in the objective lens array is a wide-angle lens.

Tiled Array of Plenoptic Light-Field Cameras

Many different types of cameras may be used as part of a tiled array of cameras, as described herein. In at least one embodiment, the light-field cameras in the tiled array are plenoptic light-field cameras.

Referring to FIG. 1, a plenoptic light-field camera 100 may capture a light-field using an objective lens 110, plenoptic microlens array 120, and photosensor 130. The objective lens 110 may be positioned to receive light through an aperture (not shown). Each microlens in the plenoptic microlens array 120 may create an image of the aperture on the surface of the photosensor 130. By capturing data regarding the vector at which light rays are received by the photosensor 130, the plenoptic light-field camera 100 may facilitate the generation of viewpoints within a sampled light-field volume that are not aligned with any of the camera lenses of the capture system. This will be explained in greater detail below.

Figures 25A, 25B:
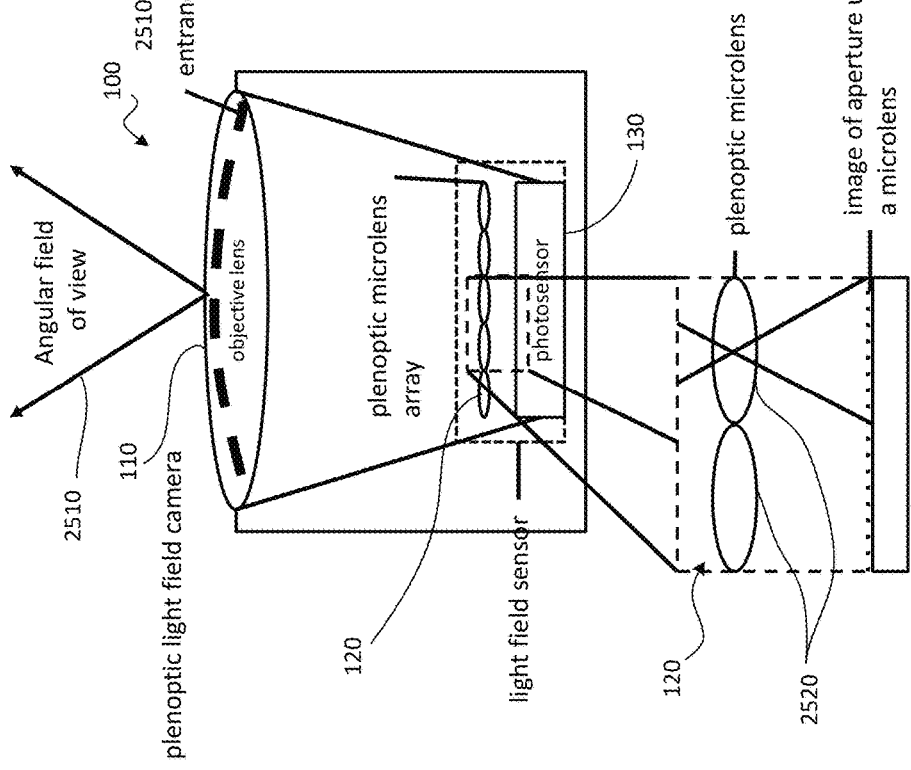
FIGS. 25A through 25B are diagrams comparing a schematic view of a plenoptic light-field camera to a virtual camera array that is approximately optically equivalent.

In order to generate physically accurate virtual views from any location on a physical capture surface such as the capture surface 400 of FIG. 4, the light-field may be captured from as much of the capture surface 400 of the capture system as possible. FIGS. 25A and 25B show the relationship between a plenoptic light-field camera such as the plenoptic light-field camera 100 of FIG. 1, and a virtual camera array 2500 that are approximately optically equivalent.

In FIG. 25A, the objective lens 110 captures light from within an angular field-of-view 2510. The objective lens 110 has an entrance pupil, the optical image of the aperture stop seen through the front of the objective lens 110. The light captured by the objective lens 110 passes through the plenoptic microlens array 120, where each microlens 2520 in the array creates an N×N pixel "disk image" on the surface of the photosensor 130. The disk image is an image of the aperture as seen by the microlens 2520 through which the disk image was received.

The plenoptic light-field camera 100 is approximately optically equivalent to a virtual camera array of N×N cameras 2530 with the same angular field-of-view 2510, with the vertex of each camera 2530 located on the surface of the entrance pupil. The size of each entrance pupil in the virtual camera array 2500 is approximately 1/Nth the size (in one dimension) of the entrance pupil of the objective lens 110. Notably, the term approximately is used in the description above, as optical aberrations and other systemic variations may result in deviations from the ideal virtual system described.

Figure 10:
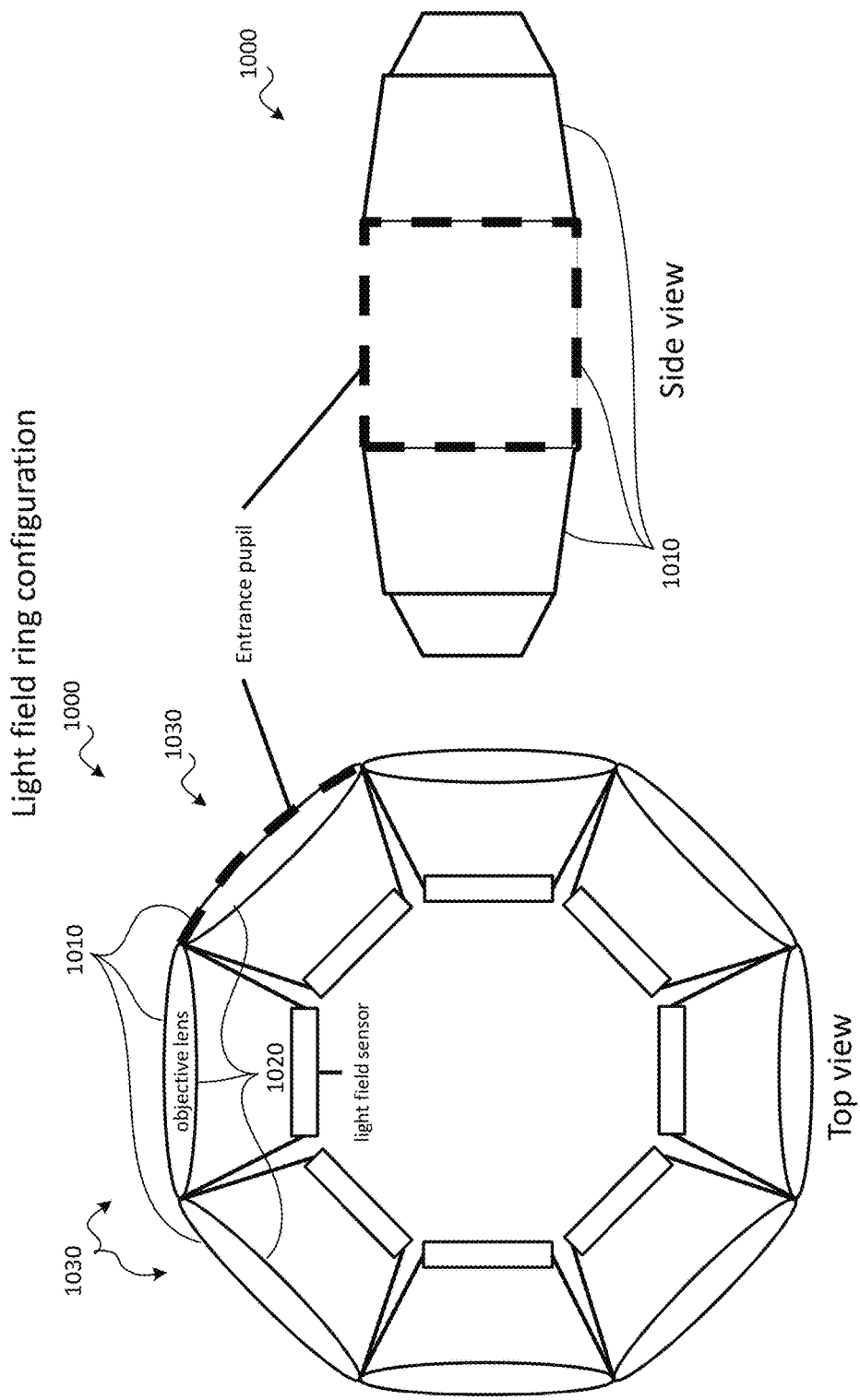
FIG. 10 is a diagram showing a tiled array in an ideal ring configuration of contiguous plenoptic light-field cameras, according to one embodiment.

In order to come as close as possible to a continuous light-field capture surface when spanning multiple cameras, the entrance pupil from one light-field camera may come as near as possible to adjoining the entrance pupil(s) from neighboring camera(s). FIG. 10 shows a tiled array 1000 in a ring configuration where the entrance pupils 1010 from the objective lenses 1020 create a gap-free surface on the tiled array 1000.

In order for the entrance pupils 1010 from neighboring objective lenses 1020 to create a nearly continuous surface, the entrance pupil 1010 may be large relative to the physical size of each light-field camera 1030 in the tiled array 1000, as shown in FIG. 10. Further, in order to provide large viewing angles in as large a volume as possible, it may be beneficial to start with a lens that has a relatively wide field-of-view. Thus, a good lens design choice may include a relatively wide field-of-view paired with a relatively large aperture (as aperture size and entrance pupil size are very closely related).

Figure 13:
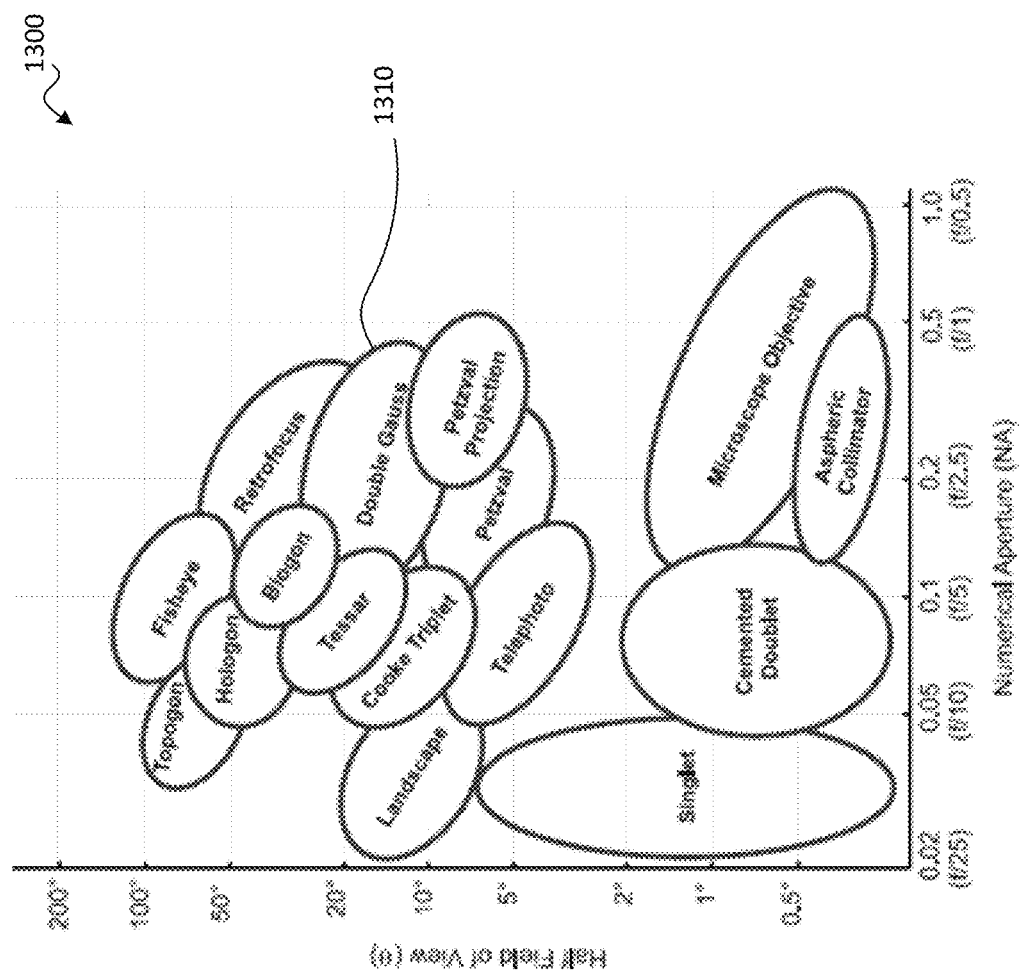
FIG. 13 is a diagram showing different basic lens designs that can be used in different embodiments, and shows typical field-of-view (FOV) and Numerical Apertures for those designs.

FIG. 13 is a diagram 1300 depicting typical fields-of-view and aperture ranges for different types of lens designs. In one embodiment, a double Gauss lens design 1310 with a low F-number is used for the objective lens. In alternative embodiments, different lens types may be used, including any of those illustrated on the diagram 1300.

Figure 14:
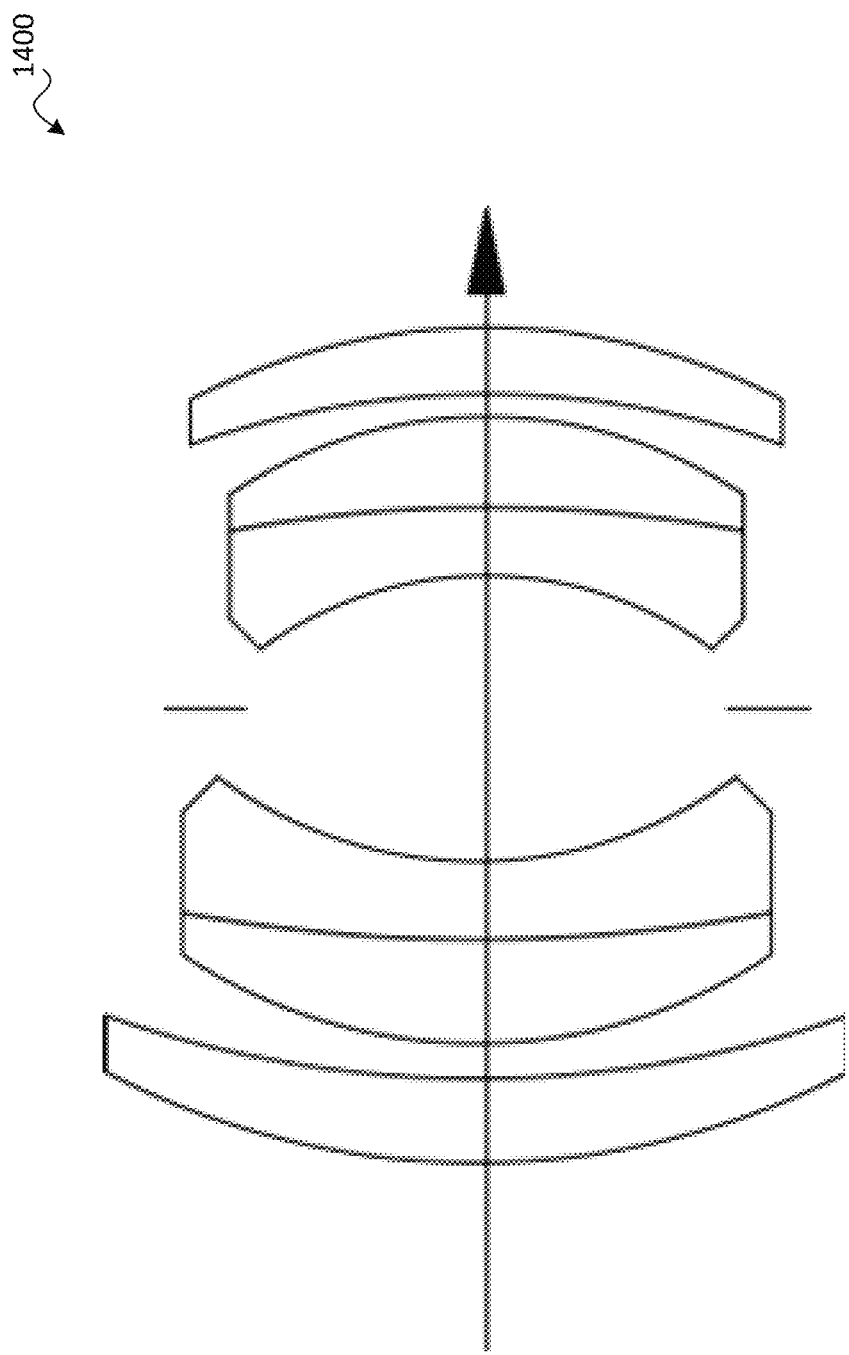
FIG. 14 is an exemplary schematic cross section diagram of a double Gauss lens design that can be used in one embodiment.

FIG. 14 shows a cross section view of a double Gauss lens design 1400 with a large aperture. Double Gauss lenses have a desirable combination of field-of-view and a potentially large entrance pupil. As an example, 50 mm lenses (for 35 mm cameras) are available at F/1.0 and below. These lenses may use an aperture stop that is greater than or equal to 50 mm on a sensor that is approximately 35 mm wide.

In one embodiment, a tiled array may have plenoptic light-field cameras in which the entrance pupil and aperture stop are rectangular and the entrance pupils of the objective lenses create a continuous or nearly continuous surface on the capture system. The aperture stop may be shaped to allow for gap-free tessellation. For example, with reference to FIG. 10, the entrance pupil 1010 may have a square or rectangular shape. Additionally, one or more lens elements may be cut (for example, squared) to allow for close bonding and to match the shape of the aperture stop. As a further optimization, the layout and packing of the microlens array, such as the plenoptic microlens array 120 of FIG. 1, may be optimized for the shape of the entrance pupil 1010. For example, the plenoptic microlens array 120 may have a square or rectangular shape and packing to match a square or rectangular shape of the entrance pupil 1010.

In one embodiment, a lens with a relatively wide field-of-view and relatively large entrance pupil is selected as the objective lens, and the lenses are spaced as closely as possible while maintaining the traditional round shape. Again, a double Gauss type lens with a large aperture may be a good choice for the objective lens.

Figure 15:
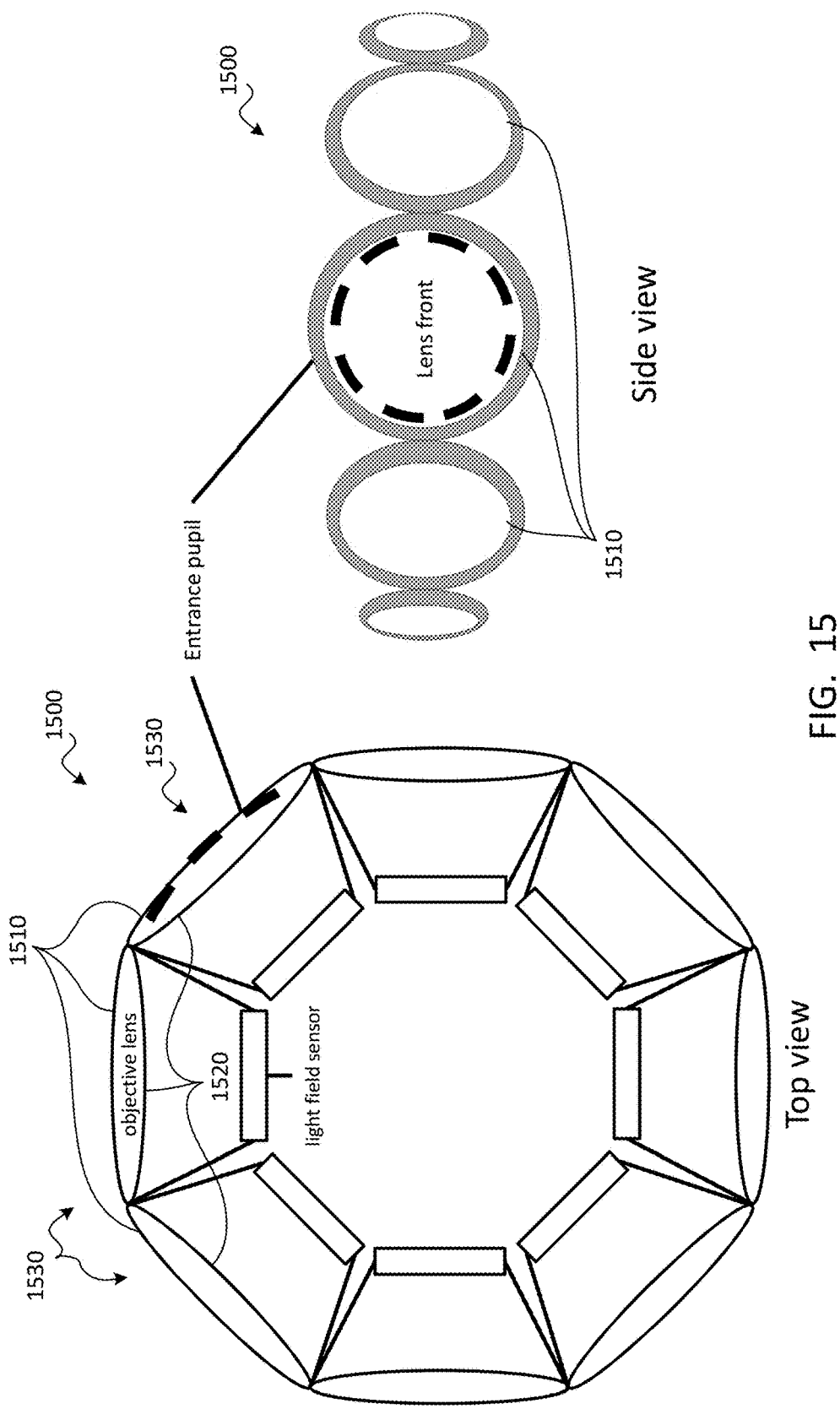
FIG. 15 is a diagram showing ring configuration of plenoptic light-field cameras with circular lenses and non-contiguous entrance pupils, according to one embodiment.

A tiled array 1500 in a ring configuration using round lenses is shown in FIG. 15. The objective lenses 1520 may be circular, along with the entrance pupils 1510 of the light-field cameras 1530. Thus, the entrance pupils 1510 may not be continuous to each other, as shown in the side view on the right-hand side. Notably, these types of objective lenses may be used in any tiling pattern. In another embodiment, the light-field cameras are arranged into a geodesic dome using two different lens diameters and the tiling pattern 1140 shown in FIG. 11C. Such an arrangement may help to minimize the spacing between the entrance pupils 1510 in order to enhance the continuity of the light-field data captured.

Figure 12:
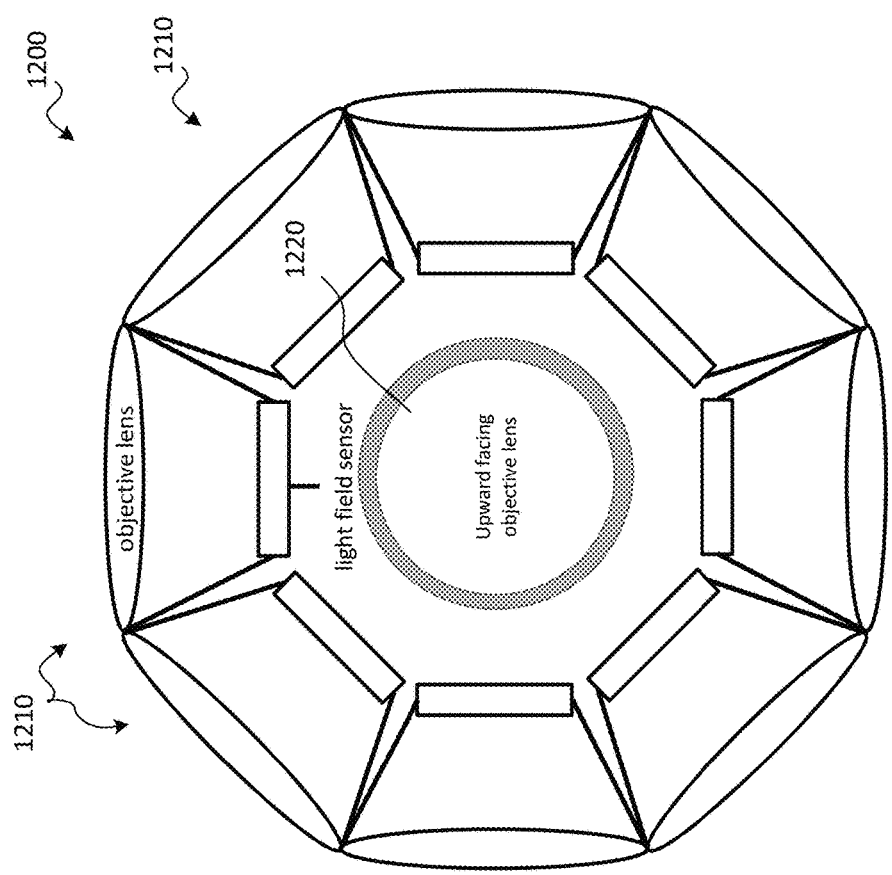
FIG. 12 is a diagram of a ring configuration with the addition of a top-facing light-field camera, according to one embodiment.

In one embodiment, one or more top and/or bottom facing cameras may be used in addition to a tiled array in a ring configuration. FIG. 12 conceptually depicts a tiled array 1200 with light-field cameras 1210 arranged in a ring-shaped pattern, with a single light-field camera 1220 facing up. Another light-field camera 1220 (not shown) may be positioned on the opposite side of the tiled array 1200 and may be oriented in a direction opposite to that of the light-field camera 1220.

Notably, the upward and/or downward facing light-field camera(s) 1220 may be standard two-dimensional camera(s), light-field camera(s) or a combination thereof. Embodiments of this type may capture highly incomplete light-field volume data directly above and below the tiled array 1200, but may offer significant savings in total system cost and/or complexity. In some circumstances, the views directly above and below the tiled array 1200 may be considered less important than other directions. For example, a viewer may not require as much detail and/or accuracy when looking up or down as when viewing images at his or her elevation.

Changing Rotational Position of the Tiled Array

In at least one embodiment, the surface of a capture system may be made to change its rotational position and capture different sets of viewpoints at different times. By changing the rotational position between frames, each successive frame may be used to capture portions of the light-field volume that may not have been captured in the previous frame.

Figure 16:
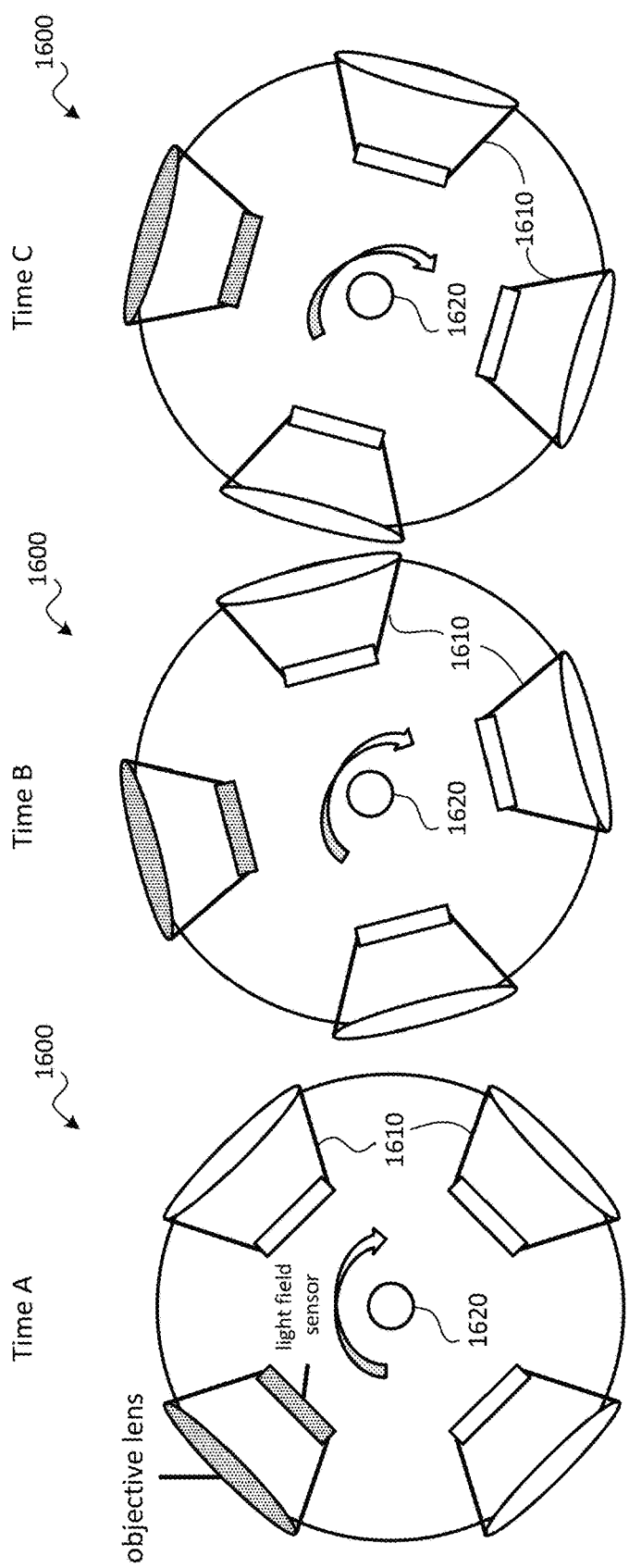
FIGS. 16A through 16C are diagrams depicting a sparsely populated light-field ring configuration that rotates, according to one embodiment.

Referring to FIGS. 16A through 16C, a sensor array 1600 may be a sparsely populated ring of plenoptic light-field cameras 1610. Each successive frame may capture a different set of angles than the previous frame.

Specifically, at time A, a portion of the light-field volume is captured. The sensor array 1600 is then rotated to the position shown at time B by rotating the ring, and another portion of the light-field volume is captured. The sensor array 1600 is rotated again, by once again rotating the ring, with another capture at time C.

This embodiment may allow for finer sampling of the light-field volume, more complete sampling of the light-field volume, and/or sampling with less physical hardware. For clarity, the embodiments with changing rotational position are displayed in a ring configuration. However, it should be recognized that the principle may be applied to any tiled configuration. Rotation may be carried out about one axis, as in FIGS. 16A through 16C, or multiple axes, if desired. A spherically tiled configuration may, for example, be rotated about all three orthogonal axes.

In one embodiment, the camera array rotates in the same direction between each capture, as in FIGS. 16A through 16C. In another embodiment, the camera array oscillates between two or more capture positions and may change the direction of rotation between captures.

For video capture, the overall frame rate of the system may be very high so that every rotational position is captured at a sufficient frame rate. As an example, if output video at 60 frames per second is desired, and the capture system uses three distinct and repeating capture positions, the overall frame capture rate, including time for positions changes, may be greater than or equal to 180 frames per second. This may enable samples to be taken at each rotational position in synchronization with the desired frame rate.

In at least one embodiment, the entire sensor array 1600 may be attached to a rotary joint, which allows the tiled array to rotate independently of the rest of the system and surroundings. The electrical connections may go through a slip ring, or rotary electrical interface, to connect rotating components in the system to non-rotating components. The rotation and/or oscillation may be driven by a motor 1620, which may be a stepper motor, DC motor, or any other suitable motor system.

Changing Rotational Position of the Light-Field Sensors

In at least one embodiment, the light-field sensors within the capture system may be rotated to capture different sets of viewpoints at different times, while the objective lenses may stay in a fixed position. By changing the rotational position of the sensors between frames, each successive frame may be used to capture portions of the light-field volume that were not captured in the previous frame.

Figure 17:
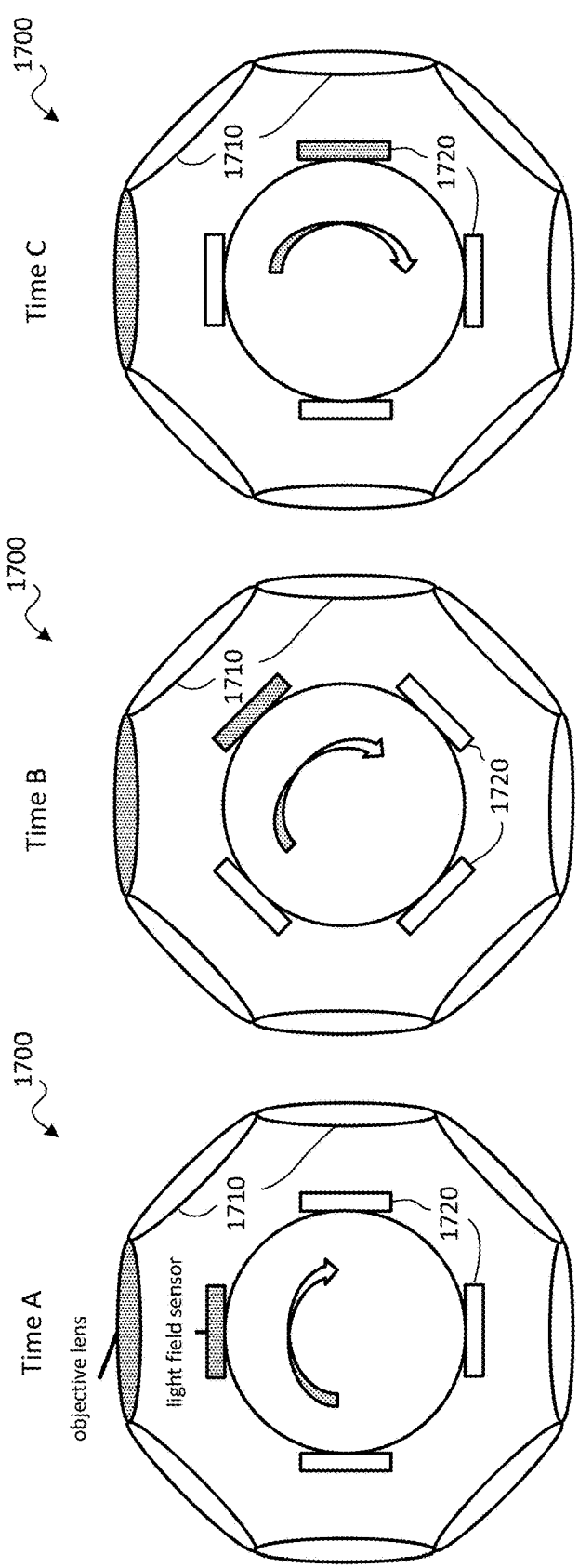
FIGS. 17A through 17C are diagrams depicting a fully populated set of lenses and sparsely populated sensors, according to one embodiment.

Referring to FIGS. 17A through 17C, a sensor array 1700 may include a ring with a full set of objective lenses 1710 with a sparse set of light-field sensors 1720. At each time of capture, the sensor array 1700 may capture images from a subset of the objective lenses 1710. The objective lenses 1710 may maintain a fixed position while the array of light-field sensors 1720 may rotate.

At time A, a portion of the light-field volume is captured that corresponds to the objective lenses 1710 that are actively used at that time (i.e., the objective lenses 1710 that are in alignment with one of the light-field sensors 1720). The light-field sensors 1720 are then rotated to the position shown at time B, and another portion of the light-field volume is captured, this time corresponding with the different set of objective lenses 1710 that are in alignment with the light-field sensors 1720. The light-field sensors 1720 are rotated again, with another capture at time C.

This embodiment may allow for finer sampling of the light-field volume, more complete sampling of the light-field volume, and/or sampling with less physical hardware. For clarity, the embodiments with changing rotational position are displayed in a ring configuration. However, it should be recognized that the principle may be applied to any tiled configuration. Rotation may be carried out about one axis, as in FIGS. 17A through 17C, or multiple axes, if desired. A spherically tiled configuration may, for example, be rotated about all three orthogonal axes.

In one embodiment, the light-field sensor array rotates in the same direction between each capture, as in FIGS. 17A through 17C. In another embodiment, the light-field sensor array may oscillate between two or more capture positions and may change the direction of rotation between captures, as in FIGS. 18A through 18C.

Figure 18:
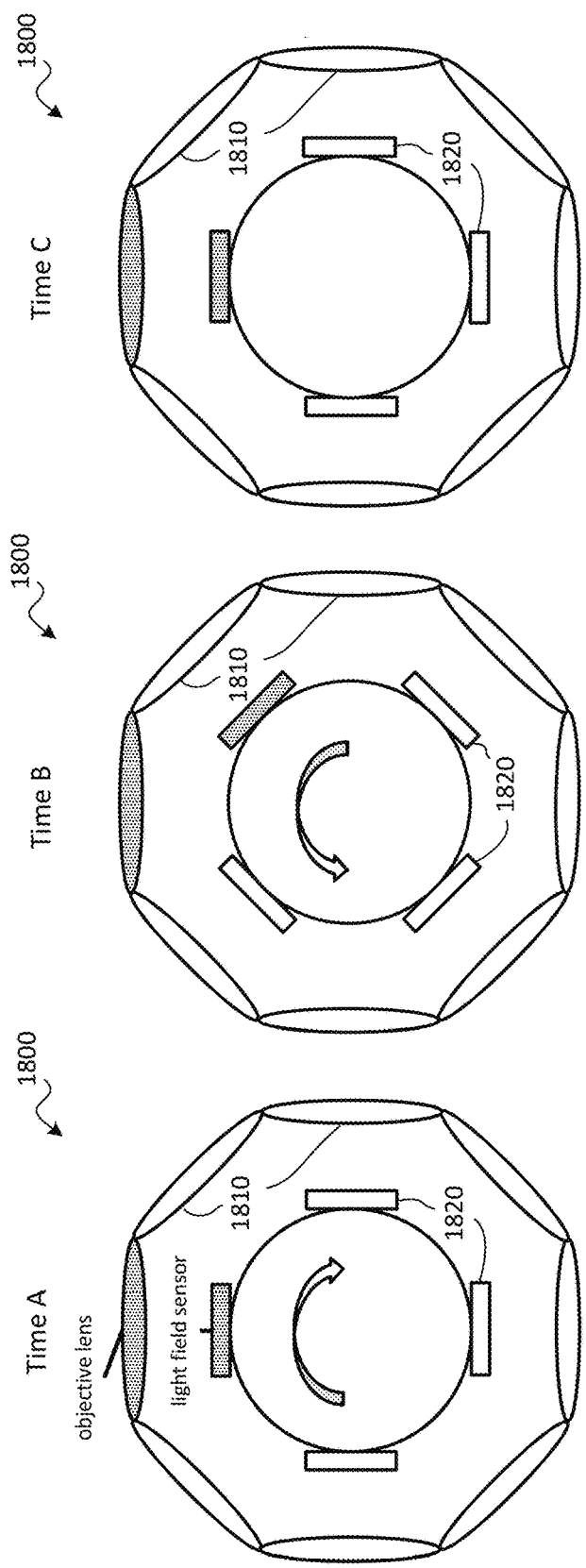
FIGS. 18A through 18C are diagrams of a fully populated set of lenses and sparsely populated sensors, according to one embodiment.

FIGS. 18A through 18C depict a sensor array 1800 that may include a ring with a full set of objective lenses 1810 with a sparse set of light-field sensors 1820, as in FIGS. 17A through 17C. Again, the objective lenses 1810 may maintain a fixed position while the array of light-field sensors 1820 rotates. However, rather than rotating in one continuous direction, the array of light-field sensors 1820 may rotate clockwise from FIG. 18A to FIG. 18B, and then counter-clockwise from FIG. 18B to FIG. 18C, returning in FIG. 18C to the relative orientation of FIG. 18A. The array of light-field sensors 1820 may thus oscillate between two or more relative positions.

In at least one embodiment, the array of light-field sensors 1720 and/or the array of light-field sensors 1820 may be attached to a rotary joint, which allows the array of light-field sensors 1720 or the array of tiled light-field sensors 1820 to rotate independently of the rest of the capture system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Tiled Array of Array Light-Field Cameras

A wide variety of cameras may be used in a tiled array according to the present disclosure. In at least one embodiment, the light-field cameras in the tiled array are array light-field cameras. One example is shown in FIG. 6.

Figure 6:
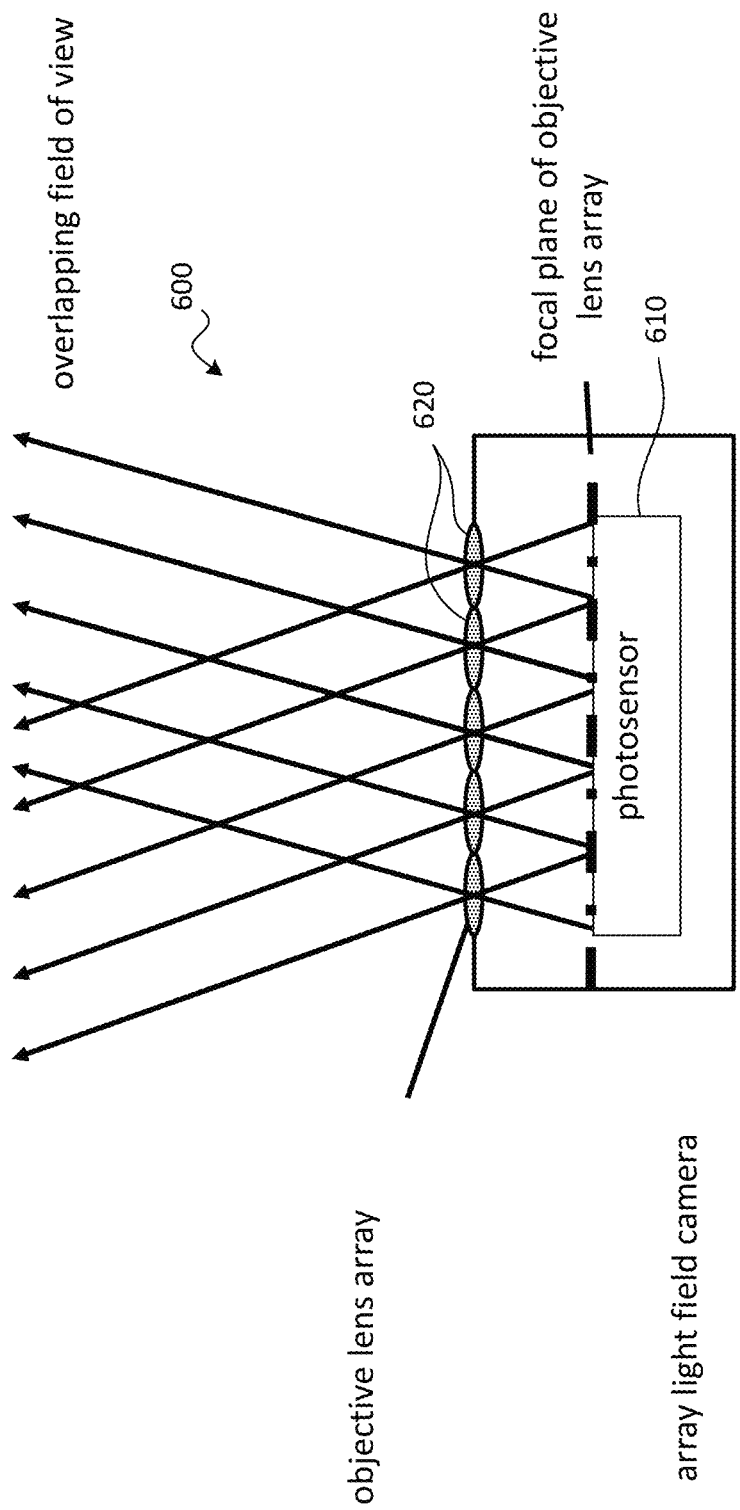
FIG. 6 is a diagram of an array light-field camera, according to one embodiment.

FIG. 6 shows the basic configuration of an array light-field camera 600 according to one embodiment. The array light-field camera 600 may include a photosensor 610 and an array of M×N objective lenses 620. Each objective lens 620 in the array may focus light onto the surface of the photosensor 610 and may have an angular field-of-view approximately equivalent to the other objective lenses 620 in the array of objective lenses 620. The fields-of-view of the objective lenses 620 may overlap as shown.

The objective lenses 620 may cooperate to capture M×N virtual viewpoints, with each virtual viewpoint corresponding to one of the objective lenses 620 in the array. Each viewpoint may be captured as a separate image. As each objective lens 620 is located at a slightly different position than the other objective lenses 620 in the array, each objective lens 620 may capture approximately the same image, but from a different point of view from those of the other objective lenses 620. Many variations of the basic design are possible, and any variation may be applied to the embodiments described below.

Figure 19:
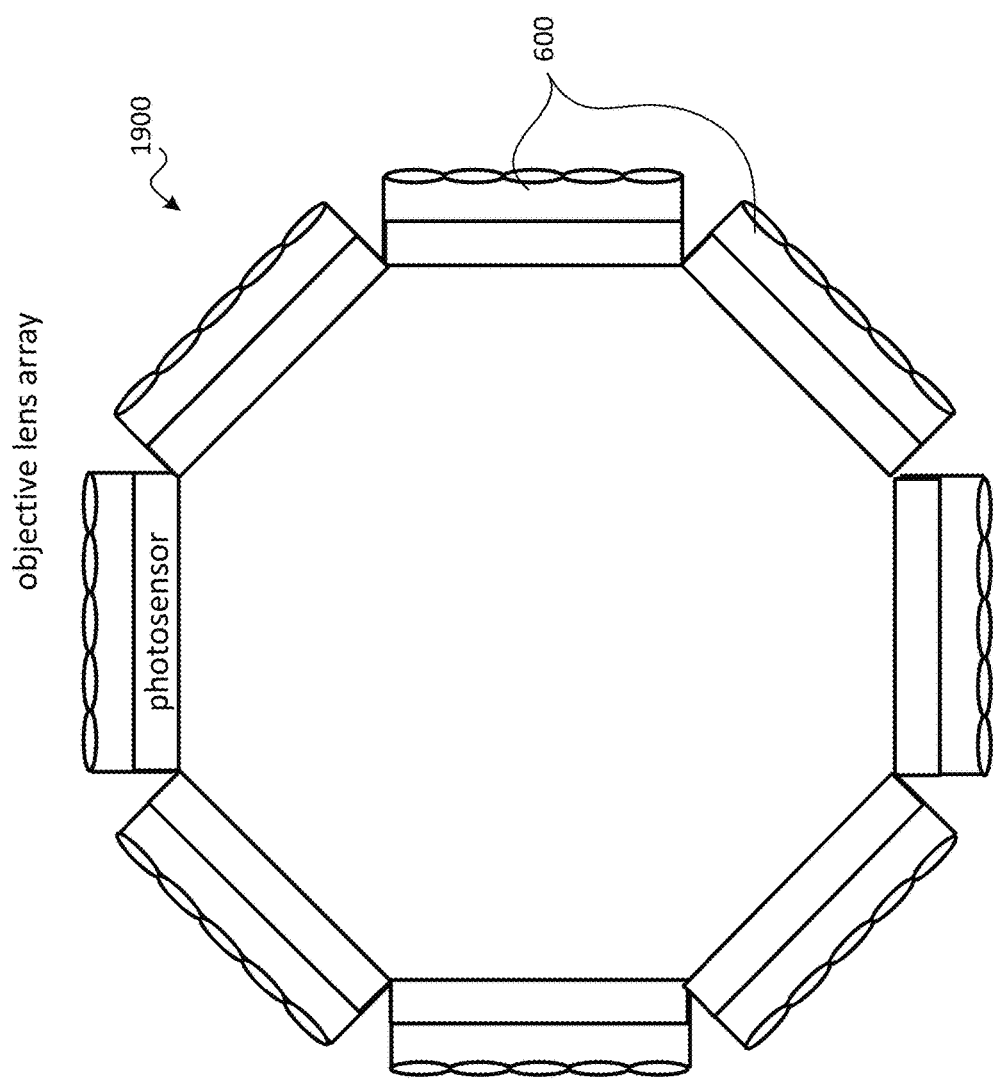
FIG. 19 is a diagram showing a ring configuration of contiguous array light-field cameras, according to one embodiment.

FIG. 19 conceptually shows how array light-field cameras 600 as in FIG. 6 may be tiled to form a nearly continuous capture surface 1900. Notably, while a ring tiling pattern is displayed in the FIG. 19, any tiling scheme may be used, including but not limited to those of FIGS. 11A, 11B, and 11C.

In one embodiment, the resolution and field-of-view of each captured subview is approximately equivalent to the desired field-of-view and resolution for later viewing. For example, if the content captured is desired to be displayed on VR headsets with resolution up to 1920×1080 pixels per eye and an angular field-of-view of 90°, each subview may capture image and/or video data using a lens with a field-of-view greater than or equal to 90° and may have a resolution greater than or equal to 1920×1080.

Changing Rotational Position of a Tiled Array of Array Light-Field Cameras

Array light-field cameras and/or components thereof may be rotated to provide more complete capture of a light-field than would be possible with stationary components. The systems and methods of FIGS. 16A through 16C, 17A through 17C, and/or 18A through 18C may be applied to array light-field cameras like the array light-field camera 600 of FIG. 6. This will be described in greater detail in connection with FIGS. 32A through 32C and FIGS. 10A through 10C.

In at least one embodiment, the surface of a capture system having array light-field cameras may be made to change its rotational position and capture different sets of viewpoints at different times. By changing the rotational position between frames, each successive frame may be used to capture portions of the light-field volume that may not have been captured in the previous frame, as in FIGS. 16A through 16C.

Figures 32A, 32B, 32C:
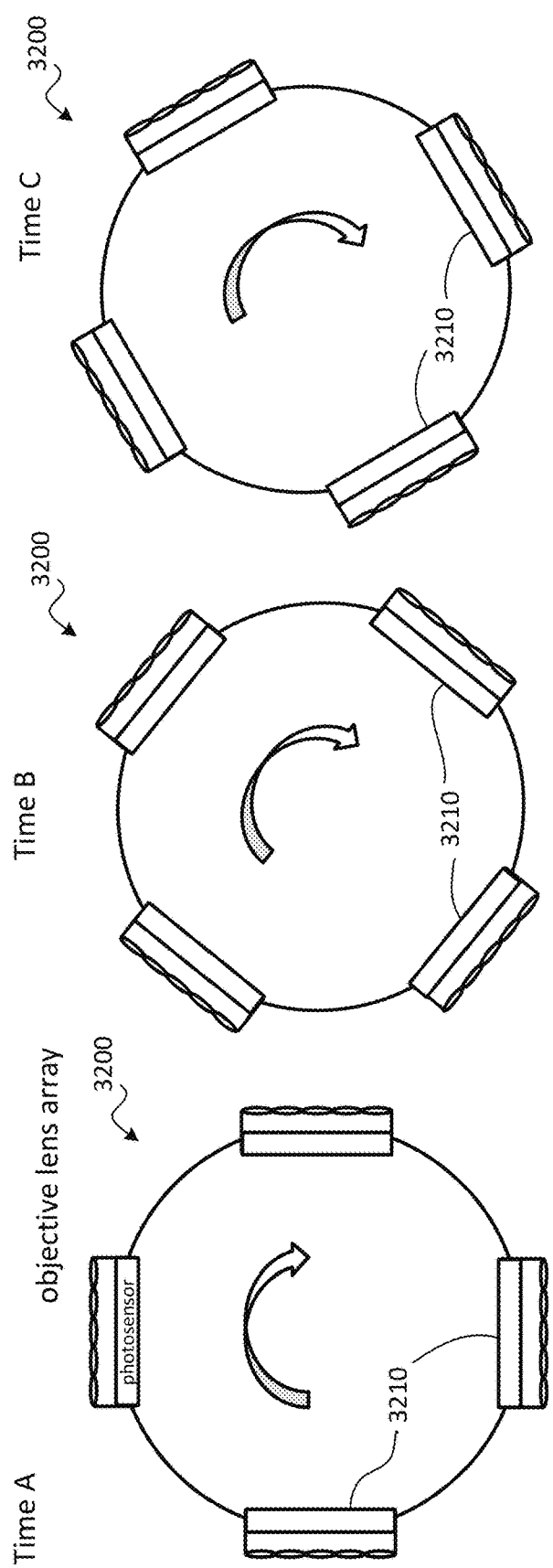
FIGS. 32A through 32C are conceptual diagrams showing a rotating sparsely populated tiled array of array light-field cameras, according to one embodiment.

Referring to FIGS. 32A through 32C, a sensor array 3200 may be a sparsely populated ring of array light-field cameras 3210. Each successive frame may capture a different set of angles than the previous frame.

Specifically, at time A, a portion of the light-field volume is captured. The sensor array 3200 is then rotated to the position shown at time B by rotating the ring, and another portion of the light-field volume is captured. The sensor array 3200 is rotated again, by once again rotating the ring, with another capture at time C.

This embodiment may allow for finer sampling of the light-field volume, more complete sampling of the light-field volume, and/or sampling with less physical hardware. Further, the benefits of the use array light-field cameras may be obtained. For clarity, the embodiments with changing rotational position are displayed in a ring configuration. However, it should be recognized that the principle may be applied to any tiled configuration. Rotation may be carried out about one axis, as in FIGS. 32A through 32C, or multiple axes, if desired. A spherically tiled configuration may, for example, be rotated about all three orthogonal axes.

In one embodiment, the array light-field camera array rotates in the same direction between each capture, as in FIGS. 32A through 32C. In another embodiment, the array light-field camera array oscillates between two or more capture positions and may change the direction of rotation between captures.

For video capture, the overall frame rate of the system may be very high so that every rotational position is captured at a sufficient frame rate. As an example, if output video at 60 frames per second is desired, and the capture system uses three distinct and repeating capture positions, the overall frame capture rate, including time for positions changes, may be greater than or equal to 180 frames per second. This may enable samples to be taken at each rotational position in synchronization with the desired frame rate.

In at least one embodiment, the entire sensor array 3200 may be attached to a rotary joint, which allows the tiled array to rotate independently of the rest of the system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Changing Rotational Position of the Photosensors of Array Light-Field Cameras

In at least one embodiment, the light-field sensors of array light-field cameras within the capture system may be rotated to capture different sets of viewpoints at different times, while the arrays of objective lenses may stay in a fixed position. By changing the rotational position of the sensors between frames, each successive frame may be used to capture portions of the light-field volume that were not captured in the previous frame.

Figure 20B:
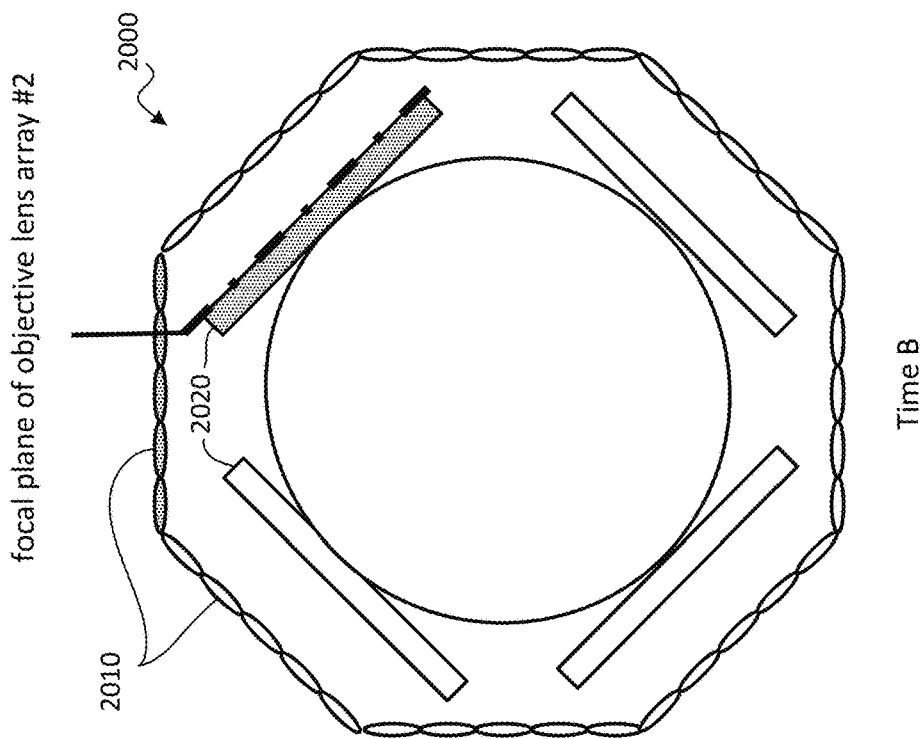
FIGS. 20A and 20B are diagrams of a fully populated set of objective lens arrays and sparsely populated sensors for array light-field cameras, according to one embodiment.
Figure 20A:
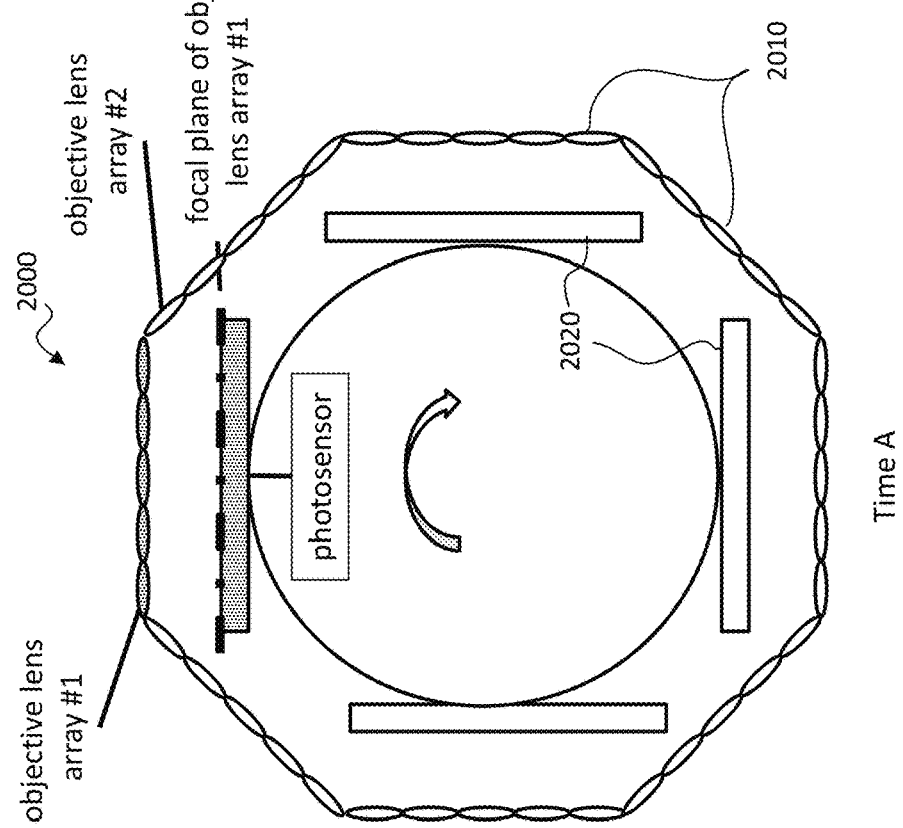

Referring to FIGS. 20A and 20B, a sensor array 2000 may include a ring with a full set of arrays of objective lenses 2010 with a sparse set of light-field sensors 2020. At each time of capture, the sensor array 2000 may capture images from a subset of the arrays of objective lenses 2010. The arrays of objective lenses 2010 may maintain a fixed position while the array of light-field sensors 2020 may rotate.

At time A, a portion of the light-field volume is captured that corresponds to the arrays of objective lenses 2010 that are actively used at that time (i.e., the arrays of objective lenses 2010 that are in alignment with one of the light-field sensors 2020). The light-field sensors 2020 are then rotated to the position shown at time B, and another portion of the light-field volume is captured, this time corresponding with the different set of arrays of objective lenses 2010 that are in alignment with the light-field sensors 2020. The light-field sensors 2020 are rotated again to once again reach the position shown at Time A, and capture may continue to oscillate between the configuration at Time A and that at time B. This may be accomplished via continuous, unidirectional rotation (as in FIGS. 17A through 17C) or via oscillating motion in which rotation reverses direction between captures, as in FIGS. 18A through 18C.

This embodiment may allow for finer sampling of the light-field volume, more complete sampling of the light-field volume, and/or sampling with less physical hardware. Further, the benefits of the use array light-field cameras may be obtained. For clarity, the embodiments with changing rotational position are displayed in a ring configuration. However, it should be recognized that the principle may be applied to any tiled configuration. Rotation may be carried out about one axis, as in FIGS. 20A and 20B, or multiple axes, if desired. A spherically tiled configuration may, for example, be rotated about all three orthogonal axes.

In at least one embodiment, the array of light-field sensors 2020 may be attached to a rotary joint, which allows the array of light-field sensors 2020 to rotate independently of the rest of the capture system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Using Fiber Optic Tapers to Reduce Gaps in Coverage

Figure 33:
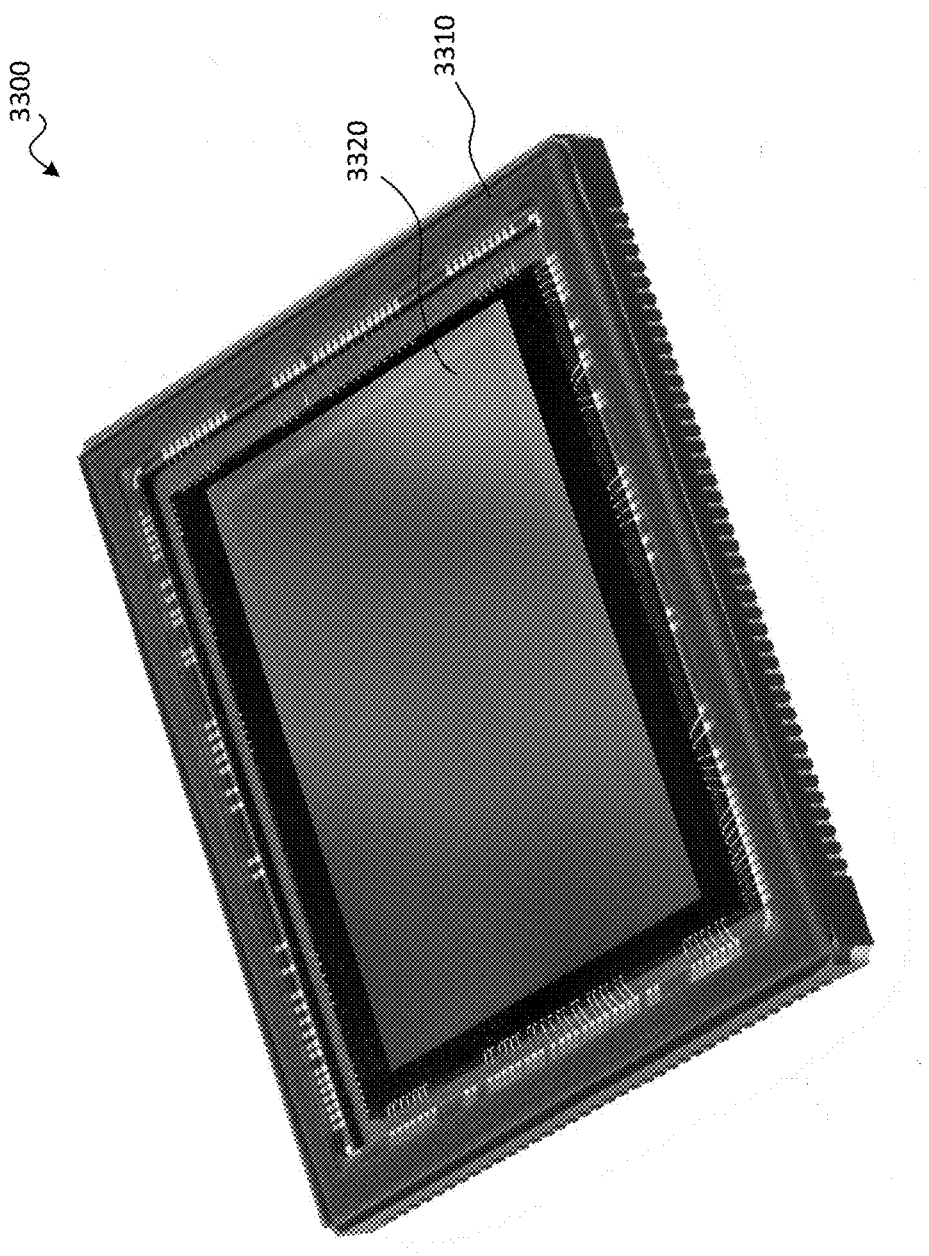
FIG. 33 is an exemplary image showing a CMOS photosensor mounted in an electronics package.

In practice, it may be difficult to tile photosensors very close to one another. FIG. 33 shows an exemplary CMOS photosensor 3300 in a ceramic package 3310. In addition to the active area 3320 on the photosensor 3300, there may be space required for inactive die surface, wire bonding, sensor housing, electronic and readout circuitry, and/or additional components. All space that is not active area is part of the package 3310 will not record photons. As a result, when there are gaps in the tiling, there may be missing information in the captured light-field volume.

In one embodiment, tapered fiber optic bundles may be used to magnify the active surface of a photosensor such as the photosensor 3300 of FIG. 33. This concept is described in detail in U.S. Provisional Application Ser. No. 62/148,055 for "Light Guided Image Plane Tiled Arrays with Dense Fiber Optic Bundles for Light-Field and High Resolution Image Acquisition" (Atty. Docket No. LYT198-PROV), filed Apr. 15, 2015, the disclosure of which is incorporated herein by reference in its entirety.

Figure 21:
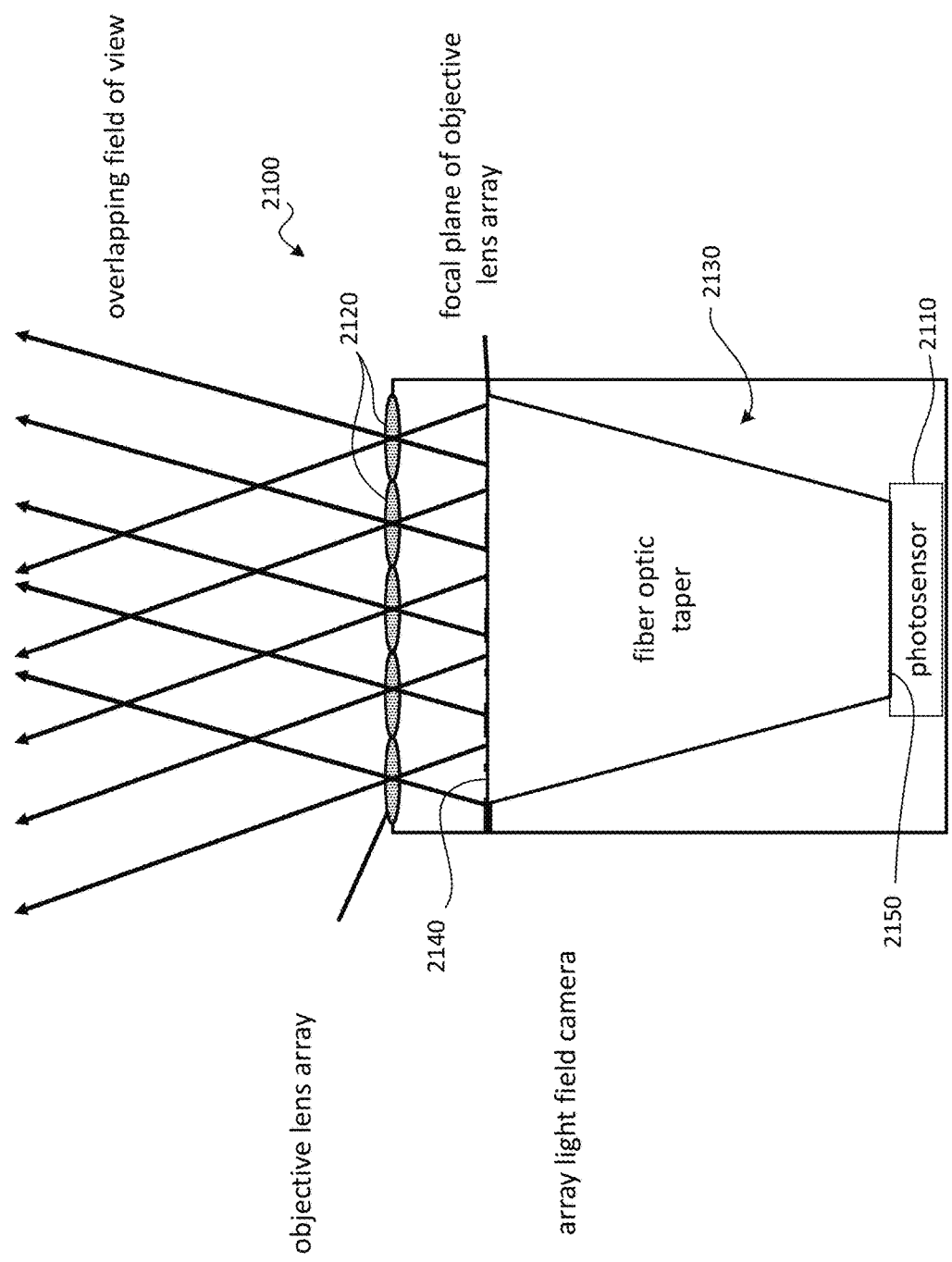
FIG. 21 is a diagram showing an array light-field camera using a tapered fiber optic bundle, according to one embodiment.

A schematic illustration is shown in FIG. 21, illustrating an array light-field camera 2100. The objective lens array 2120 focuses light on the large end 2140 of a tapered fiber optic bundle 2130. The tapered fiber optic bundle 2130 transmits the images to the photosensor 2110 and decreases the size of the images at the same time, as the images move from the large end 2140 of the tapered fiber optic bundle 2130 to the small end 2150 of the tapered fiber optic bundle 2130. By increasing the effective active surface area of the photosensor 2110, gaps in coverage between array light-field cameras 2100 in a tiled array of the array light-field cameras 2100 may be reduced. Practically, tapered fiber optic bundles with magnification ratios of approximately 3:1 may be easily acquired.

Figure 22:
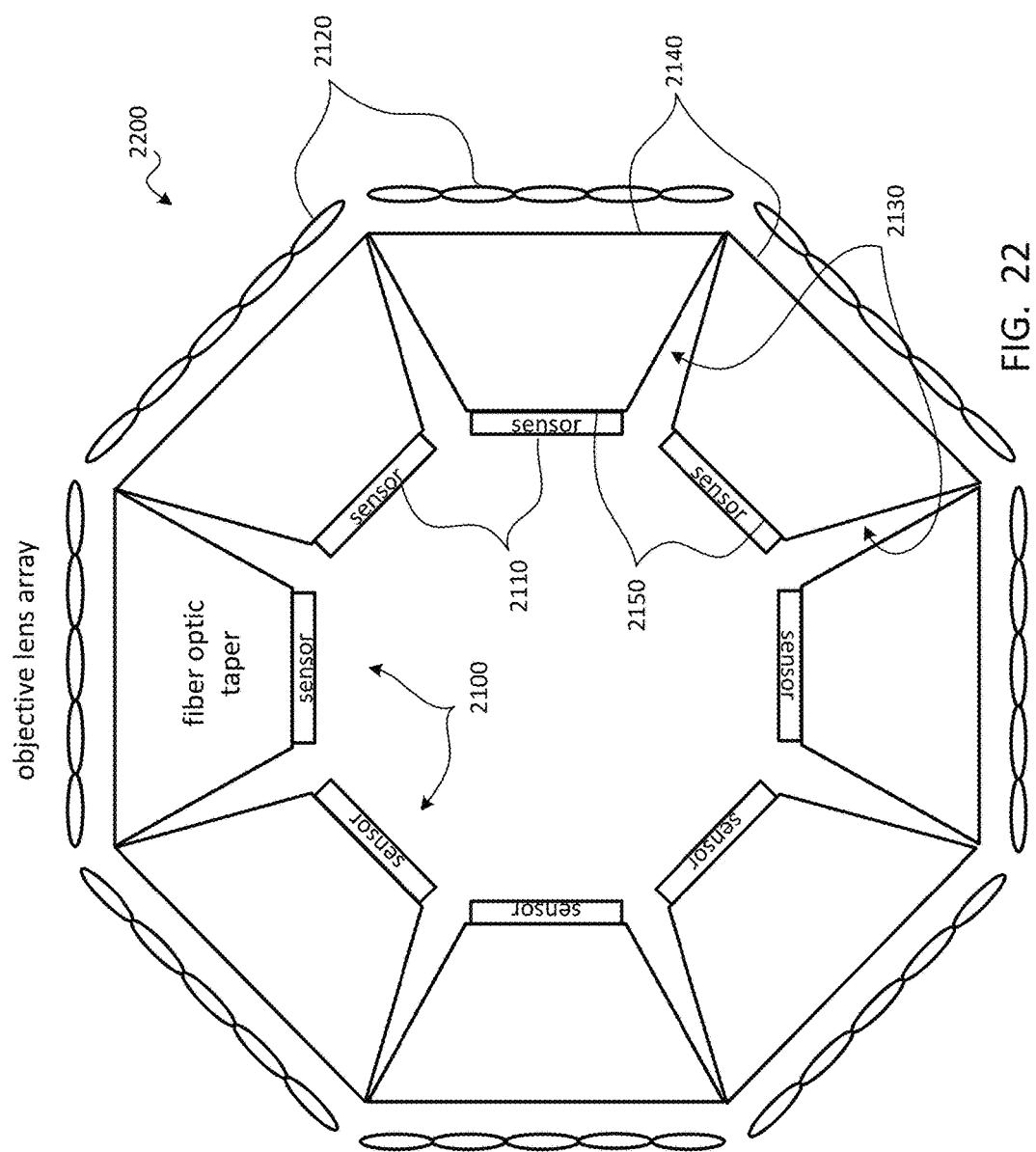
FIG. 22 is a diagram showing array light-field cameras using tapered fiber optic bundles in a ring configuration, according to one embodiment.

FIG. 22 conceptually shows how array light-field cameras using fiber optic tapers, such as the array light-field camera 2100 of FIG. 21, may be tiled to form a tiled array 2200 in a ring configuration. Usage of the tapered fiber optic bundles 2130 may increase the amount of available space between the photosensors 2110, allowing room that may be required for other purposes.

Array light-field cameras using tapered fiber optic bundles may be used to create capture surfaces that may otherwise be extremely impractical. Photosensors are generally rectangular, and customization to specific shapes and/or sizes can be extremely time and cost-intensive. In addition, tiling options using rectangles can be limited, especially when a goal is to minimize gaps in coverage. In one embodiment, the large ends of the tapered fiber optic bundles used in the tiled array are cut into a mix of precisely sized and shaped hexagons and pentagons. These tapered fiber optic bundles may then be attached to photosensors and tiled into a geodesic dome as shown in FIG. 11C. Objective lenses may be packed onto the geodesic surface as efficiently as possible. In this embodiment, each photosensor may capture image and/or video data in regions directly connected to fiber optic bundles that reach the surface of the dome (for example, resulting in pentagonal and hexagonal active areas on the photosensors). See also, the above-referenced U.S. Provisional Application No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference.

Focus, Resolution and Aperture Size

Ultimately, the resolution and maximum depth-of-field of virtual views generated from light-field volume data may be limited to the resolution and depth-of-field of the captured subviews. In typical practice, subviews in the light-field camera systems described herein have a large depth-of-field. However, as each subview captures light through an aperture with a physical size, the depth-of-field and of the subview is at least partially determined by the focus of the lens system and the size of the aperture. Additionally, the resolution of each subview is limited by the resolution of the photosensor pixels used when capturing that subview as well as the achievable resolution given the optics of the system. It may be desirable to maximize both the depth-of-field and the resolution of the subviews. In practice, the resolution and depth-of-field of the subviews may need to be balanced against the limitations of the sensor, the limitations of the available optics, the desirability of maximizing the continuity of the capture surface, and/or the desired number of physical subviews.

In at least one embodiment, the focus of the objective lenses in the capture system may be set to the hyperfocal position of the subviews given the optical system and sensor resolution. This may allow for the creation of virtual views that have sharp focus from a near distance to optical infinity.

In one embodiment of an array light-field camera, the aperture of each objective lens in the objective lens array may be reduced to increase the depth-of-field of the sub-views. In one embodiment, the aperture size may be set so that a desired close focus distance is achievable when the objective lenses have focus set to their respective hyperfocal distances.

Virtual View Generation from the Captured Light-Field Data

Once image and/or video data has been captured by the tiled array of light-field cameras, images for different virtual viewpoints may be generated. In some embodiments, two images may be generated: one for each eye. The images may be generated from viewpoints that are displaced from each other by the ordinary displacement that exists between two human eyes. This may enable the images to present the viewer with the impression of depth. Image generation may be continuous, and may occur at any frame rate, such as, for example, 24 frames per second (FPS), 30 FPS, or 60 FPS, so that the images, in sequence, define a video feed for each eye. The video feed may be generated in real time as the viewer moves his or her head. Accelerometers, position sensors, and/or other sensors may be used to detect the motion and/or position of the viewer's head; the resulting position data may be used to move the viewpoints used to generate the images in general synchronization with the viewer's movements to present the impression of immersion in the captured environment.

Coordinate Conversion from Capture to Light-Field Volume

In at least one embodiment, all pixels in all the light-field cameras in the tiled array may be mapped to light-field volume coordinates. This mapping may facilitate the generation of images for different viewpoints within the light-field volume.

Figure 5:
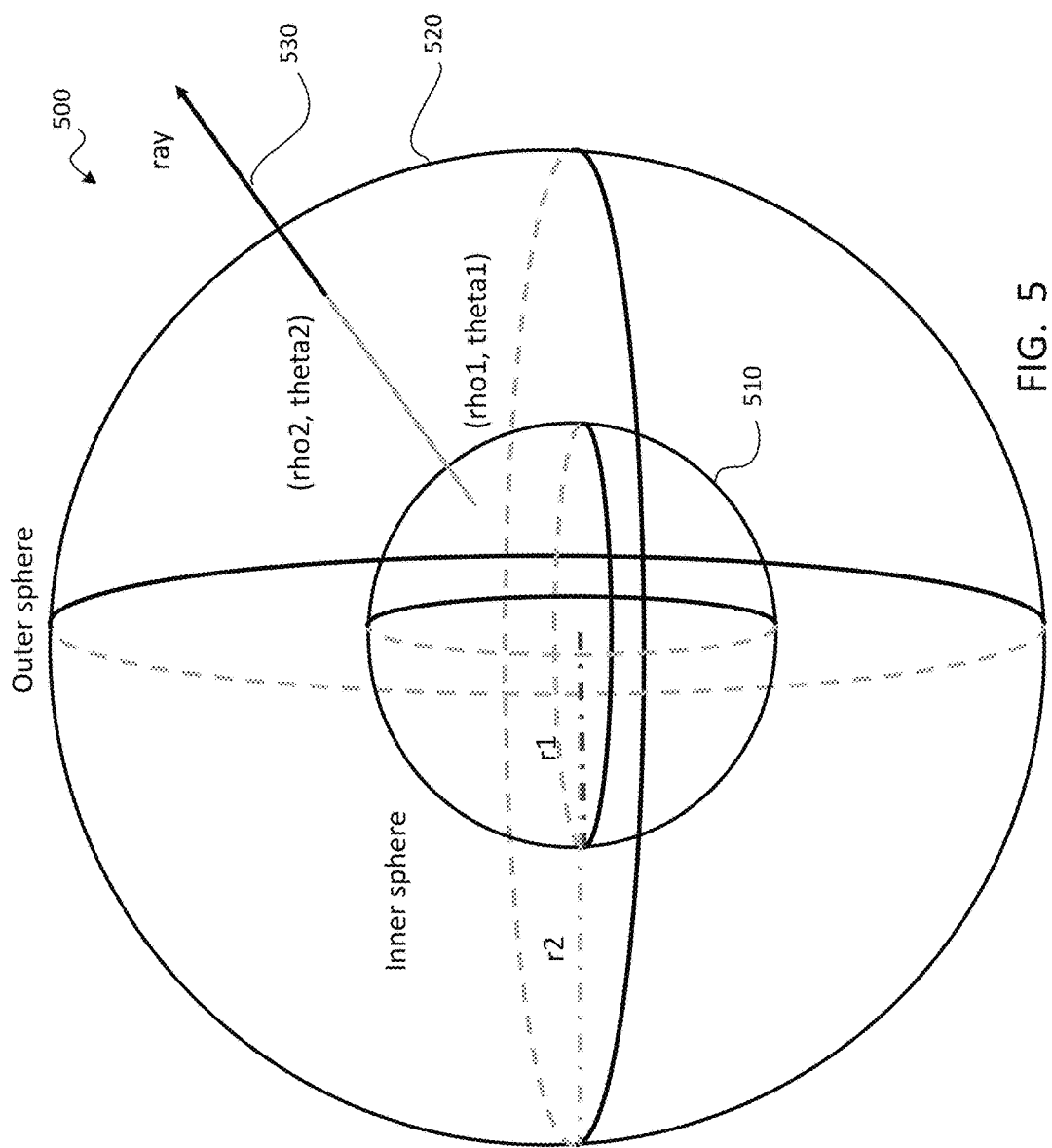
FIG. 5 is a conceptual diagram of a coordinate system for a light-field volume.

Light-field volume coordinates are shown conceptually in FIG. 5. Light-field volume coordinates are an extended version of standard light-field coordinates that may be used for panoramic and/or omnidirectional viewing, and may be expressed in terms of rho1, theta1, rho2, theta2. These variables may define a coordinate system 500 that is based on the polar coordinates of the intersection of a ray with the surface of two concentric spheres. The inner sphere 510 may have a radius r1 that is large enough to intersect with all rays of interest. Any virtual sphere that fully contains the physical capture system may be sufficient. The outer sphere 520 may be larger than the inner sphere 510. While the outer sphere 520 may be of any size larger that the inner sphere 510, it may be conceptually simplest to make the outer sphere 520 extremely large (r2 approaches infinity) so that rho2 and theta2 may often simply be treated as directional information directly.

This coordinate system 500 may be relative to the entire tiled light-field capture system. A ray 530 intersects the inner sphere 510 at (rho1, theta1) and the outer sphere 520 at (rho2, theta2). This ray 530 is considered to have the 4D coordinate (rho1, theta1, rho2, theta2).

Notably, any coordinate system may be used as long as the location and direction of all rays of interest can be assigned valid coordinates. The coordinate system 500 of FIG. 5 represents only one of many coordinate systems that may be used to describe the rays of light in a light-field volume in a manner that is global to the light-field camera array. In alternative embodiments, any other known coordinate system may be used, including but not limited to Cartesian and cylindrical coordinate systems.

The coordinate system 500 for a light-field volume may be considered to exist in a 3-dimensional Cartesian space, and the origin of the coordinate system 500 may be located at the center of the inner sphere 510 and the outer sphere 520. Coordinates may be converted from light-field volume coordinates to Cartesian coordinates by additionally taking into account the radii of the inner sphere 510 and the outer sphere 520. Notably, many rays that may be defined in Cartesian coordinates may not be able to be represented in the coordinate system 500, including all rays that do not intersect the inner sphere 510.

Conceptually, a mapping from a pixel position, indexed in a 2D array by x and y, on a camera, camera, to a light-field volume coordinate in the coordinate system 500 is a mapping function:

$$f(\text{camera}, x, y) \rightarrow (\text{rho1}, \text{theta1}, \text{rho2}, \text{theta2})$$

In practice, each pixel, microlens, and subaperture may have a physical size; as a result, each pixel may integrate light not from a single ray, but rather a "ray bundle" consisting of a narrow volume of rays. For clarity, the simplified one-pixel-to-one-ray relationship described above will be used herein. However, one skilled in the art will recognize that this mapping may be naturally extended to cover "ray bundles."

In one embodiment, the mapping function may be determined by the design of the capture system. Using a ray tracer or other optical software, a mapping from pixel coordinates to camera-centric world coordinates may be created. In one embodiment, the ray tracer traces a single, representative ray, from the center of each pixel, through the optical system, and out into the world. That representative ray may be parameterized by its intersection with the entrance pupil and direction of travel.

In another embodiment, many rays may be traced for each pixel, intersecting with the pixel in many locations and from many directions. The rays that are successfully traced from the pixel and out through the objective lens may be aggregated in some manner (for example, by averaging or fitting a ray using least squares error regression), and a representative ray may be generated. The camera-centric world coordinates may then be transformed based on the camera's location within the tiled array, into world coordinates that are consistent to all cameras in the array. Finally, each transformed ray in the consistent world coordinate space may be traced and intersections calculated for the inner and outer spheres that define the light-field volume coordinates.

In one embodiment, a calibration process may determine the mapping function after the camera is constructed. The calibration process may be used to fine-tune a previously calculated mapping function, or it may be used to fully define the mapping function.

Figure 26:
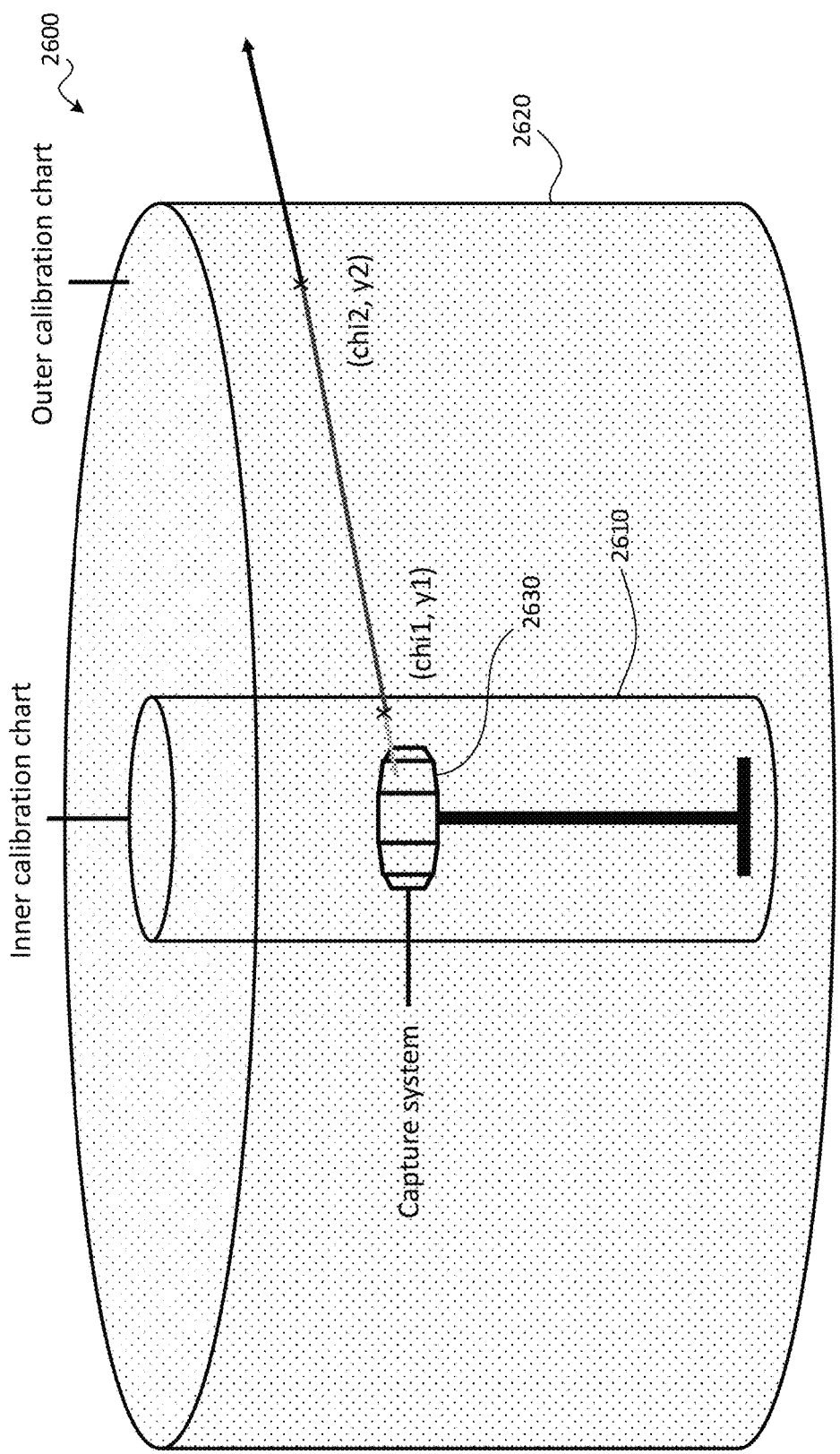
FIG. 26 is a diagram showing a possible set of two cylindrical calibration charts that may be used to calibrate a tiled light-field camera array, according to one embodiment.

FIG. 26 shows a diagram 2600 with a set of two charts that may be used to calibrate the mapping function. More specifically, the diagram 2600 includes a cylindrical inner calibration chart, or chart 2610, and a cylindrical outer calibration chart, or chart 2620. The chart 2610 and the chart 2620 are concentric and axially aligned with the capture system 2630. Each of the chart 2610 and the chart 2620 contains a pattern so that locations on images may be precisely calculated. For example, the pattern may be a grid or checkerboard pattern with periodic features that allow for global alignment.

In at least one embodiment, the capture system 2630 may be calibrated as follows:

Capture image data with the inner chart 2610 in place
For each camera in the array of the capture system 2630:
    For each subview:
        Find and register the subview with the global alignment features
        For each pixel:
            Calculate the intersection with the chart as (chi1, y1)
Remove the inner chart 2610
Capture image data with the outer chart 2620 in place
    For each subview:
        Find and register the subview with the global alignment features
        For each pixel:
            Calculate the intersection with the chart as (chi2, y2)
For each pixel:
    Trace the ray defined by (chi1, y, chi2, y2) to intersect with the inner sphere 510 in the coordinate system 500 for the light-field volume to determine (rho1, theta1).
    Trace the ray defined by (chi1, y, chi2, y2) to intersect with the outer sphere 520 in the coordinate system 500 for the light-field volume to determine (rho2, theta2).

Notably, the size and shapes of the chart 2610 and the chart 2620 may be varied to include spherical charts, cubic charts, or any other type of surface or combination thereof. Different chart types may be more readily adapted to different coordinate systems.

Virtual View Generation from Light-Field Volume Data

Images for virtual reality viewing may be generated from the light-field volume data. These images will be referred to as "virtual views." To create a virtual view, a virtual lens, virtual focus position, virtual field-of-view and virtual sensor may be used.

In at least one embodiment, a virtual lens may be centered at the location of the desired virtual viewpoint. The virtual lens may contain a virtual aperture that may have any shape or size, and these characteristics may partially determine the depth-of-field and bokeh of the virtual view. The virtual focus position and virtual field-of-view of the lens may jointly define a region that will be visible and "in focus" after reconstruction. Notably, the focus and resolution are ultimately limited by the focus and resolution of the capture system, so it is possible to reconstruct an image on a virtual focal plane where nothing is really in focus. The virtual sensor may have the same resolution as the desired output resolution for the virtual view.

Figure 28:
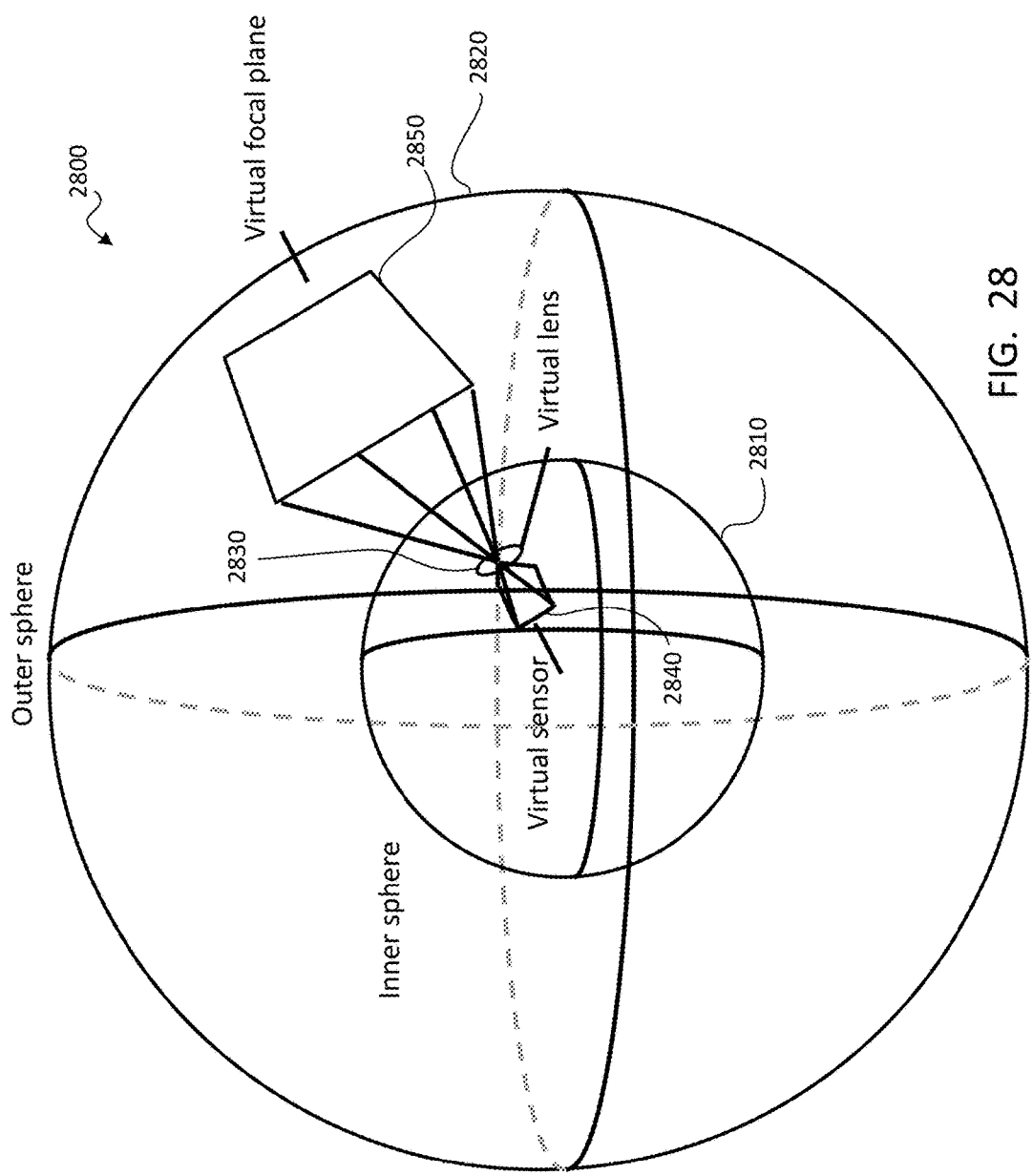
FIG. 28 is a conceptual drawing showing a virtual camera system and field-of-view that may be used to generate virtual views, according to one embodiment.

In one embodiment, a virtual camera system may be used to generate the virtual view. This embodiment is conceptually shown in FIG. 28, in connection with a coordinate system 2800 having an inner sphere 2810 and an outer sphere 2820. The virtual camera system may have a virtual lens 2830 and a virtual sensor 2840 that can be used to generate the virtual view. The configuration of the virtual lens 2830 may determine a virtual focal plane 2850 with a virtual field-of-view.

Figure 29:
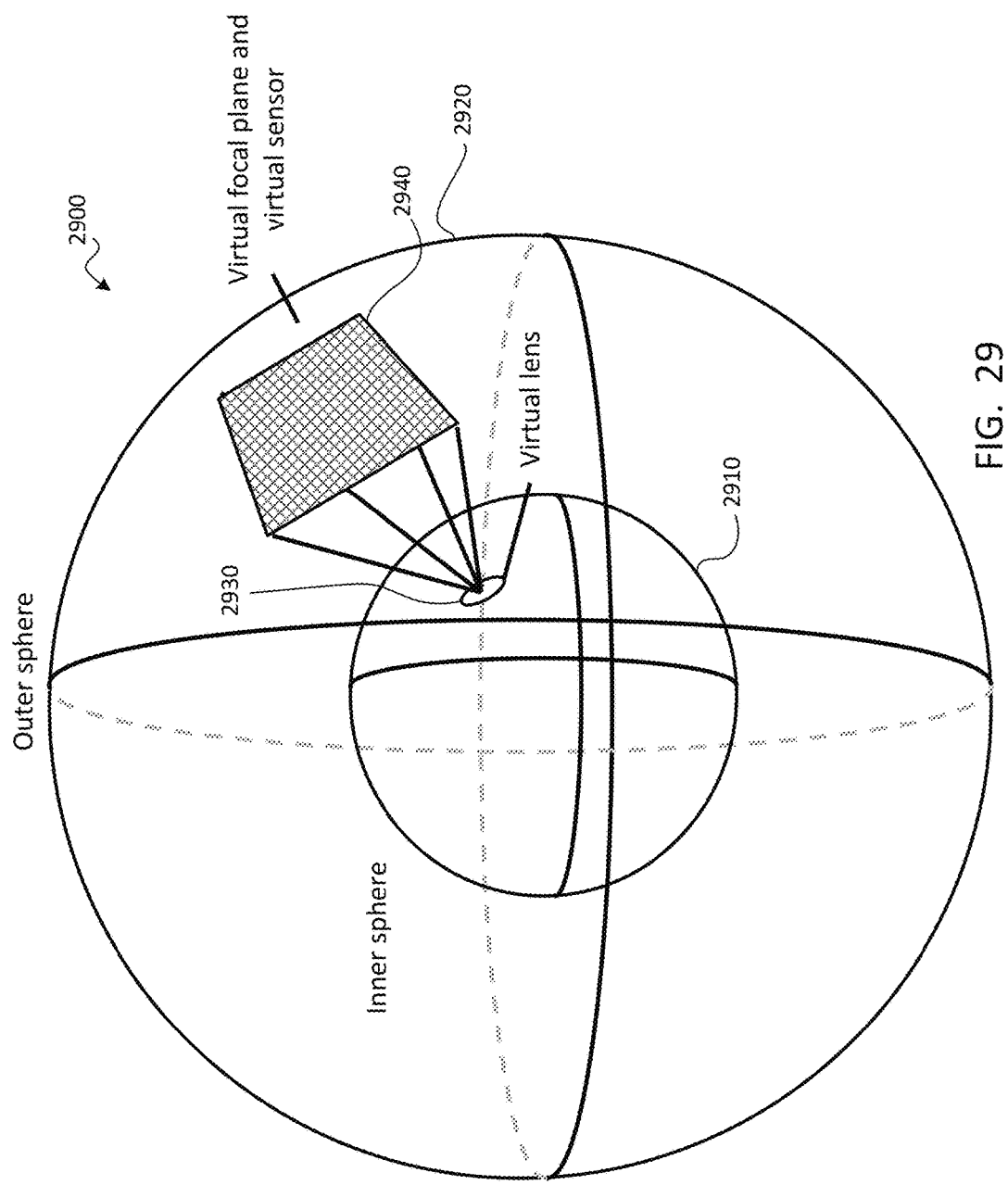
FIG. 29 is a conceptual drawing showing a coordinate system with a virtual camera system based on an ideal lens, according to one embodiment.

In one embodiment, an ideal lens is assumed, and the virtual setup may be simplified. This embodiment is conceptually shown in FIG. 29, in connection with a coordinate system 2900 having an inner sphere 2910 and an outer sphere 2920. In this simplified model, the sensor pixels may be mapped directly onto the surface of the focal plane and more complicated ray tracing may be avoided.

Specifically, the lens may be geometrically simplified to a surface (for example, a circular disc) to define a virtual lens 2930 in three-dimensional Cartesian space. The virtual lens 2930 may represent the aperture of the ideal lens. The virtual field-of-view and virtual focus distance, when taken together, define an "in focus" surface in three-dimensional Cartesian space with the same aspect ratio as the virtual sensor. A virtual sensor 2940 may be mapped to the "in focus" surface.

The following example assumes a set of captured rays parameterized in light-field volume coordinates, rays, a circular virtual aperture, va, a rectangular virtual sensor with width w and height h, and rectangular "in focus" surface, fs. An algorithm to create the virtual view may then be the following:

```
view_image = new Image(w, h)
view_image.clear( )
for each ray in rays
    cart_ray = convert_to_cartesian3d(ray)
    if (intersects(cart_ray, va) && intersects(cart_ray, fs))
        point = intersection(cart_ray, fs)
        norm_point = normalize_point_relative_to(fs)
        sensor_x = norm_point.x * w
        sensor_y = norm_point.y * h
        accumulate(view_image, x, y, ray.color)
``` where:
intersects returns true if the supplied ray intersects with the surface
intersection returns the location, in Cartesian coordinates, of intersection
normalize_point_relative_to normalizes a Cartesian 3D point into a normalized 2D location on the provided surface. Values are in x = [0, 1] and y = [0, 1]
accumulate accumulates the color values assigned to the ray into the image. This method may use any sort of interpolation, including nearest neighbor, bilinear, bicubic, or any other method.

Figure 30:
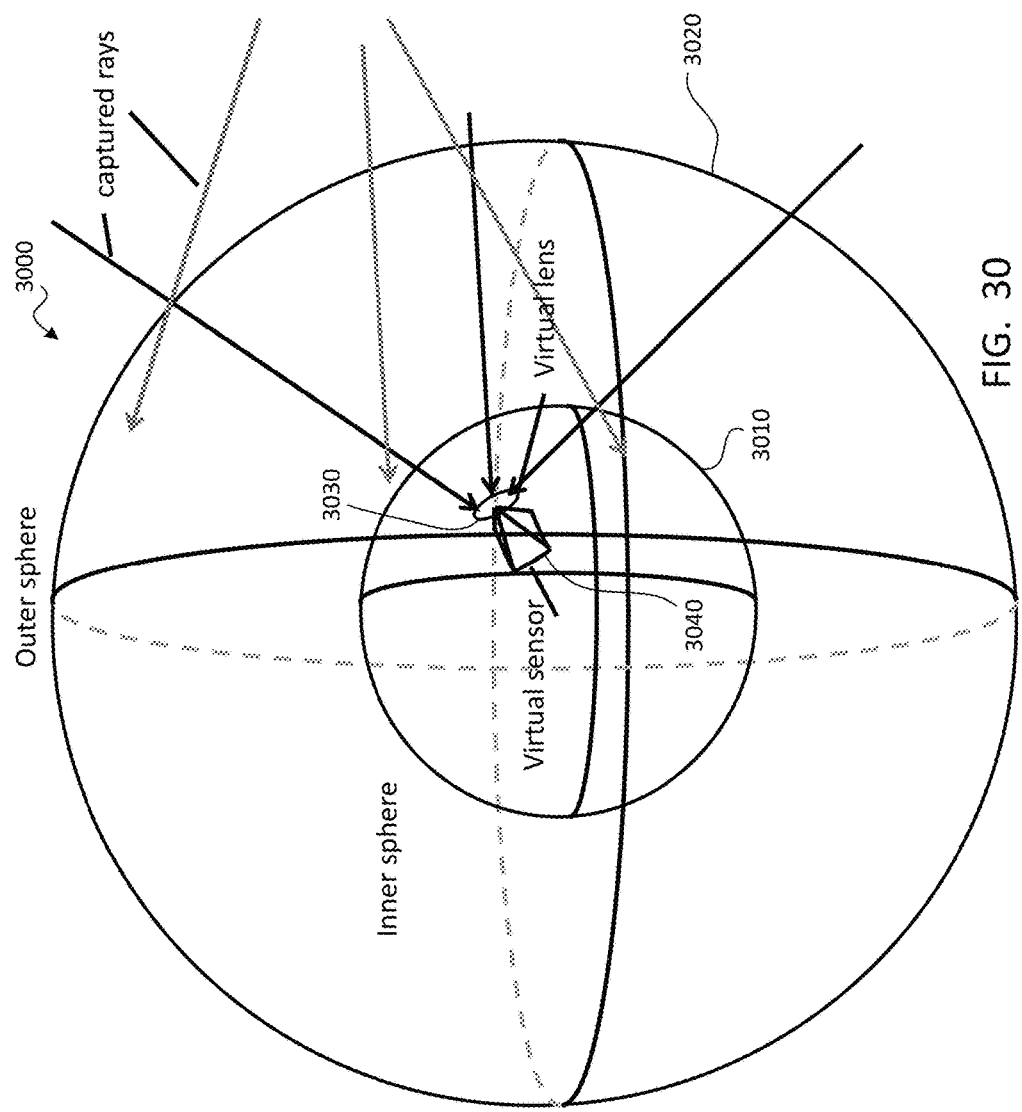
FIG. 30 is a conceptual drawing showing a virtual camera system based on a more complete model of a virtual lens, according to one embodiment.

In another embodiment, the virtual lens and/or the virtual sensor may be fully modeled as a more complete optical system. This embodiment is conceptually shown in FIG. 30, which illustrates modeling in the context of a coordinate system 3000 having an inner sphere 3010 and an outer sphere 3020. The embodiment may consist of a virtual sensor 3040 and a virtual lens 3030, each with size and shape in Cartesian coordinates. In this case, rays in the captured light-field volume may be traced through the virtual lens 3030 and ultimately intersected (or not) with the virtual sensor 3040.

The virtual sensor 3040 may consist of virtual optical components, including one or more virtual lenses, virtual reflectors, a virtual aperture stop, and/or additional components or aspects for modeling. In this embodiment, rays that intersect with the entrance to the virtual lens 3030 may be optically traced through the virtual lens 3030 and onto the surface of the virtual sensor 3040.

Figure 31:
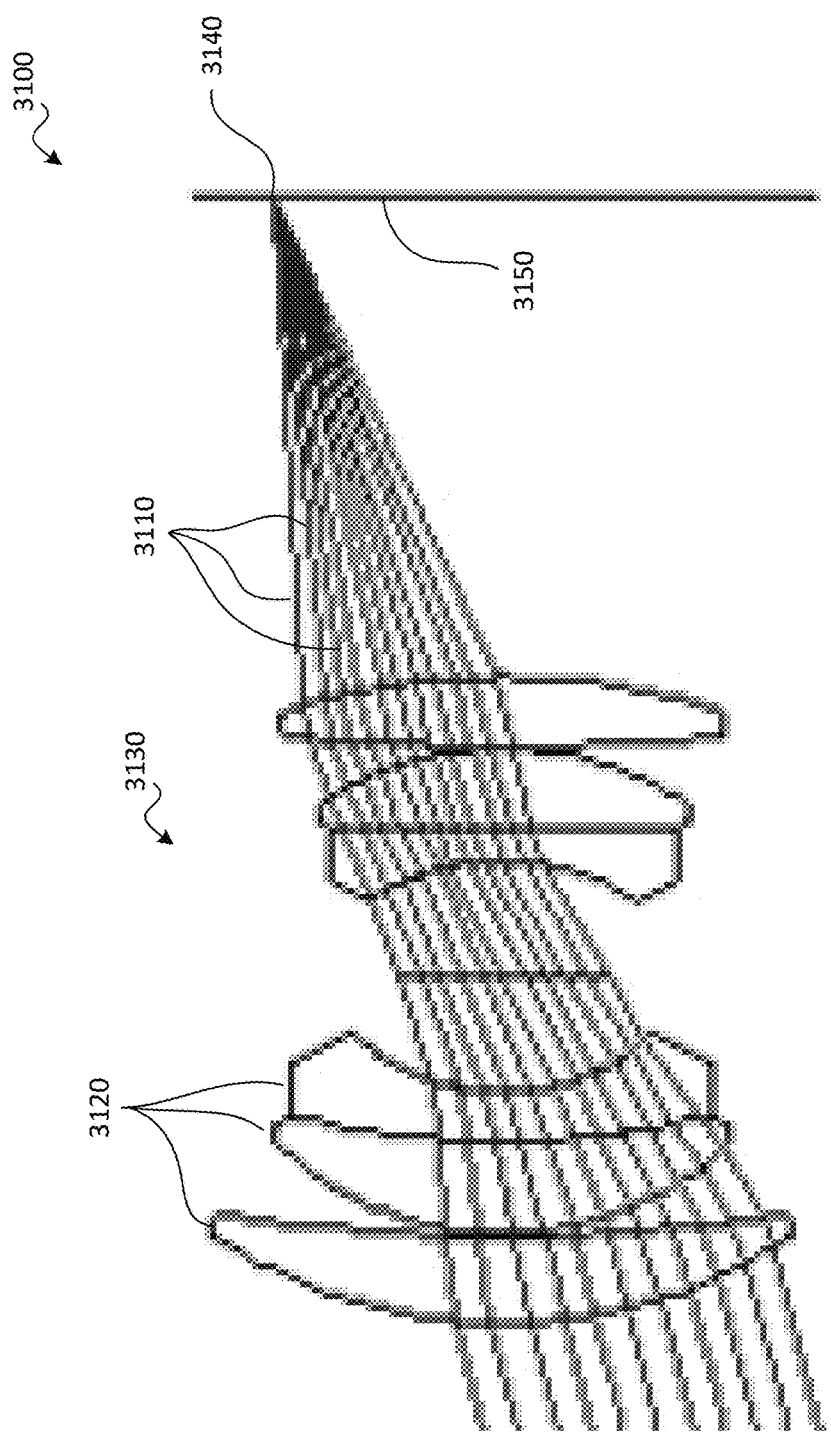
FIG. 31 is a diagram showing example output from an optical ray tracer, according to one embodiment.

FIG. 31 shows exemplary output 3100 from an optical ray tracer. In the image, a set of rays 3110 are refracted through the elements 3120 in a lens 3130 and traced to the intersection point 3140 on a virtual sensor surface 3150.

The following example assumes a set of captured rays parameterized in light-field volume coordinates, rays, a virtual lens, vl, that contains a virtual entrance pupil, vep, and a rectangular virtual sensor, vs, with width w and height h. An algorithm to create the virtual view may then be the following:

```
view_image = new Image(w, h)
view_image.clear( )
for each ray in rays
    cart_ray = convert_to_cartesian3d(ray)
    if (intersects(cart_ray, vep))
```

```
        image_ray = trace_ray_through_lens(cart_ray, vl)
        if (intersects(image_ray, vs))
            point = intersection(cart_ray, vs)
            norm_point = normalize_point_relative_to(vs)
            sensor_x = norm_point.x * w
            sensor_y = norm_point.y * h
            accumulate(view_image, x, y, image_ray.color)
```

Where:
intersects returns true if the supplied ray intersects with the surface
intersection returns the location, in Cartesian coordinates, of intersection
trace_ray_through_lens traces a ray through the virtual lens
normalize_point_relative_to normalizes a Cartesian 3D point into a normalized 2D location on the provided surface. Values are in x = [0, 1] and y = [0, 1]
accumulate accumulates the color values assigned to the ray into the image. This method may use any sort of interpolation, including nearest neighbor, bilinear, bicubic, or any other method.

Notably, optical ray tracers (for example, commercial applications such as ZEMAX) may function with varying levels of complexity as the behavior of light in the physical world is extremely complex. The above examples assume that one ray of light from the world equates to a single ray of light after passing through an optical system. Many optical modeling programs will model additional complexities such as chromatic dispersion, diffraction, reflections, and absorption.

Synthetic Ray Generation

In some embodiments of the capture system, certain areas of the light-field volume may not be adequately sampled. For example, FIG. 15 shows a tiled array 1500 in the form of a ring arrangement of light-field cameras 1530 in which gaps exist between the entrance pupils of the light-field cameras 1530 in the tiled array 1500. Light from the world that intersects with the tiled array 1500 in the gaps will not be recorded. While the sizes of the gaps in a light-field capture system may be extremely small relative to those of prior art systems, these gaps may still exist in many embodiments. When virtual views are generated that require ray data from the inadequately sampled regions of the light-field volume, these rays may be synthetically generated.

In one embodiment, rays are synthetically generated using simple interpolation between the closest available samples based on their light-field volume coordinates. Simple interpolation may work well when the difference between the location of the available samples and the desired sample is small. Notably, small is a relative term, and dependent on many factors, including the resolution of the virtual view, the location of physical subjects in the world at the time of capture, the application's tolerance for errors, and a host of other factors. The simple interpolation may generate a new sample value based on a weighted average of the neighboring rays. The weighting function may use nearest neighbor interpolation, linear interpolation, cubic interpolation, median filtering or any other approach now known or later developed.

In another embodiment, rays are synthetically generated based on a three-dimensional model and/or a depth map of the world at the time of capture. Notably, in a system that is well-calibrated relative to the world, a depth map and a three-dimensional model may be easily interchangeable. For the duration of the description, the term depth map will be used. In this embodiment, a depth map may be generated algorithmically from the captured light-field volume.

Depth map generation from light-field data and/or multiple overlapping images is a complicated problem, but there are many existing algorithms that attempt to solve the problem. See, for example, the above-cited U.S. patent application Ser. No. 14/302,826 for "Depth Determination for Light Field Images", filed Jun. 12, 2014 and issued as U.S. Pat. No. 8,988,317 on Mar. 24, 2015, the disclosure of which is incorporated herein by reference.

Once a depth map has been generated, a virtual synthetic ray may be traced until it reaches an intersection with the depth map. In this embodiment, the closest available samples from the captured light-field volume may be the rays in the light-field that intersect with the depth map closest to the intersection point of the synthetic ray. In one embodiment, the value assigned to the synthetic ray may be a new sample value based on a weighted average of the neighboring rays. The weighting function may use nearest neighbor interpolation, linear interpolation, cubic interpolation, median filtering, and/or any other approach now known or later developed.

In another embodiment, a pixel infill algorithm may be used if insufficient neighboring rays are found within an acceptable distance. This situation may occur in cases of occlusion. For example, a foreground object may block the view of the background from the perspective of the physical cameras in the capture system. However, the synthetic ray may intersect with the background object in the occluded region. As no color information is available at that location on the background object, the value for the color of the synthetic ray may be guessed or estimated using an infill algorithm. Any suitable pixel infill algorithms may be used. One exemplary pixel infill algorithm is "PatchMatch," with details as described in C. Barnes et al., PatchMatch: A Randomized Correspondence Algorithm for Structural Image Editing ACM Transactions on Graphics (Proc. SIGGRAPH), August 2009.

Virtual View Generation Acceleration Structures

In some cases, the algorithms for virtual view generation cited above may not execute efficiently enough, may not execute quickly enough, and/or may require too much data or bandwidth to properly enable viewing applications. To better enable efficient processing and/or viewing, the captured data may be reorganized or resampled as appropriate.

In one embodiment, the captured data may be resampled into a regularized format. In one specific embodiment, the light-field is resampled into a four-dimensional table, with separate dimensions for rho1, theta1, rho2 and theta2. The size of the resampled table will depend on many factors, including but not limited to the intended output resolution of the virtual views and the number of discrete viewpoints from which virtual views may be generated. In one embodiment, the intended linear output resolution of a virtual view may be 1000 pixels, and the field-of-view may be 100°. This may result in a total sampling of 3600 pixels for 360°. In the same embodiment, it may be desired that 100 discrete viewpoints can be generated in a single dimension. In this case, the size of the four-dimensional table may be 100×100×3600×3600. Notably, large sections of the table may be empty of data, and the table may be dramatically compressed relative to its nominal size. The resampled, regularized data structure may be generated through the use of "splatting" algorithms, "gathering" algorithms, or any other algorithm or technique.

In an embodiment using a "splatting" algorithm, the resampling process may begin with a four-dimensional table initialized with empty values. The values corresponding to each ray in the captured data set may then be added into the table at the data index(es) that best match the four-dimensional coordinates of the ray. The adding may use any interpolation algorithm to accumulate the values, including but not limited to a nearest neighbor algorithm, a quadlinear algorithm, a quadcubic algorithm, and/or combinations or variations thereof.

In an embodiment using a "gathering" algorithm, the value for each data index in the 4D table is calculated by interpolating from the nearest rays in the captured light-field data set. In one specific embodiment, the value at each index is a weighted sum of all rays that have coordinates within a four-dimensional hypercube centered at the coordinates corresponding to the data index. The weighting function may use nearest neighbor interpolation, linear interpolation, cubic interpolation, median filtering or any other approach now known or later developed.

After the captured light-field data set has been resampled into the four-dimensional table, there may be locations in the table with values that remain uninitialized or that have accumulated very little data. These locations may be referred to as "holes". In some cases, it may be desirable that the "holes" are filled in prior to the performance of additional processing like virtual view generation. In one embodiment, holes may be filled in using four-dimensional interpolation techniques in which values for the holes are interpolated based on the values of their neighbors in the four-dimensional table. The interpolation may use any type of filter kernel function, including but not limited to linear functions, median filter functions, cubic functions, and/or sync functions. The filter kernel may be of any size.

In another embodiment, "hole" data may be filled in using pixel infill algorithms. In a specific example, to fill hole data for the index with coordinates (rho1, theta1, rho2, theta2), a two-dimensional slice of data may be generated by keeping rho1 and theta1 fixed. A pixel infill algorithm (for example, PatchMatch) may be applied to fill in the missing data in the two-dimensional slice, and the generated data values may then be added into the four-dimensional table.

In one embodiment, the resampled four-dimensional table may be divided and stored in pieces. In some embodiments, each piece may correspond with a file stored in a file system. As an example, the full four-dimensional table may be broken up by evenly in four pieces by storing ¼×¼×¼×¼ of the full table in each piece. One advantage of this type of approach may be that entire pieces may be completely empty, and may thus be discarded. Another advantage may be that less information may need to be loaded in order to generate a virtual view.

In one embodiment, a set of virtual views is precomputed and stored. In some embodiments, a sufficient number of virtual views may be precomputed to enable the display of any needed viewpoint from the precomputed virtual views. Thus, rather than generating virtual views in real-time, the viewing software may read and display the precomputed virtual views. Alternatively, some precomputed virtual views may be used in combination with real-time generation of other virtual views.

Conventional Camera Arrays

In some embodiments, conventional, two-dimensional cameras may be used in order to provide additional spatial resolution, cost reduction, more manageable data storage, processing, and/or transmission, and/or other benefits. Advantageously, such conventional cameras may be arranged in a tiled array similar to those described above for light-field cameras. Such arrays may also be arranged to provide continuous, or nearly continuous, fields-of-view.

Referring to FIGS. 39A through 39D, perspective and side elevation views depict a tiled array 3900 of conventional cameras, according to one embodiment. As shown, the tiled array 3900 may have three different types of cameras, including upper view cameras 3910, center view cameras 3920, and lower view cameras 3930. In the tiled array 3900, the upper view cameras 3910, the center view cameras 3920, and the lower view cameras 3930 may be arranged in an alternating pattern, with a center view camera 3920 between each upper view camera 3910 and each lower view camera 3930. Thus, the tiled array 3900 may have as many of the center view cameras 3920 as it has of the lower view cameras 3930 and the upper view cameras 3910, combined. The larger number of center view cameras 3920 may provide enhanced and/or more complete imaging for the center view, in which the viewer of a virtual reality experience is likely to spend the majority of his or her viewing time.

As shown in FIGS. 39B and 39D, the upper view cameras 3910 and the lower view cameras 3930 may each have a relatively large field-of-view 3940, which may be 120° or larger. As shown in FIG. 39C, the center view cameras 3920 may each have a field-of-view 3950 that approximates that of the headset the user will be wearing to view the virtual reality experience. This field-of-view 3950 may be, for example, 90° to 110°. The placement of the upper view cameras 3910 and the lower view cameras 3930 may be relatively sparse, by comparison with that of the center view cameras 3920, as described above.

Figure 40:
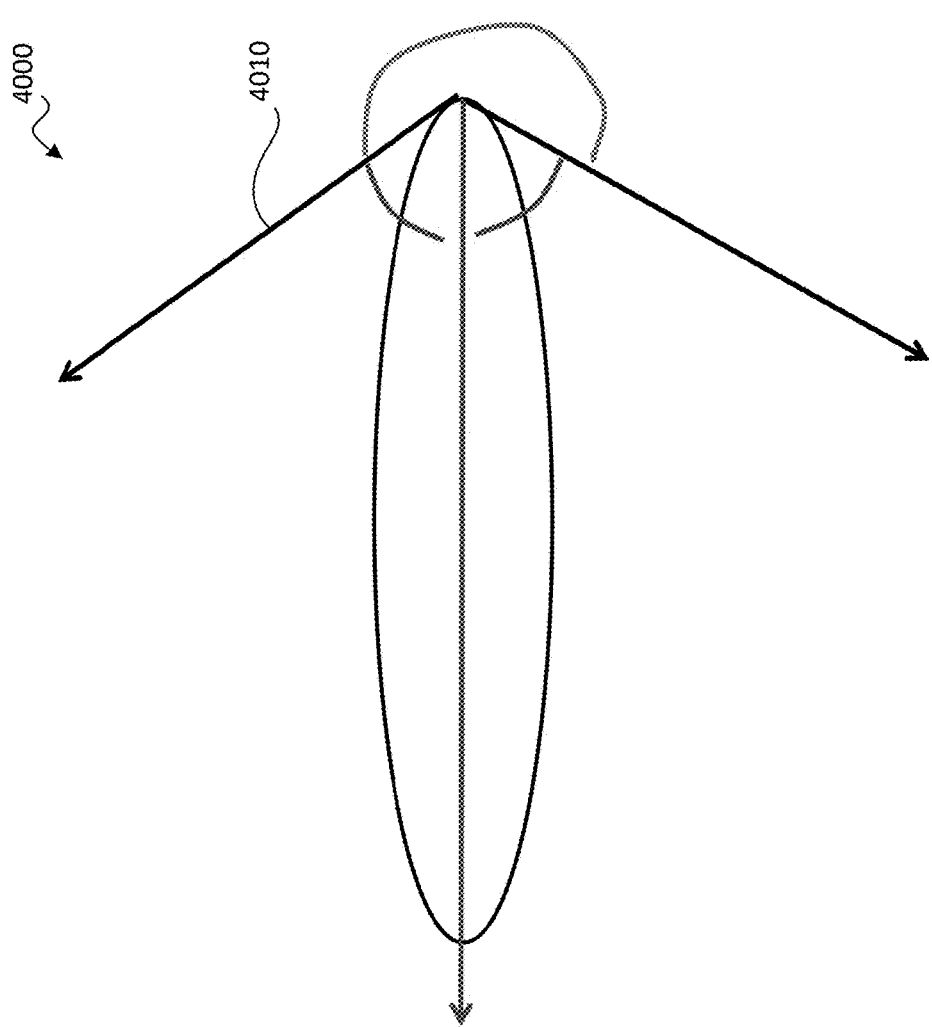
FIG. 40 is a diagram that depicts stitching that may be used to provide an extended vertical field-of-view.

Referring to FIG. 40, a diagram 4000 depicts stitching that may be used to provide an extended vertical field-of-view 4010. A 200° or greater vertical field-of-view 4010 may be obtained at any point along the tiled array 3900 with only "close" stitching. Additional vertical field-of-view may be constructed with "far" stitching. Advantageously, the tiled array 3900 may have full support for three angular degrees of freedom and stereo viewing. Further, the tiled array 3900 may provide limited support for horizontal parallax and/or limited stitching, except for extreme cases. Alternative embodiments may provide support for head tilt, vertical parallax, and/or forward/backward motion. One embodiment that provides some of these benefits will be shown and described in connection with FIG. 41.

Figure 41:
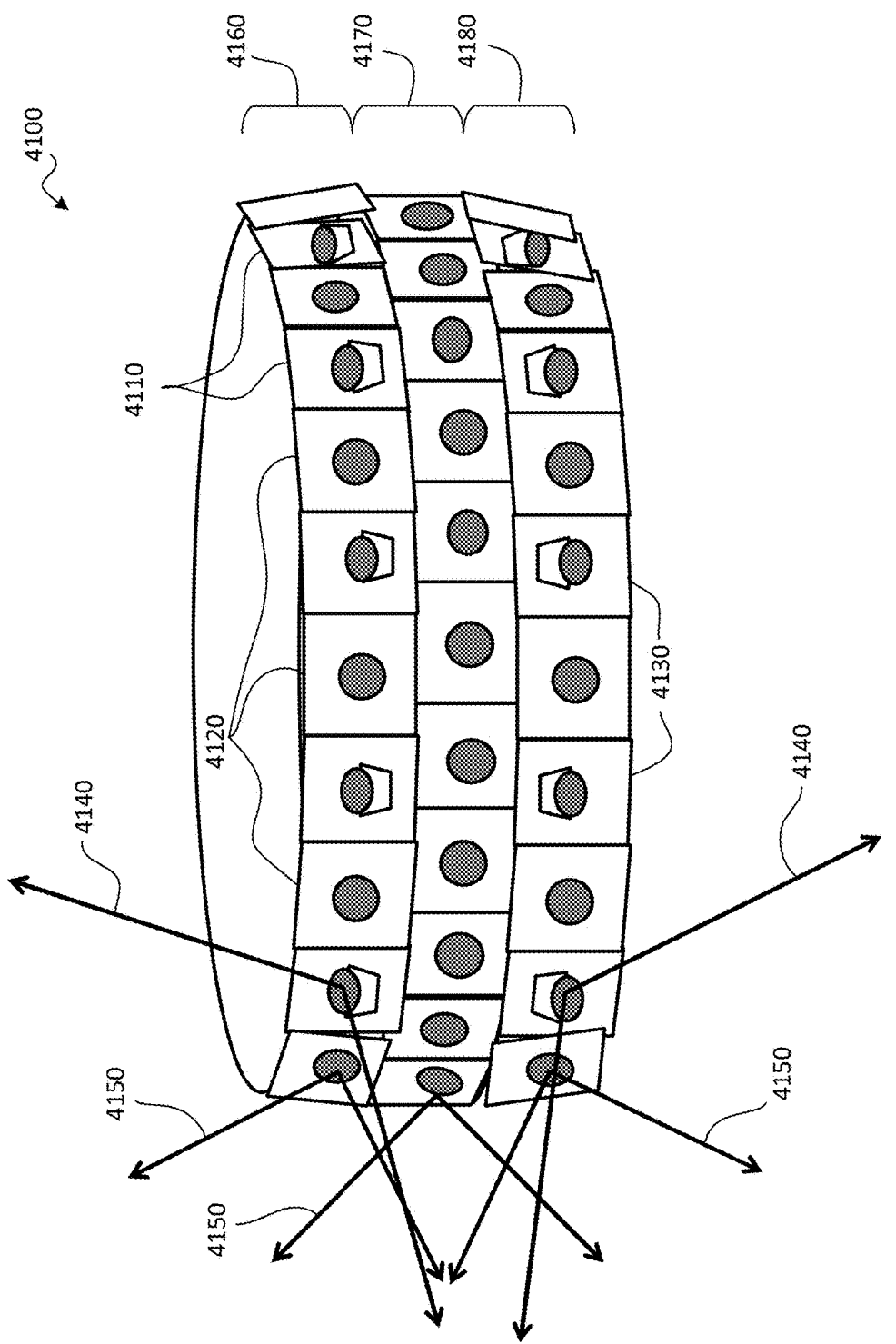
FIG. 41 is a perspective view depicting a tiled array according to another alternative embodiment.

Referring to FIG. 41, a perspective view depicts a tiled array 4100 according to another alternative embodiment. As shown, the tiled array 4100 may have three different types of cameras, including upper view cameras 4110, center view cameras 4120, and lower view cameras 4130. As in the previous embodiment, each of the upper view cameras 4110 and the lower view cameras 4130 may have a field-of-view 4140 that is relatively large, for example, 120° or larger. Each of the center view cameras 4120 may have a field-of-view 4150 that is somewhat smaller, for example, 90° to 110°.

The upper view cameras 4110, the center view cameras 4120, and the lower view cameras 4130 may be arranged in three rows, including a top row 4160, a middle row 4170, and a bottom row 4180. In the top row 4160, the upper view cameras 4110 and the center view cameras 4120 may be arranged in an alternating pattern. In the middle row 4170, only the center view cameras 4120 may be present. In the bottom row, 4180, the lower view cameras 4130 and the center view cameras 4120 may be arranged in an alternating pattern similar to that of the upper view cameras 4110 and the center view cameras 4120 of the top row 4160. The tiled array 4100 may have approximately four times as many of the center view cameras 4120 as of each of the upper view cameras 4110 and the lower view cameras 4130. Thus, as in the previous embodiment, more complete imaging may be provided for the center views, in which the viewer of a virtual reality experience is likely to spend the majority of his or her viewing time. Notably, the center view cameras 4120 on the top row 4160 may be tilted upward, and the center view cameras 4120 on the bottom row 4180 may be tilted downward. This tilt may provide enhanced vertical stitching and/or an enhanced vertical field-of-view.

Further, the tiled array 4100 may have three full degrees of freedom, and three limited degrees of freedom. The tiled array 4100 may provide support for head tilt via the enhanced vertical field-of-view, and may further provide limited vertical parallax. Further, the tiled array 4100 may support limited forward/backward movement.

In other alternative embodiments, various alterations may be made in order to accommodate user needs or budgetary restrictions. For example, fewer cameras may be used; in some tiled array embodiments, only ten to twenty cameras may be present. It may be advantageous to use smaller cameras with smaller pixel sizes. This and other modifications may be used to reduce the overall size of the tiled array. More horizontal and/or vertical stitching may be used.

According to one exemplary embodiment, approximately forty cameras may be used. The cameras may be, for example, Pt Grey Grasshopper 3 machine vision cameras, with CMOSIS MCV4000 sensors, USB 3.0 connectivity, and one-inch, 2 k×2 k square image sensors, with 90 frames per second (FPS) capture and data transfer capability. The data transfer rate for raw image data may be 14.4 GB/s (60 FPS at 12 bits), and a USB 3.0 to PCIE adapter may be used. Each USB 3.0 interface may receive the image data for one camera.

The tiled array may have a total resolution of 160 megapixels. Each of the center view cameras may have a Kowa 6 mm lens with a 90° field-of-view. Each of the upper view cameras and lower view cameras may have a Fujinon 2.7 mm fisheye lens with a field-of-view of 180° or more. In alternative embodiments, more compact lenses may be used to reduce the overall size of the tiled array.

Conventional cameras may be arranged in tiled arrays according to a wide variety of tiled arrays not specifically described herein. With the aid of the present disclosure, a person of skill in the art would recognize the existence of many variations of the tiled array 3900 of FIG. 39 and the tiled array 4100 that may provide unique advantages for capturing virtual reality video streams.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A system comprising:
   a plurality of light-field cameras arranged to create a substantially gap-free surface in a tiled array so as to capture a substantially fully sampled light-field volume within an environment, wherein each of the light-field cameras comprises an image sensor that captures pixels representative of the environment; and
   a processor configured to:
      map the pixels to light rays received in the light-field volume;
      store data descriptive of the light rays in a coordinate system representative of the light-field volume, wherein the coordinate system comprises a polar coordinate system and the light rays are recorded in terms of a first angle of intersection with an inner sphere, a second angle of intersection with the inner sphere, a first angle of intersection with an outer sphere, and a second angle of intersection with the outer sphere; and
      use the substantially fully sampled light-field volume to generate a first virtual view depicting the environment from a first virtual viewpoint.

2. The system of claim 1, wherein the light-field cameras are arranged such that outward-facing elements of the light-field cameras define a physical capture surface larger than the light-field volume;
   wherein the physical capture surface encircles the light-field volume.

3. The system of claim 2, wherein the processor is further configured to interpolate between portions of the light-field volume captured by the light-field cameras to generate additional data to fill holes in the light-field volume resulting from gaps between the light-field cameras.

4. The system of claim 1, wherein at least a subset of the light-field cameras are arranged in a ring array to define a generally cylindrical capture surface that captures the light-field volume.

5. The system of claim 4, wherein the light-field cameras are arranged in multiple layers in the ring array to define the generally cylindrical capture surface.

6. The system of claim 4, wherein at least one of light-field cameras is positioned on an axis of the generally cylindrical capture surface and is oriented substantially perpendicularly to the light-field cameras of the subset.

7. The system of claim 1, wherein the light-field cameras are arranged in a spherical array to define a generally spherical capture surface that captures the light-field volume.

8. The system of claim 1, wherein each of the light-field cameras comprises an image sensor and a microlens array that projects light from the light-field volume onto the image sensor.

9. The system of claim 8, wherein each of the light-field cameras further comprises a tapered fiber optic bundle comprising a leading end facing toward the environment and a trailing end positioned proximate the image sensor.

10. The system of claim 1, wherein:
each of the light-field cameras comprises an objective lens through which light from the light-field volume enters the light-field camera; and
the objective lenses of the light-field cameras are compactly arranged to minimize gaps between the objective lenses.

11. The system of claim 1, wherein:
each of the light-field cameras comprises an objective lens through which light from the light-field volume enters the light-field camera; and
each of the objective lenses comprises a double Gauss lens.

12. The system of claim 1, further comprising a motor that rotates the light-field cameras relative to the environment.

13. The system of claim 1, wherein each of the light-field cameras comprises an objective lens through which the light-field volume enters the light-field camera and an image sensor that captures the light-field volume;
and wherein the system further comprises a motor that rotates the image sensors of the light-field cameras relative to the objective lenses of the light-field cameras.

14. The system of claim 1, wherein each of the light-field cameras comprises an array light-field camera.

15. The system of claim 1, wherein the processor is further configured to generate the first virtual view by:
positioning a virtual lens and a virtual image sensor on the coordinate system; and
modeling passage of the light rays through the virtual lens to the virtual image sensor.

16. The system of claim 1, wherein:
the processor is further configured to use the light-field volume to generate a second virtual view depicting the environment from a second virtual viewpoint; and
the second virtual viewpoint is spaced apart from the first virtual viewpoint such that the first virtual view and the second virtual view cooperate to simulate viewing of the environment by a user.

17. A system comprising:
a plurality of center view cameras arranged in at least a first circular pattern around an axis, wherein each of the center view cameras has a field-of-view generally perpendicular to the axis;
a plurality of upper view cameras arranged in at least a second circular pattern around the axis, wherein each of the upper view cameras has a field-of-view oriented generally upward; and
a plurality of lower view cameras arranged in at least a third circular pattern around the axis, wherein each of the lower view cameras has a field-of-view oriented generally downward; and
wherein the first circular pattern is interleaved with at least one of the second circular pattern and the third circular pattern to define a first ring circling the axis, in which each of the center view cameras in the first ring is positioned between two elements in the first ring, wherein the two elements are selected from the group consisting of the upper view cameras and the lower view cameras.

18. The system of claim 17, further comprising a processor configured to use image data captured by the center view cameras, the upper view cameras, and the lower view cameras from within an environment to generate a first virtual view depicting the environment from a first virtual viewpoint.

19. The system of claim 17, wherein the first circular pattern is interleaved with the second circular pattern and the third circular pattern to define the first ring such that-each of the center view cameras in the first ring is positioned between one of the upper view cameras in the first ring and one of the lower view cameras in the first ring.

20. The system of claim 17, wherein:
the first circular pattern is interleaved with the second circular pattern to define the first ring such that-each of the center view cameras in the first ring is positioned between two of the upper view cameras in the first ring; and
the center view cameras are further arranged in a fourth circular pattern interleaved with the third circular pattern to define a second ring circling the axis, such that-each of the center view cameras in the second ring is positioned between two of the lower view cameras in the second ring.

21. The system of claim 17, wherein:
each of the center view cameras comprises a center view camera field-of-view;
each of the upper view cameras comprises an upper view camera field-of-view;
each of the lower view cameras comprises a lower view camera field-of-view; and
the upper view camera field-of-view and the lower view camera field-of-view are larger than the center view camera field-of-view.

22. A method of generating one or more virtual viewpoints of an environment, the method comprising:
at a plurality of light-field cameras arranged to create a substantially gap-free surface in a tiled array, capturing a substantially fully sampled light-field volume within the environment, wherein each of the light-field cameras comprises an image sensor and capturing the light-field volume comprises, with each of the light-field cameras, using the image sensor to capture pixels representative of the environment;
at a processor, mapping the pixels to light rays received in the light-field volume;
at the processor, storing data descriptive of the light rays in a coordinate system representative of the light-field volume, wherein the coordinate system comprises a polar coordinate system and wherein storing data descriptive of the light rays in the coordinate system comprises recording the light rays in terms of a first angle of intersection with an inner sphere, a second angle of intersection with the inner sphere, a first angle of intersection with an outer sphere, and a second angle of intersection with the outer sphere; and
at the processor, using the substantially fully sampled light-field volume to generate a first virtual view depicting the environment from a first virtual viewpoint.

23. The method of claim 22, further comprising, at the processor, interpolating between portions of the light-field volume captured by the light-field cameras to generate additional data to fill holes in the light-field volume resulting from gaps between the light-field cameras.

24. The method of claim 22, wherein:
each of the light-field cameras comprises an image sensor and a microlens array; and
capturing the light-field volume comprises, with each of the light-field cameras, projecting light with the microlens array from the light-field volume onto the image sensor.

25. The method of claim 24, wherein:
each of the light-field cameras further comprises a tapered fiber optic bundle comprising a leading end facing toward the environment and a trailing end positioned proximate the image sensor; and
capturing the light-field volume further comprises, with each of the light-field cameras, guiding the light to the image sensor by causing the light to pass from the leading end to the trailing end.

26. The method of claim 22, wherein:
each of the light-field cameras comprises an objective lens;
the objective lenses of the light-field cameras are compactly arranged to minimize gaps between the objective lenses; and
capturing the light-field volume comprises, with each of the light-field cameras, receiving light from the light-field volume through the objective lens.

27. The method of claim 22, wherein using the light-field volume to generate the first virtual view comprises:
positioning a virtual lens and a virtual image sensor on the coordinate system; and
modeling passage of the light rays through the virtual lens to the virtual image sensor.

28. The method of claim 22, further comprising, at the processor, using the light-field volume to generate a second virtual view depicting the environment from a second virtual viewpoint;
wherein the second virtual viewpoint is spaced apart from the first virtual viewpoint such that the first virtual view and the second virtual view cooperate to simulate viewing of the environment by a user.

29. A method of generating one or more virtual viewpoints of an environment, the method comprising:
at a plurality of cameras arranged in a tiled array, capturing image data from within the environment; and
at a processor, using the image data to generate a first virtual view depicting the environment from a first virtual viewpoint;
wherein the plurality of cameras comprises:
a plurality of center view cameras arranged in at least a first circular pattern around an axis, wherein each of the center view cameras has a field-of-view generally perpendicular to the axis;
a plurality of upper view cameras arranged in at least a second circular pattern around the axis, wherein each of the upper view cameras has a field-of-view oriented generally upward; and
a plurality of lower view cameras arranged in at least a third circular pattern around the axis, wherein each of the lower view cameras has a field-of-view oriented generally downward; and
wherein the first circular pattern is interleaved with at least one of the second circular pattern and the third circular pattern to define a first ring circling the axis, in which each of the center view cameras in the first ring is positioned between two elements in the first ring, wherein the two elements are selected from the group consisting of the upper view cameras and the lower view cameras.

30. The method of claim 29, wherein the first circular pattern is interleaved with the second circular pattern and the third circular pattern to define the first ring such that-each of the center view cameras in the first ring is positioned between one of the upper view cameras in the first ring and one of the lower view cameras in the first ring.

31. The method of claim 29, wherein:
the first circular pattern is interleaved with the second circular pattern to define the first ring such that-each of the center view cameras in the first ring is positioned between two of the upper view cameras in the first ring; and
the center view cameras are further arranged in a fourth circular pattern interleaved with the third circular pattern to define a second ring circling the axis, such that-each of the center view cameras in the second ring is positioned between two of the lower view cameras in the second ring.

32. The method of claim 29, wherein:
each of the center view cameras comprises a center view camera field-of-view;
each of the upper view cameras comprises an upper view camera field-of-view;
each of the lower view cameras comprises a lower view camera field-of-view; and
the upper view camera field-of-view and the lower view camera field-of-view are larger than the center view camera field-of-view.

* * * * *